(12) United States Patent
Troiano

(10) Patent No.: US 12,357,990 B2
(45) Date of Patent: Jul. 15, 2025

(54) PURIFICATION OF NUCLEIC ACIDS IN A MICROFLUDIC CHIP BY SEPARATION

(71) Applicant: PerkinElmer Health Sciences, Inc., Waltham, MA (US)

(72) Inventor: Derek Troiano, Waltham, MA (US)

(73) Assignee: Revvity Health Sciences, Inc., Waltham, MA (US)

( * ) Notice: Subject to any disclaimer, the term of this patent is extended or adjusted under 35 U.S.C. 154(b) by 82 days.

(21) Appl. No.: 16/964,562

(22) PCT Filed: Jan. 23, 2019

(86) PCT No.: PCT/US2019/014821
§ 371 (c)(1),
(2) Date: Jul. 23, 2020

(87) PCT Pub. No.: WO2019/147722
PCT Pub. Date: Aug. 1, 2019

(65) Prior Publication Data
US 2021/0031199 A1    Feb. 4, 2021

Related U.S. Application Data

(60) Provisional application No. 62/757,074, filed on Nov. 7, 2018, provisional application No. 62/623,712, filed
(Continued)

(51) Int. Cl.
*G01N 37/00* (2006.01)
*B01L 3/00* (2006.01)
(Continued)

(52) U.S. Cl.
CPC ....... *B01L 3/502761* (2013.01); *B01L 3/5085* (2013.01); *B01L 9/527* (2013.01);
(Continued)

(58) Field of Classification Search
CPC .. B01L 3/502761; B01L 3/5085; B01L 9/527; B01L 2200/027; B01L 2200/0652;
(Continued)

(56) References Cited

U.S. PATENT DOCUMENTS 6,805,840 B1  10/2004  Tajima
8,277,628 B2  10/2012  Ronaghi et al.
(Continued)

FOREIGN PATENT DOCUMENTS

AU    2015216870 B2    7/2019
AU    2019226158 A1    9/2019
(Continued)

OTHER PUBLICATIONS

Wen et al., "Purification of Nucleic Acids in Microfluidic Devices," Analytical Chemistry 80(17): 6472-6479, Sep. 1, 2008. (8 pages).

*Primary Examiner* — Paul S Hyun
(74) *Attorney, Agent, or Firm* — Seed IP Law Group LLP

(57) ABSTRACT

A system may include a horizontal actuator to move a tray, to which a microwell plate and a microfluidic chip may be coupled. The system may include a vertical actuator to move a support arm, to which a plurality of pipettes or pipette tips may be coupled. The system may include a rotational actuator to move an angle bracket, to which a magnet may
(Continued)

be coupled. The system may include a heater, through which the pipettes may extend. The system may include a pump to control the flow of fluids through the pipettes.

18 Claims, 47 Drawing Sheets

Related U.S. Application Data on Jan. 30, 2018, provisional application No. 62/766,603, filed on Jan. 24, 2018.

(51) Int. Cl.
*B01L 9/00* (2006.01)
*B03C 1/01* (2006.01)
*B03C 1/023* (2006.01)

(52) U.S. Cl.
CPC ............... *B03C 1/01* (2013.01); *B03C 1/023* (2013.01); *B01L 2200/027* (2013.01); *B01L 2200/0652* (2013.01); *B01L 2200/0668* (2013.01); *B01L 2300/0816* (2013.01); *B01L 2400/043* (2013.01); *B03C 2201/18* (2013.01)

(58) Field of Classification Search
CPC ..... B01L 2200/0668; B01L 2300/0816; B01L 2400/043; B01L 2300/087; B01L 2300/1827; B01L 2400/0415; B01L 3/021; B01L 3/502753; B01L 3/50273; B01L 2200/0663; B03C 1/01; B03C 1/023; B03C 2201/18; B03C 1/0332; B03C 1/288; G01N 35/0098; C12N 15/1013

See application file for complete search history.

(56) References Cited

U.S. PATENT DOCUMENTS

| | | |
|---|---|---|
| 8,702,948 B2 | 4/2014 | Ronaghi et al. |
| 10,151,672 B2 | 12/2018 | Korpimaki |
| 2008/0038810 A1 | 2/2008 | Pollack et al. |
| 2010/0084270 A1 | 4/2010 | Vulto et al. |
| 2013/0137108 A1 | 5/2013 | Tripathi et al. |
| 2018/0003704 A1 | 1/2018 | Horii et al. |

FOREIGN PATENT DOCUMENTS

| | | | | |
|---|---|---|---|---|
| CN | 105980826 A | | 9/2016 | |
| CN | 105980826 B | | 1/2019 | |
| CN | 109682656 A | | 4/2019 | |
| EP | 1065001 A1 | * | 1/2001 | .......... B01J 19/0046 |
| EP | 2 977 438 A1 | | 1/2016 | |
| JP | 2006032138 A | | 2/2006 | |
| JP | 2007511744 A | | 5/2007 | |
| JP | 4349900 B2 | | 10/2009 | |
| JP | 2011103900 A | | 6/2011 | |
| JP | 2012516155 A | | 7/2012 | |
| JP | 2016101166 A | | 6/2016 | |
| JP | 2018-9952 A | | 1/2018 | |
| WO | 99/47267 A1 | | 9/1999 | |
| WO | WO-0061292 A1 | * | 10/2000 | ............... B03C 1/02 |
| WO | WO-2008049638 A1 | * | 5/2008 | ........ B01L 3/502753 |
| WO | 2015/121533 A1 | | 8/2015 | |
| WO | WO 2016120970 A1 | | 8/2016 | |
| WO | 2017/185098 A1 | | 10/2017 | |

* cited by examiner

PURIFICATION OF NUCLEIC ACIDS IN A MICROFLUDIC CHIP BY SEPARATION

BACKGROUND

Technical Field

The technology described herein relates to processing of samples such as biological samples, for example, the separation of contaminants from a biological sample contained on a substrate, for example, in conjunction with purification of nucleic acids derived from a complex sample, such as blood.

Description of the Related Art

It is well known that nucleic acids can be collected for analytical testing. A major challenge in the collection of nucleic acids from, for example, blood is that the biosamples quite often contain contaminates. Therefore, nucleic acid sample purification has become an important step in experimental workflows as the quality of the sample nucleic acids may affect the performance in downstream applications.

A host of common nucleic acid purification techniques include centrifugation, chemical separation, or a solid phase-based separation. These techniques, however, are time and labor intensive and quite often require the use of specialized equipment.

The use of microfluidics in the analysis of biological and chemical samples is well known. One such use involves a system that utilizes a microfluidic chip (sometimes referred to as a "lab-on-a-chip") to obtain one or more samples, to process the sample for measurement, and then to assess the composition. However, the samples must be purified to remove contaminates to ensure the quality of downstream applications.

Thus, there is a need in the art to improve the process of purifying biological samples without the need for expensive and highly specialized equipment.

BRIEF SUMMARY

Embodiments of the present technology uses electric fields and/or gels, such as polyether compounds, to separate bioanalytes from a biological sample contained on a substrate. According to a first example of the technology, a method for separating bioanalytes comprises: providing a first well and a second well that are connected to each other via a micro channel. A fluid, such as a buffer, is provided in the first well into which the biological sample is placed. Magnetic beads, for example, magnetic particles based on polyvinyl alcohol (M-PVA Magnetic Beads) are then introduced into the first well. The surfaces of the M-PVA Magnetic Beads can be functionalized with many different groups and modified with individually tunable loadings. In one example, the M-PVA Magnetic Beads can be tuned to isolate nucleic acids in the biological sample, which may comprise blood.

The M-PVA Magnetic Beads isolate nucleic acids in the biological sample and draw the target molecules to the M-PVA Magnetic Beads. An electric field is then applied to the first well that interacts with negatively charged contaminates in the buffer. A magnet, external to the first well, is then brought in proximity to the first well. The magnet functions to attract the M-PVA Magnetic Beads such that, when the magnet is externally moved toward the microchannel, the M-PVA Magnetic Beads along with the target molecules attracted thereto, are pulled toward and into the microchannel. However, most of the negatively charged contaminates are maintained in the first well due to their interaction with the electric field. The magnet continues along its path in the microchannel toward the second well pulling the M-PVA Magnetic Beads and target molecules into the second well. The microchannel also contains a buffer and the movement of the M-PVA Magnetic Beads through the buffer in the microchannel further functions to shed contaminates from the target molecules such that by the time the M-PVA Magnetic Beads reach the second well, the target molecules are essentially free of contaminates.

At this point, the M-PVA Magnetic Beads can be withdrawn from the second well with the target molecules still attached and placed into a chamber where the M-PVA Magnetic Beads can be de-tuned to shed the target molecules and then be removed. The result is a very clean biological sample that is essentially free of contaminates. There is no need for expense or specialized equipment, such as is needed for centrifugation, chemical separation, or solid phase-based separation. Rather, this technique can be implemented in a simple microfluidic chip format with few moving parts or the need for extensive power requirements.

In some examples, a third well can be connected with the second well via a second microchannel. In this configuration, once the magnet had moved the M-PVA Magnetic Beads with the target molecules into the second well, the magnet could then be moved toward the second microchannel thereby pulling the M-PVA Magnetic Beads out of the second well and into the second microchannel. The magnet could then be moved toward the third well such that the M-PVA Magnetic Beads are pulled into the third well. This configuration provides another cleaning stage to the biological sample for applications which require it.

In some examples, it is considered that additional cleaning of the biological sample could be achieved by creating a flow of buffer from the second well toward the first well. This could be achieved by a simple fluid volume differential between the wells. In one example, the second well could be provided with a greater volume of fluid than is provided in the first well. For example, a fluid volume differential in the range of 20% to 50% could be provided, which may produce a desirable flow rate. This additional volume could be added after the biological sample is inserted into the first well, such that the flow of fluid from the second well through the microchannel and into the first well occurs during the movement of the M-PVA Magnetic Beads from the first well to the second well. This flow of fluid will function to carry any contaminates that escaped from the first well out of the microchannel and back into the first well.

In some examples, the electric field is applied to the first well or chamber by the application of first and second electrical conductors. A source of electrical power is connected to the first and second electrical conductors for creating a difference in electrical potential energy between the conductors. Additionally, software can be used to control the source of electrical power so as to develop a desired voltage between the conductors. It is contemplated that the software can actively control the magnitude of the voltage across the conductors.

In some examples, the system further may comprise a motor coupled to the first electrical conductor and adapted to move the first electrical conductor into and out of the first well. Likewise, the system may further comprise a motor coupled the second electrical conductor and adapted to move the second electrical conductor into and out of the first well.

In some examples, the system may comprise a motor coupled to a delivery system for insertion of the M-PVA Magnetic Beads into the first well and for fully automatic movement of the magnet that functions to pull the M-PVA Magnetic Beads from the first well into the microchannel and into the second well. Likewise, the system may further comprise a motor coupled to the magnet to withdraw the M-PVA Magnetic Beads from the second well and for insertion into the chamber.

In some examples, the M-PVA Magnetic Beads are tuned to attract deoxyribonucleic acid, while in other examples, the M-PVA Magnetic Beads are tuned to attract ribonucleic acid.

In one example, a method for removing contaminants from a biological sample is provided comprising the steps of providing a first well and a second well connected to each other via a micro channel and providing a fluid in the first well, the second well and the microchannel. The method further comprises the steps of placing the biological sample into the first well, introducing magnetic beads into the first well and drawing target molecules within the biological sample to the magnetic beads. The method still further comprises the steps of applying an electric field to the first well, the electric field interacting with the contaminates, introducing a magnet generating a magnetic field into the vicinity of the first well, the magnet field interacting with the magnetic beads and moving the magnet toward the microchannel, the magnetic beads being drawn along with the movement of the magnet such that the magnetic beads and the target molecules are drawn into the microchannel. The method is provided such that the electric field acts on the contaminates so as to maintain the contaminates in the first well as the magnetic beads and target molecules move into the microchannel. Finally, the method comprises the step of moving the magnet toward the second well, the magnetic beads and target molecules being drawn along with the movement of the magnet such that the magnetic beads and target molecules are drawn into the second well.

In another example, a system for removing contaminants from a biological sample is provided comprising a first well adapted to contain a fluid and receive the biological sample, a second well adapted to contain a fluid and a microchannel extending between the first well and the second well. The system is provided such that magnetic beads are adapted to be introduced into the first well, the magnetic beads tuned to attract target molecules in the biological sample. The system further comprises a source of electrical power and two probes coupled to the source of electrical power, the two probes adapted to apply an electric field to the first well. The system is provided such that when electrical power is applied to the two probes, the two probes are adapted to generate and electric field there between with the contaminates interacting with the electric field. The system still further comprises a magnet adapted to be moved into the vicinity of the first well, the magnet is adapted to generate a magnetic field to interact with the magnetic beads. The system is further provided such that the magnet is provided to be moved toward the microchannel so that the magnetic beads are drawn along with the movement of the magnet and into the microchannel. Additionally, the electric field is adapted to interact with the contaminates such that the contaminates are maintained in the first well and the magnet is adapted to move toward the second well such that the magnetic beads and target molecules are drawn into the second well.

The M-PVA Magnetic Beads isolate nucleic acids in the biological sample and draw the target molecules to the M-PVA Magnetic Beads. A magnet, external to the first well, is then brought in proximity to the first well. The magnet functions to attract the M-PVA Magnetic Beads such that, when the magnet is moved toward the microchannel, the M-PVA Magnetic Beads along with the target molecules attracted thereto, are pulled toward and into the microchannel. The microchannel is filled with a polyether compound, such as, polyethylene glycol (PEG) also known as polyethylene oxide or polyoxyethylene depending on its molecular weight. The contaminates are negatively charged particles. When the negatively charged contaminates are drawn into the PEG, the PEG functions to block progression of those negatively charged species through the microchannel.

The magnet continues along its path in the microchannel toward the second well pulling the M-PVA Magnetic Beads and target molecules into the second well. By the time the M-PVA Magnetic Beads reach the second well, the target molecules are essentially free of contaminates, which have been shed in the PEG.

At this point, the M-PVA Magnetic Beads can be withdrawn from the second well with the target molecules still attached and placed into a chamber where the M-PVA Magnetic Beads can be de-tuned to shed the target molecules and then be removed. The result is a very clean biological sample that is essentially free of contaminates. There is no need for expense or specialized equipment, such as is needed for centrifugation, chemical separation, or solid phase-based separation. Rather, this technique can be implemented in a simple microfluidic chip format with few moving parts or the need for extensive power requirements.

In some examples, a third well can be connected with the second well via a second microchannel. In this configuration, once the magnet had moved the M-PVA Magnetic Beads with the target molecules into the second well, the magnet could then be moved toward the second microchannel thereby pulling the M-PVA Magnetic Beads out of the second well and into the second microchannel. The second microchannel can also include PEG. The magnet could then be moved toward the third well such that the M-PVA Magnetic Beads are pulled into the third well. This configuration provides another cleaning stage to the biological sample for applications which require it.

It is still further anticipated that the first well and the second well could comprise a gel, such as PEG, which would function to still further clean the biological sample.

In some examples, it is considered that additional cleaning of the biological sample could be achieved by creating a flow of the gel from the second well toward the first well. This could be achieved by a simple fluid volume differential of the gel between the wells. In one example, the second well could be provided with a greater volume of gel than is provided in the first well. This additional volume could be added after the biological sample is inserted into the first well, such that the flow of gel from the second well through the microchannel and into the first well occurs during the movement of the M-PVA Magnetic Beads from the first well to the second well. This flow of fluid will function to carry any contaminates that escaped from the first well out of the microchannel and back into the first well.

In some examples, the system may comprise a motor coupled to a delivery system for insertion of the M-PVA Magnetic Beads into the first well and for fully automatic movement of the magnet that functions to pull the M-PVA Magnetic Beads from the first well into the microchannel and into the second well. Likewise, the system may further comprise a motor coupled to the magnet to withdraw the M-PVA Magnetic Beads from the second well and for insertion into the chamber.

In some examples, the M-PVA Magnetic Beads are tuned to attract deoxyribonucleic acid, while in other examples, the M-PVA Magnetic Beads are tuned to attract ribonucleic acid.

In one example, a method for removing contaminants from a biological sample is provided comprising the steps of providing a first well and a second well connected to each other via a micro channel, providing a fluid in the first well, the second well and the microchannel and placing the biological sample into the first well. The method further comprises the steps of introducing magnetic beads into the first well, drawing target molecules within the biological sample to the magnetic beads and introducing a magnet generating a magnetic field into the vicinity of the first well, the magnet field interacting with the magnetic beads. The method still further comprises the steps of moving the magnet toward the microchannel, the magnetic beads being drawn along with the movement of the magnet such that the magnetic beads and the target molecules are drawn into the microchannel and providing a gel in the microchannel where the gel interacts with the contaminates. The method is provided such that the gel interacts with the contaminates. The method finally comprises the step of moving the magnet toward the second well, the magnetic beads and target molecules being drawn along with the movement of the magnet such that the contaminates are separated from the target molecules as the contaminates are maintained within the gel and the magnetic beads and target molecules are drawn into the second well.

In another example, a system is provided for removing contaminants from a biological sample comprising a first well adapted to contain a fluid and receive the biological sample, a second well adapted to contain a fluid, a microchannel extending between the first well and the second well and a gel located within the microchannel. The system is provided such that magnetic beads are adapted to be introduced into the first well, the magnetic beads tuned to attract target molecules in the biological sample. The system further comprises a magnet adapted to be moved into the vicinity of the first well, the magnet adapted to generate a magnetic field to interact with the magnetic beads. The system is further provided such that the magnet is provided to be moved toward the microchannel wherein the magnetic beads are drawn along with the movement of the magnet and into the microchannel and the gel is adapted to interact with the contaminates such that at least some of the contaminates are captured within the gel when the magnetic beads move through the gel. Finally, the system is provided such that the magnet moves toward the second well and the magnetic beads and target molecules are drawn into the second well.

A system may be summarized as comprising: a horizontal actuator; a tray coupled to the horizontal actuator; a well plate coupled to the tray; a microfluidic chip coupled to the well plate; a vertical actuator; a pipette coupled to the vertical actuator; a heater coupled to the pipette to control a temperature of a fluid within the pipette; a pump coupled to the pipette to control movement of the fluid within the pipette; and a controller communicatively coupled to the horizontal actuator to control horizontal movement of the tray, the well plate, and the microfluidic chip, communicatively coupled to the vertical actuator to control vertical movement of the pipette, communicatively coupled to the pump to control the pump, and communicatively coupled to the heater to control the heater.

The system may further comprise: a rotational actuator; and a magnet coupled to the rotational actuator; wherein the controller is communicatively coupled to the rotational actuator to control rotation of the magnet underneath the tray. The well plate may include a plurality of electrically conductive leads located underneath the microfluidic chip. The pipette may include a pipette tip held in a vertical orientation by a support arm and an end of the pipette opposite to the pipette tip may be held within a cartridge. The heater may include a stationary sidewall and a hinged sidewall rotatably coupled to the stationary sidewall by a hinge. The stationary sidewall may include a first groove and the hinged sidewall may include a second groove, the pipette may extend between the stationary sidewall and the hinged sidewall through the first and second grooves. The stationary sidewall may include a first bar movable outward from the stationary sidewall toward the hinged sidewall to pinch the pipette at a first location near a first side of the stationary sidewall and a second bar movable outward from the stationary sidewall toward the hinged sidewall to pinch the pipette at a second location near a second side of the stationary sidewall opposite to the first side of the stationary sidewall.

A method may be summarized as comprising: receiving a biological sample in a first well in a well plate; receiving another reagent in a second well in the well plate; operating a pump to draw the biological sample from the first well of the well plate into a pipette; operating an actuator to move the pipette from the first well of the well plate to a first well of a microfluidic chip; operating the pump to expel the biological sample from the pipette into the first well of the microfluidic chip; operating the actuator to move the pipette from the first well of the microfluidic chip to a second well of the microfluidic chip; operating the pump to draw the biological sample from the second well of the microfluidic chip into the pipette; operating the actuator to move the pipette from the second well of the microfluidic chip to the second well of the well plate; operating the pump to draw the other reagent from the second well of the well plate into the pipette; operating a heater to heat the biological sample and the other reagent within the pipette; operating the pump to expel the biological sample from the pipette into a third well in the well plate.

The biological sample may include DNA, RNA, mRNA, or proteins. Contaminants may be removed from the biological sample in the microfluidic chip. The polymerase chain reaction may occur within the pipette.

DETAILED DESCRIPTION

Figure 1:
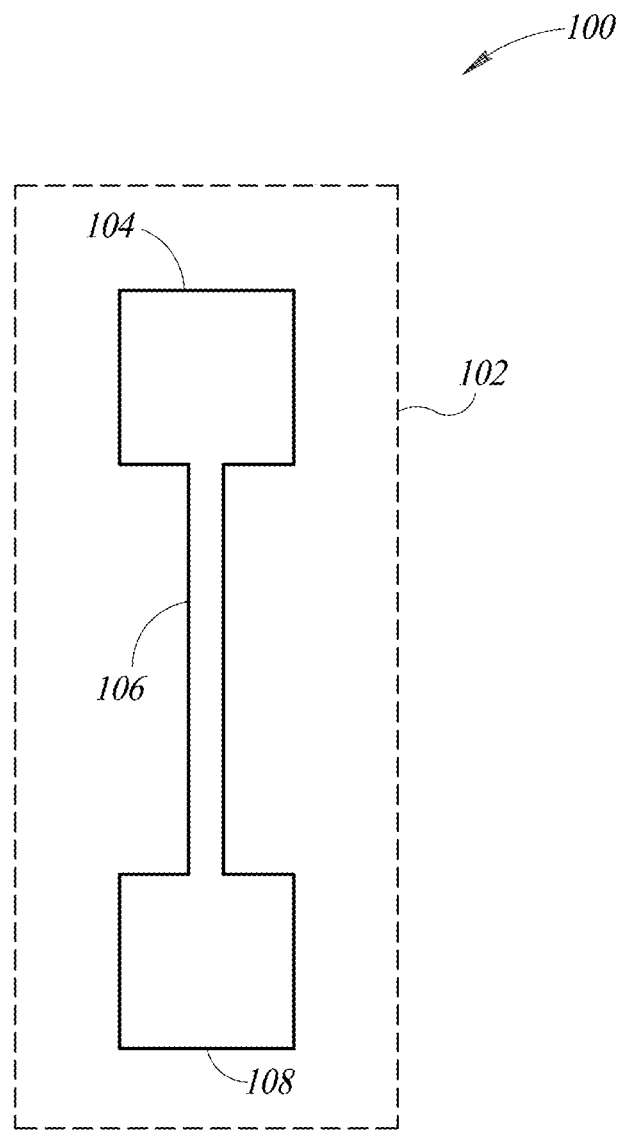
FIG. 1 is an illustration of one example of the present technology.

Referring now to the drawings, wherein like reference numerals designate corresponding structure throughout the views.

Embodiments of the present technology involve systems and methods for separating biological material from a sample via magnetic beads and electric fields. Embodiments of the technology are well suited for use with complex samples, such as blood, that comprise nucleic acid, generally in the form of deoxyribonucleic acid (DNA) and/or ribonucleic acid (RNA).

FIG. 1 illustrates a system 100 for Magneto electrophoretic separation to purify nucleic acids. This example utilizes a microfluidic chip 102, which includes a first well or reservoir 104, a microchannel 106 and a second well or reservoir 108. While the first and second wells 104, 108 are illustrated as square-shaped, it will be understood by those of skill in the art that they can comprise virtually any desired shape, such as, round or oval, etc.

In one example, the first well 104 may be provided having a diameter of approximately 2 mm. Additionally, in one example, the microchannel 106 may be approximately 2-3 cm in length, have a depth of approximately 100 pm, and be approximately 50-200 pm wide.

Figure 2:
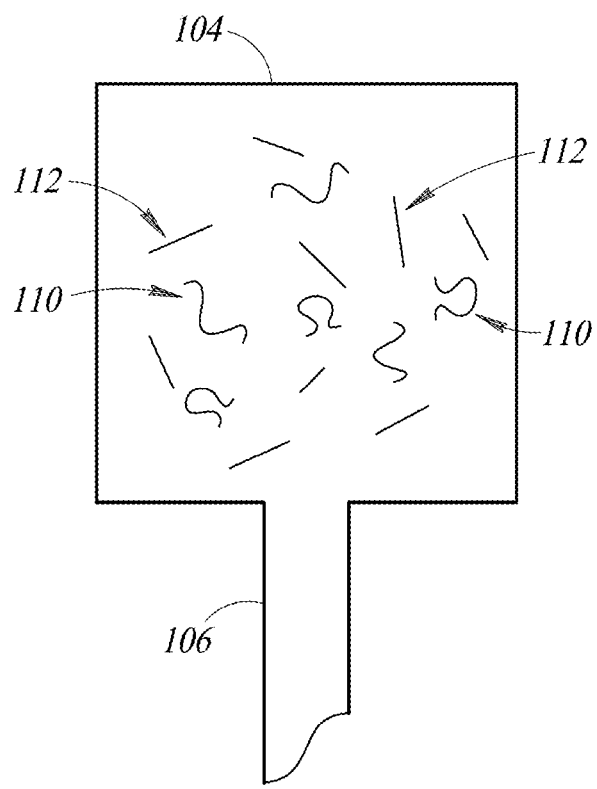
FIG. 2 is an enlarged view according to FIG. 1 including a biological sample to be purified.
Figure 3:
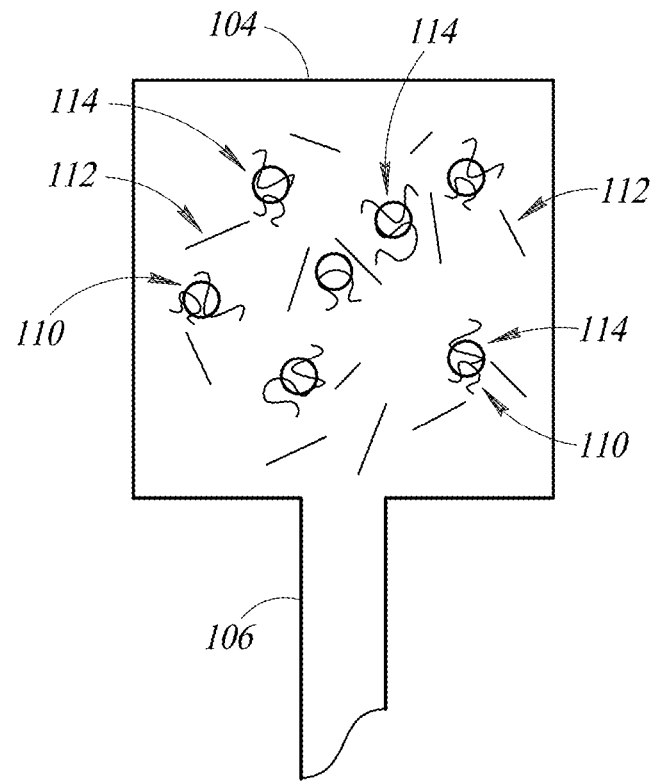
FIG. 3 is a view according to FIG. 2 with magnetic beads, which function to attract target molecules.

Turning now to FIGS. 2 and 3, first well 104 is illustrated with a biological sample therein comprising both target molecules 110 and contaminates 112. It will be noted that the biological sample may comprise blood and the first well 104 is provided with a fluid or buffer into which the biological sample is placed.

Magnetic beads 114, such as M-PVA Magnetic Beads (FIG. 3), are then introduced into the first well 104. The magnetic beads 114 are conjugated to collect target molecules, such as, nucleic acids from a complex sample like blood. As shown in FIG. 3, the target molecules 110 are drawn to the magnetic beads 114 while the contaminates 112 are not. This results in the target molecules 110 clustering around the individual magnetic beads 114 as illustrated.

In some examples, the biological sample can be gently magnetically stirred, for example, when the magnetic beads are placed into the biological sample to ensure mixing of the sample for proper adhesion of the target molecules. Likewise, it is contemplated that the biological sample can be heated locally.

Figure 4:
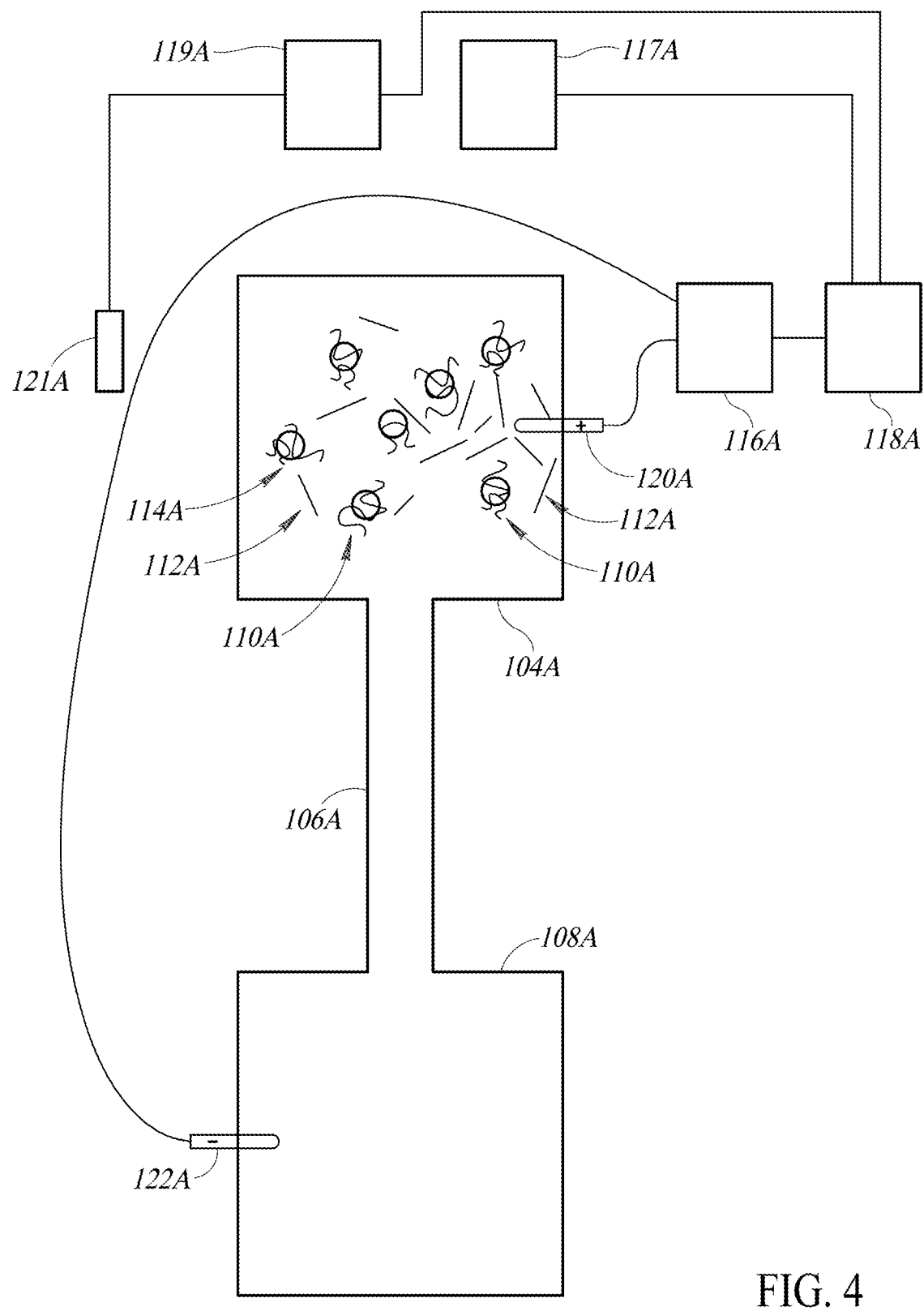
FIG. 4 is a view according to FIG. 3 with electrodes applying an electric field to the biological sample, which functions to attract contaminates.
Figure 5:
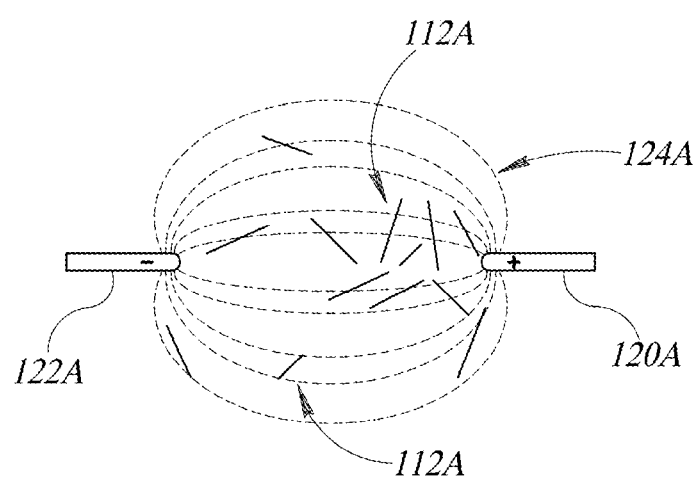
FIG. 5 is an illustration of the electric field that interacts with the contaminates.

FIGS. 4 and 5 illustrate and example of the system 100a that includes the use of a source of electrical energy 116a that is controlled by a controller 118a. The controller 118a may be any type of computer that is programmed to control the voltage source 116a as desired.

It is contemplated that the controller 118a could also control a magnetic stirrer 117a and a heater 119a. The heater could comprise, for example, a resistive metal coating. The resistive metal coating could be Indium Tin Oxide (ITO) lining the well or reservoir. While the heater 119a is shown outside of the well, it will be understood that the coating could line the inside or outside of the well. Likewise, the controller 118a could provide direct control to the metal coating, or an intermediate controller could be provided that is adapted to apply a 0-12 volts signal to the heater. It should further be understood that a temperature sensor 121a could be provided to give feedback information to maintain the temperature at a set point. While the various parts and components are illustrated with connecting lines to indicate a connection, it should be understood that these are only diagrammatic and the connections could comprise hardwired connections or wireless connections.

Also included in FIG. 4 is a first probe 120a that is configured to have a positive charge and a second probe 122a that is configured to have a negative charge. The magnitude of the voltage differential developed between the first and second probe 120a, 122a is dependent on the source of electrical power.

As illustrated in FIG. 5, an electric field 124a is generated between the first and second probes 120a, 122a. The electric field is illustrated with forces lines (shown as dashed lines), which interact with the negatively charged contaminates 112a. The electric field 124a is generated to relatively strongly interact with the negatively charged contaminates 112a, but essentially does not interact with the magnetic beads 114a or the target molecules 110a.

Figure 6:
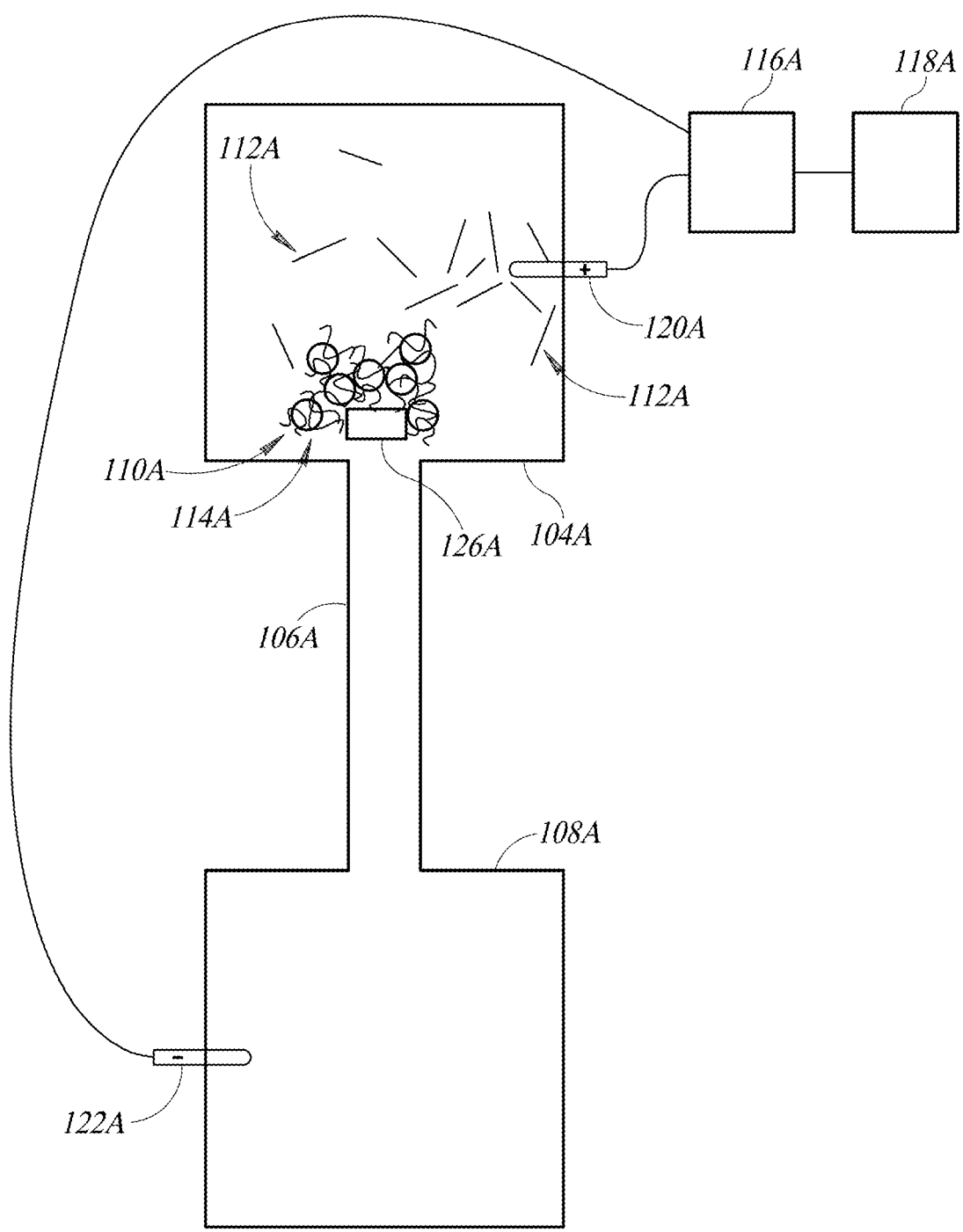
FIG. 6 is a view according to FIG. 4 with a magnet introduced into the vicinity of the magnetic beads that functions to attract the beads.

FIG. 6 illustrates the introduction of a magnet 126a that is introduced into the vicinity of the first well 104a. The magnet 126a is designed to attract the magnetic beads 114a. In one example the magnet 126a may be positioned at one end of the first well 104a and moved across the first well 104a toward the microchannel 106a such that the magnetic beads 114a and the associated target molecules 110a are moved toward the microchannel 106a. However, it will be understood by those of skill in the art that the electric field 124a will function to hold the negatively charged contaminates 112a in place due to the interaction with the electric field 124a.

As is illustrated in FIG. 6, the magnet 126a and the magnetic beads 114a are moved toward the microchannel 106a, but most of the contaminates 112a are left behind in the first well 104a. It is noted, however, that a small number of contaminates 112a might be pulled along with the target molecules 110a toward the microchannel.

It should further be noted that the movement of the magnet 126a may be controlled by controller 118a and may comprise fully automatic motion according to a software program. The movement could be simply linear, or any combination of complex movement that may be programmed.

Figure 7:
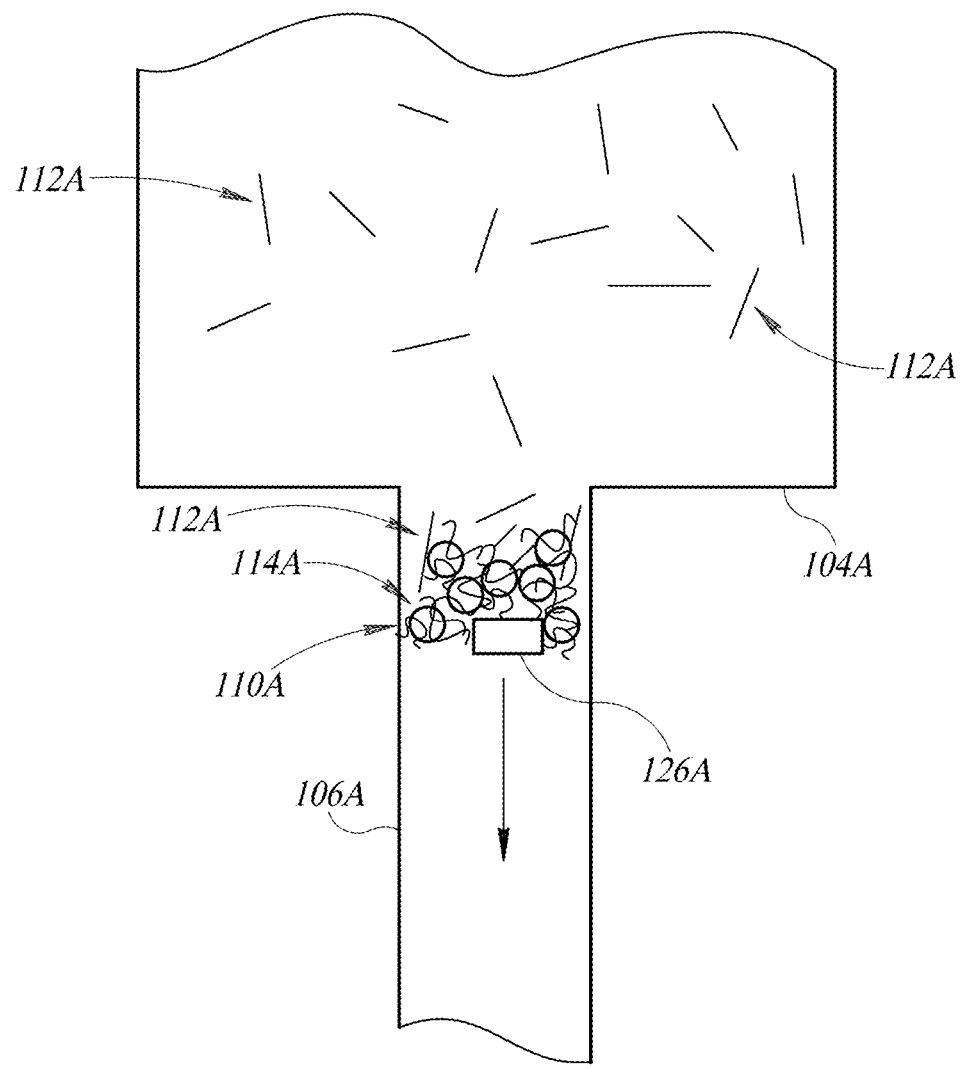
FIG. 7 is a view according to FIG. 6 where the magnetic beads are moved into the microchannel.
Figure 8:
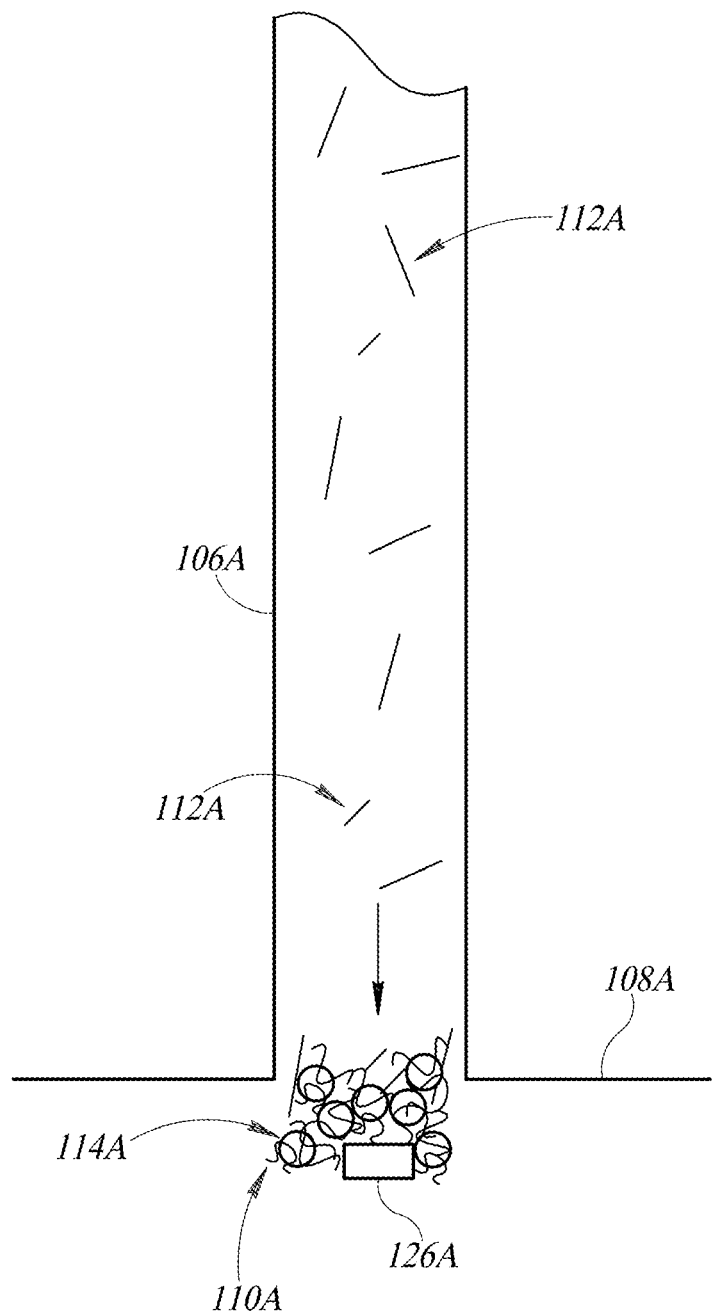
FIG. 8 is a view according to FIG. 7 where the magnetic beads are moved through the microchannel and into the second well.

FIG. 7 illustrates the magnet 126a moving into microchannel 106a with the magnetic beads 114a and target molecules 110a being pulled along. The microchannel 106a will be filled with a fluid (e.g., a buffer) such that the relatively rapid movement of the magnetic beads 114a through the fluid (e.g., on the order of millimeters/second) will result in any contaminates 112a that were pulled along with the target molecules 110a to be shed within the microchannel. This is illustrated in FIG. 8, which shows the magnet 126a moving through the opposites end of the microchannel and into the second well 108a.

At this point, any of the contaminates 112a that may have been pulled along with the target molecules 110a have been left behind in the fluid in the microchannel 106a.

Figure 9:
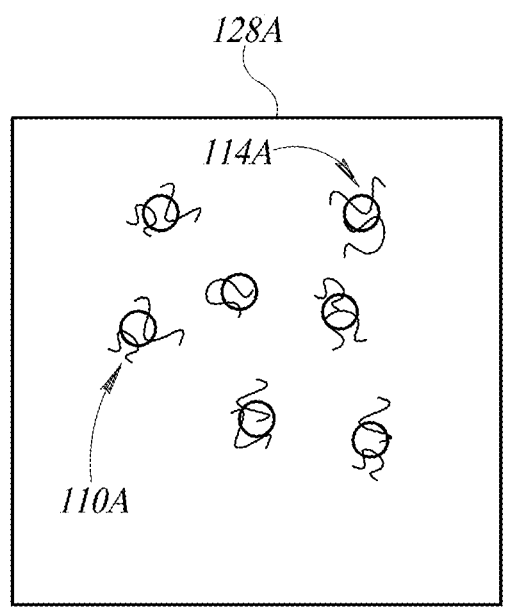
FIG. 9 is view of the purified biological sample according to FIG. 8.

The magnet 126a may then be moved into the second well 108a in any motion or series of movements as desired and programmed into the controller 118a. The magnetic beads 114a may then be removed from the fluid in the second well 108a and placed into a separate container 128a (FIG. 9). The magnetic beads 114a can then be de-tuned such that the target molecules 110a are no longer drawn toward the magnetic beads 114a, which can then be removed from the container 128a.

The result is a container 128a including a buffer solution and the target molecules 110a that are essentially free from contaminates 112a. The process is simply and easy to perform without the need for expensive or highly sophisticated equipment.

Figure 4A:
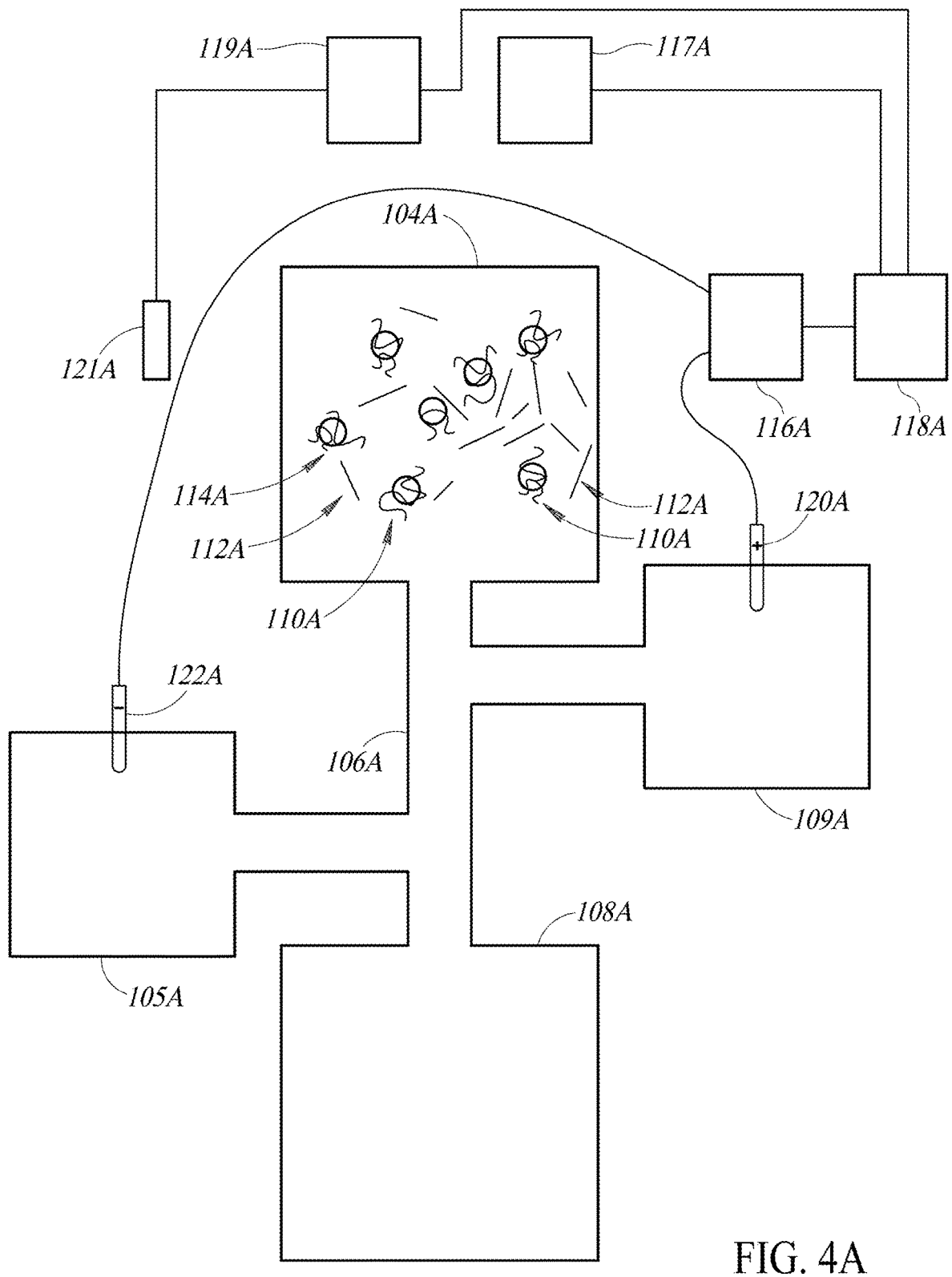
FIG. 4A is a view similar to that shown in FIG. 4, but wherein the electrodes are disposed in different wells than is shown in FIG. 4.

Referring now to FIG. 4A, the system shown therein is substantially similar to and operates in a similar fashion as does the system shown in FIG. 4, with the exception that rather than the first and second probes 120a, 122a being disposed in the first and second wells 104a, 108a, the first and second probes 120a, 122a are disposed in separate third and fourth wells 105a, 109a, which are also in communication with the microchannel 106a. With this configuration, the magnet 126a draws the material from the first well 104a to the second well 108a (as described above), and the presence of third and fourth wells 105a, 109a with the probes disposed therein 120a, 122a generate the electric field 124a across the microchannel 106a that the magnetic beads 114a traverse.

In this way, and in a manner similar to that discussed above, the microchannel 106a will be filled with a fluid (e.g., a buffer) such that the relatively rapid movement of the magnetic beads 114a through the fluid (e.g., on the order of millimeters/second) will result in any contaminates 112a that were pulled along with the target molecules 110a to be shed within the microchannel 106a. Thus, as with the previous example, the microchannel 106a provides for the relative motion of liquid via bead motion and an electric force via applied electric field to purify the samples.

Figure 10:
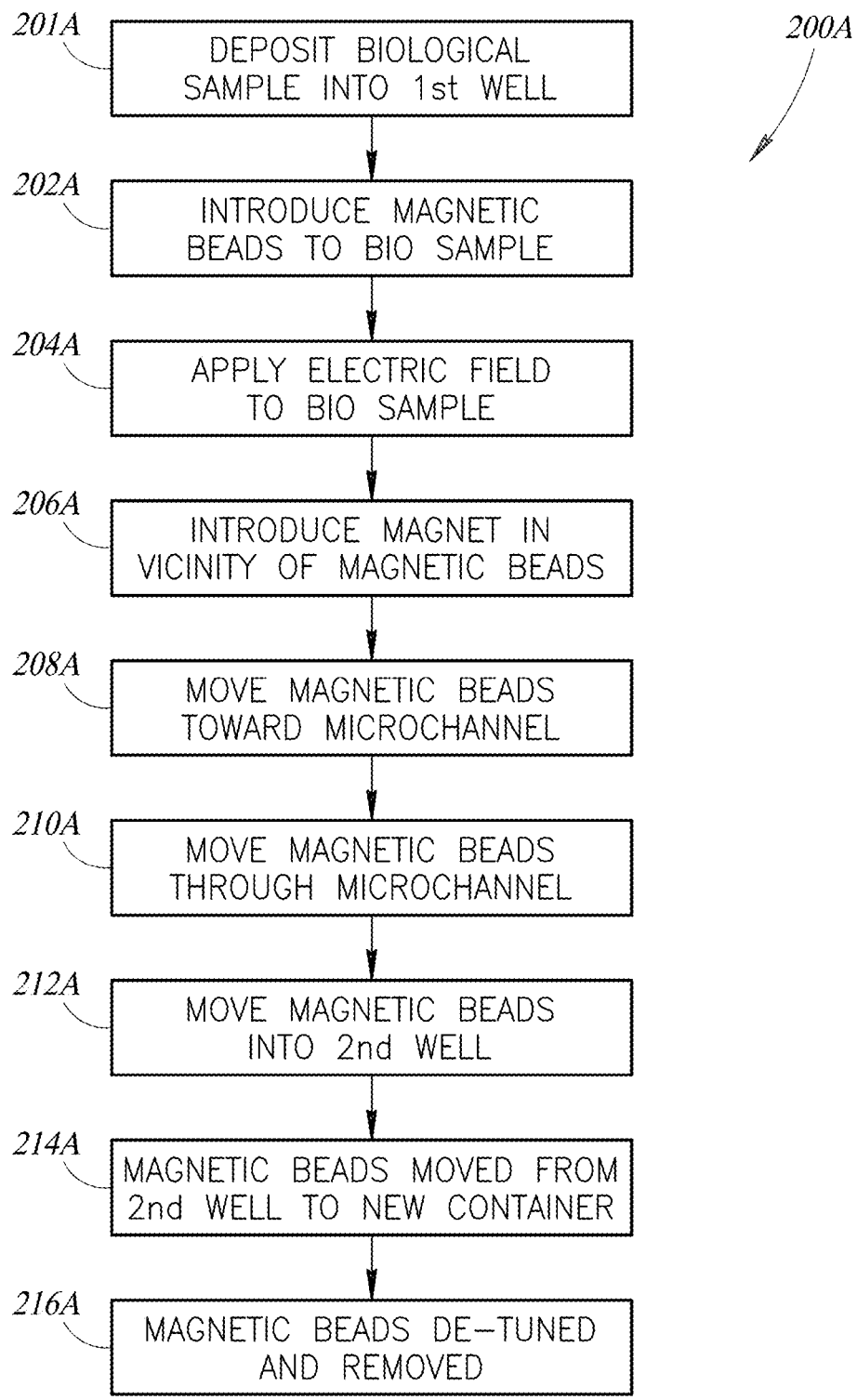
FIG. 10 is a flow diagram showing the sequence of operation of the technology according to FIGS. 1-8.

Turning now to FIG. 10, a flow diagram of the process 200a is provided. Initially, a biological sample to be purified is deposited into a well 201a, which may comprise a lab on a chip. Next, the magnetic beads are introduced into the biological sample 202a contained in the first well. As stated previously, in one example, the magnetic beads can be M-PVA Magnetic Beads that are tuned to attract target molecules. Still further, the target molecules can be nucleic acids. The magnetic beads are then maintained in the biological sample for a time period (an "incubation" period) to allow for attraction of the target molecules. In one example, the time period could be, for example, less than one minute.

The incubation period could further be supplemented with period mixing or stirring of the biological sample, which will further assist in the binding of target molecules. In one example, a magnetic stirrer can be used inside the wells/reservoirs for gentle mixing, in order to, for example, increase the bead/molecule interaction rate and thus reduce overall time for identical binding efficiency.

One of the benefits of these process steps is that the capture/binding of the target molecules occurs in the well/reservoir, so that the method uniquely processes a large amount of sample for rapid separation. Previously known methods must employ multiple washes per sample, whereas embodiments of the present method can remove bead-bound molecules from all superfluous molecules in one step on the timescale of single minutes. This allows for an increased throughput capacity.

Once the selected time period has elapsed, an electric field can be applied to the biological sample 204a. This can be accomplished by the application of leads coupled to a source of electrical power. It will be understood by those of skill in the art that the application of an electric field will also generate a magnetic field. The contaminates in the biological sample are negatively charged and will interact with the electric field, which functions to "hold" or maintain those contaminates within the electric field.

With the contaminates being held within the electric field, a magnet is then brought in proximity of the magnetic beads 206a. The magnet will function to attract the magnetic beads such that, as the magnet is moved in the vicinity of the first well, the magnetic beads will be drawn along with the movement of the magnet. The movement of the magnet may be fully automated and can move in a preprogrammed manner.

The magnet may then be moved so as to draw the magnetic beads toward a microchannel connected to the first well 208a. It will be understood that the electric field will be applied at this time such that, while the magnetic beads are moving toward the microchannel, contaminates are interacting with the electric field such that they are held in place within the fluid in the first well. This effectively allows the magnetic beads with the attracted target molecules to move away from the majority of contaminates.

The magnet then moves such that the magnetic beads are drawn into and move through the microchannel 210a. This can be done at a relatively fast rate, such as, for example, on the order of millimeters/second. Since there is a fluid (buffer) in the microchannel, the movement of the magnetic beads through the fluid will function to shed any unwanted contaminates that were inadvertently pulled along with the target molecules from the first well.

The magnet then continues to draw the magnetic beads into a second well 212a that is positioned at an opposite end of the microchannel. The result is a purified biological sample in which only the target molecules have been moved into the second well on the lab on a chip.

Another benefit to the above-described process is that it allows for high efficiency separation without requiring the use any membrane or pumps. This is advantageous for resource limited settings.

From this point, the purified biological sample (e.g., the targeted nucleic acids) can then be removed from the second well and placed into a container 214a, after which the magnetic beads can be de-tuned such that the target molecules become unbound from the magnetic beads 216a. Finally, the magnetic beads can be removed from the container and discarded.

At this point, the purified target molecules are located in a separate container and are ready for downstream processes. It should be noted that the steps of removing the purified biological sample from the second well is optional. For example, the first well could be drained and the purified sample in the second well could be ready for amplification/detection on chip. Alternatively, the purified biological sample could be ready for amplification/detection off chip in the separate container.

Figure 11:
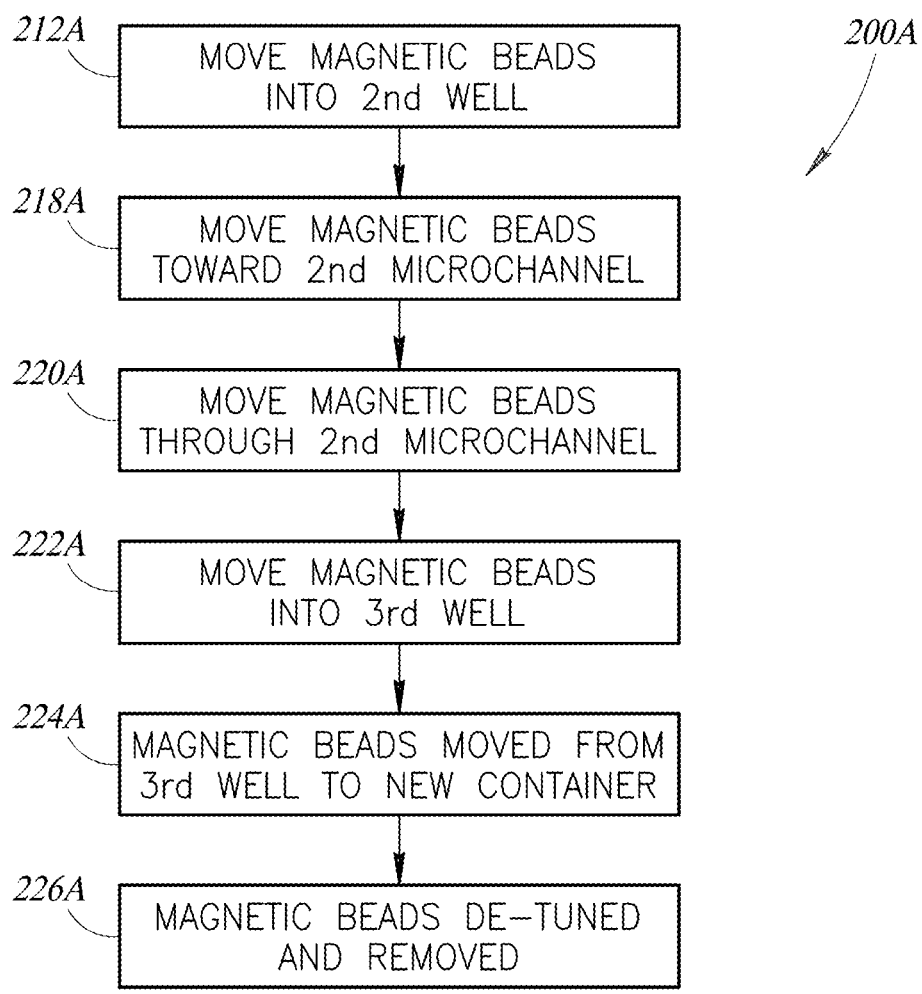
FIG. 11 is a flow diagram illustrating additional further steps according to FIG. 10.

FIG. 11 shows an alternate example that includes some additional process steps if enhanced purification is desired. For example, at step 212a, rather than removing the magnetic beads with the associated target molecules, it is contemplated that the system could comprise a second microchannel and a thirst well. In this example, the magnet is moved toward the second microchannel 218a and moved through the second microchannel 220a. This movement can be done relatively rapidly as was discussed in connection with the movement through the first microchannel. Likewise, the movement of the magnet can be fully automated where the magnet is moved according to a preprogrammed software program.

The magnetic beads can then be moved into a third well 222a positioned at an opposite end of the second microchannel where the magnetic beads can then be removed and placed into a new container 224a. As described previously, the magnetic beads can then be de-tuned and removed 226a.

In other examples, the fluid provided in the second well can be such that the volume creates a flow of fluid from the second well to the first well, which functions to carry any contaminates or unbound molecules into the first well. In examples that utilized a second microchannel and a third well, the fluid can be provided such that the volume provided in the third well creates a flow from the third well to the second well and from the second well to the first well. This flow of fluid, combined with the relatively rapid movement of the magnetic beads through the microchannel(s) functions to remove even more unbound molecules that may have inadvertently been drawn out of the first well.

In other examples, the method could further provide for local heating of the biological samples, in order, for example, to allow for thermal-driven processes, such as PCR (Polymerase chain reaction). This could be provided by applying 0-12 Volts to Indium Tin Oxide (ITO), which comprises a resistive metal coating. The heating could maintain temperatures locally for the sample without overheating other regions of the chip.

It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

Figure 12:
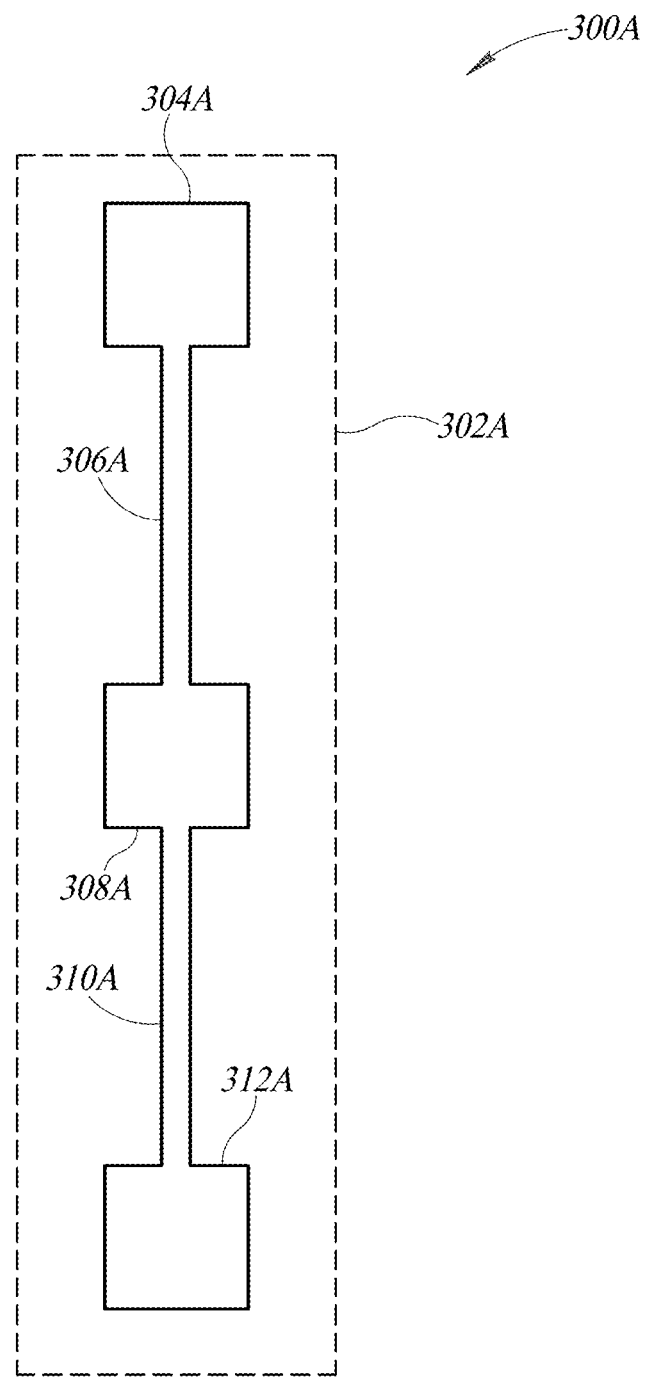
FIG. 12 is view according to FIG. 11.

Turning now to FIG. 12 an alternative example is illustrated for the lab on a chip for Magneto electrophoretic separation to purify nucleic acids. This example utilizes a microfluidic chip 302a, which includes a first well or reservoir 304a, a first microchannel 306a and a second well or reservoir 308*a*. The first microchannel 306*a* extends from the first well 304*a* to the second well 308*a*.

Additionally, this example utilizes a second microchannel 310*a* and a third well or reservoir 312*a*. The second microchannel 310*a* extends from the second well 308*a* to the third well 312*a*. As stated previously, while the first, second and third wells 304*a*, 308*a*, 312*a* are here illustrated as square-shaped, it will be understood by those of skill in the art that they can comprise virtually any desired shape, such as, round or oval, etc.

Polyethylene glycol (PEG), polyethylene oxide (PEO) or polyoxyethylene (POE) refer to an oligomer or polymer of ethylene oxide. The structure of PEG is commonly expressed as H-(0-CH2—CH2)n—OH. PEG is a liquid and is referred to herein as a gel. Different forms of PEG are also available, depending on the initiator used for the polymerization process. One common initiator is a monofunctional methyl ether PEG, or methoxypoly (ethylene glycol), which is abbreviated mPEG. Lower-molecular-weight PEGs are also available as purer oligomers, referred to as monodisperse.

Figure 13:
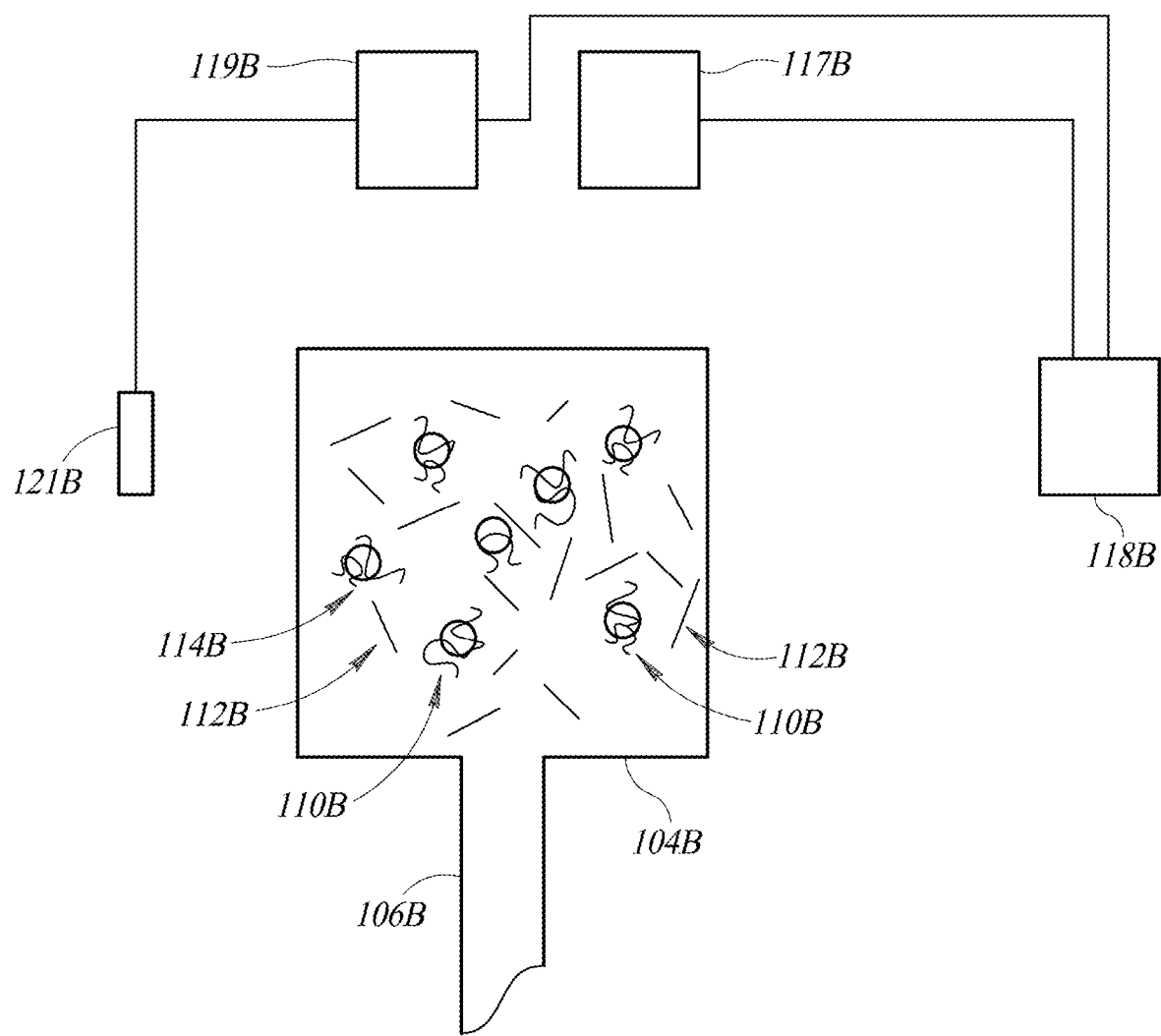
FIG. 13 is a view according to FIG. 3 with a controller, a stirrer, a heater and a temperature sensor.

FIG. 13 illustrates an example of the system 100*b* that includes a controller 118*b*. The controller 118*b* may be any type of computer that is programmed to control equipment used in connection with the microchip. It is contemplated that the controller 118*b* could control a magnetic stirrer 117*b* and a heater 119*b*. The heater could comprise, for example, a resistive metal coating. The resistive metal coating could be Indium Tin Oxide (ITO) lining the well or reservoir. While the heater 119*b* is shown outside of the well, it will be understood that the coating could line the inside or outside of the well. Likewise, the controller 118*b* could provide direct control to the metal coating, or an intermediate controller could be provided that is adapted to apply a 0-12 volts signal to the heater. It should further be understood that a temperature sensor 121*b* could be provided to give feedback information to maintain the temperature at a set point. While the various parts and components are illustrated with connecting lines to indicate a connection, it should be understood that these are only diagrammatic and the connections could comprise hard-wired connections or wireless connections.

Figure 14:
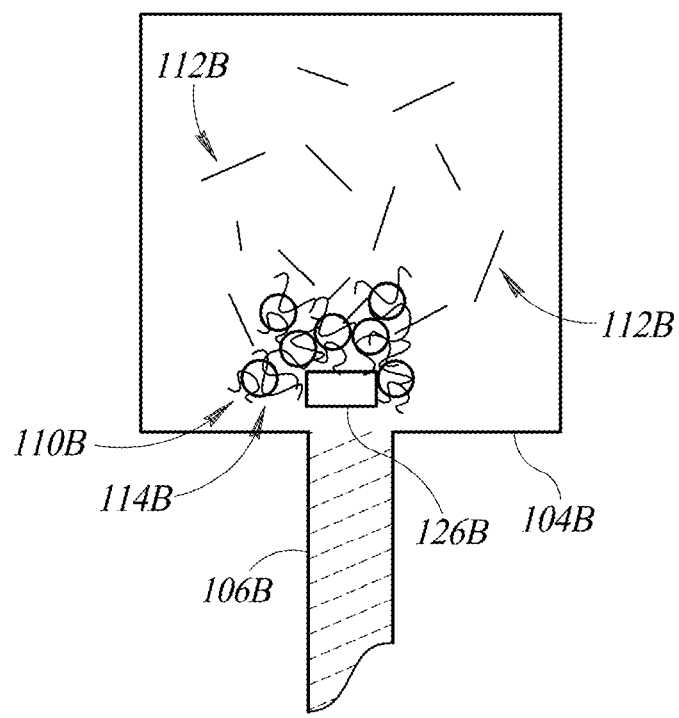
FIG. 14 is a view according to FIG. 13 with a magnet introduced into the vicinity of the magnetic beads that functions to attract the beads.

FIG. 14 illustrates the introduction of a magnet 126*b* that is introduced into the vicinity of the first well 104*b*. The magnet 126*b* is designed to attract the magnetic beads 114*b*. In one example the magnet 126*b* may be positioned at one end of the first well 104*b* and moved across the first well 104*b* toward the microchannel 106*b* such that the magnetic beads 114*b* and the associated target molecules 110*b* are moved toward the microchannel 106*b*.

The magnet 126*b* and the magnetic beads 114*b* are moved toward the microchannel 106*b* leaving some of the contaminates 112*b* behind in the first well 104*b*. It is noted, however, that a number of contaminates 112*b* may be pulled along with the target molecules 110*b* toward the microchannel.

It should further be noted that the movement of the magnet 126*b* may be controlled by controller 118*b* and may comprise fully automatic motion according to a software program. The movement could be simply linear, or any combination of complex movement that may be programmed.

Figure 15:
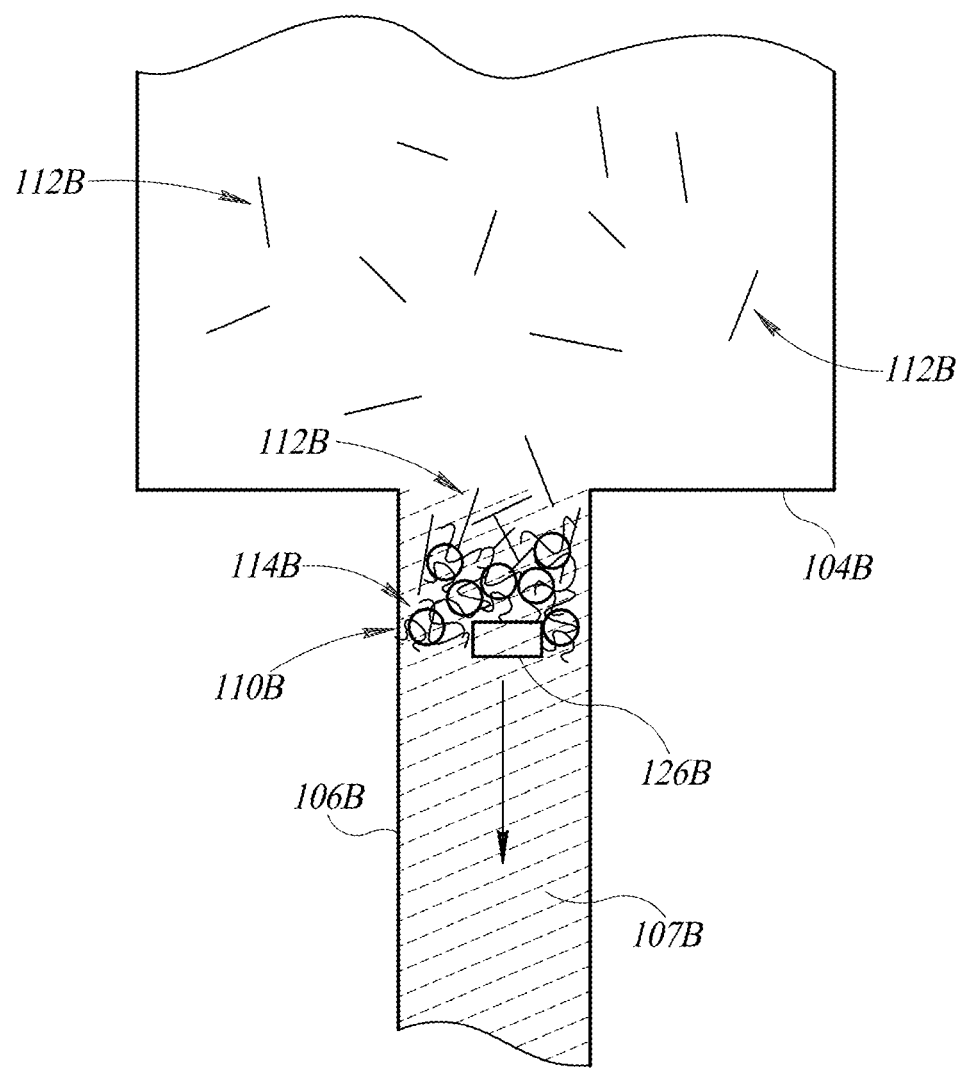
FIG. 15 is a view according to FIG. 14 where the magnetic beads are moved into the microchannel.

FIG. 15 illustrates the magnet 126*b* moving into microchannel 106*b* with the magnetic beads 114*b* and target molecules 110*b* being pulled along. The microchannel 106*b* will be filled with a gel 107*b* (e.g., PEG), which is illustrated as a dashed line in microchannel 106*b*. The negatively charged contaminates 112*b* interact with the gel 107*b* such that the contaminates 112*b* are held in place within the gel 107*b* as the magnetic beads 114*b* and target molecules 110*b* advance through the microchannel 106*b*.

Figure 16:
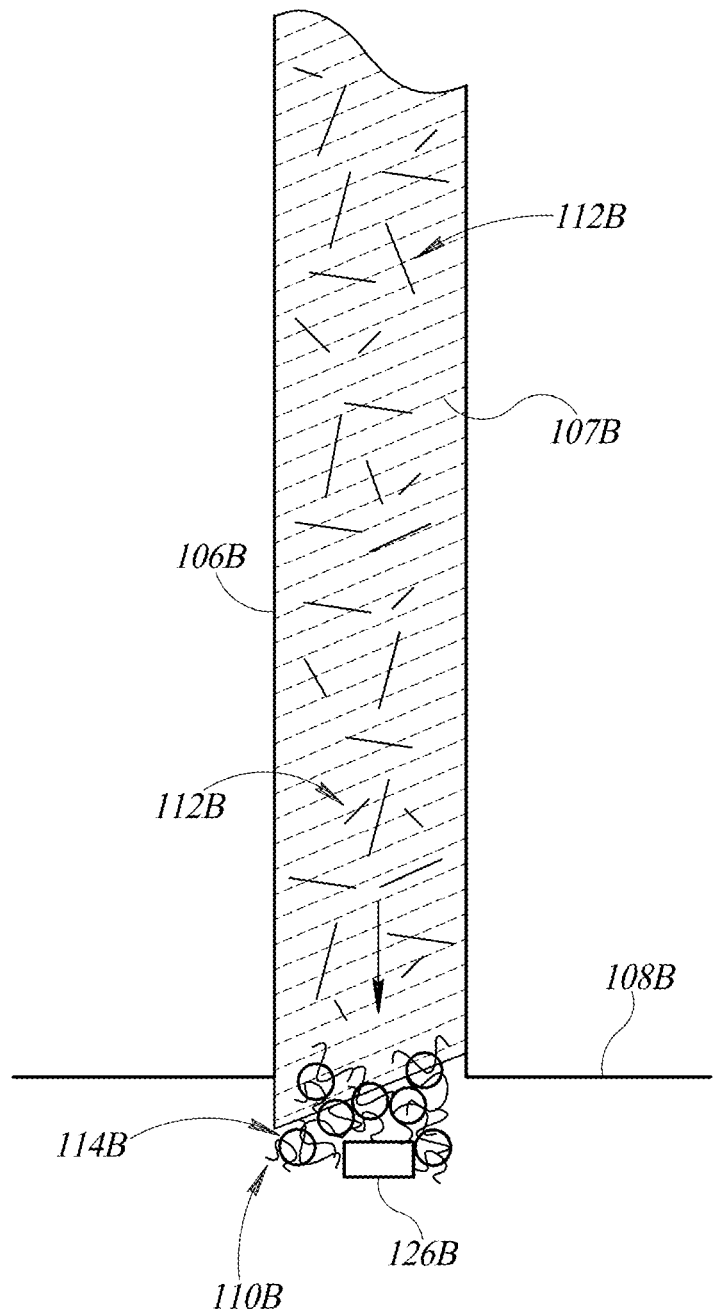
FIG. 16 is a view according to FIG. 15 where the magnetic beads are moved through the microchannel and into the second well.

In one example, the movement of the magnetic beads 114*b* through the gel 107*b* is relatively rapid (e.g., one the order of millimeters/second), which results in any contaminates 112*b* that were pulled along with the target molecules 110*b* to be shed within the gel 107*b* within the microchannel 106*b*. This is illustrated in FIG. 16, which shows the magnet 126*b* moving through the opposite end of the microchannel and into the second well 108*b*.

At this point, at least a significant portion of the contaminates 112*b* that were pulled along with the target molecules 110*b* have been left behind in the gel 107*b* in the microchannel 106*b*.

Figure 17:
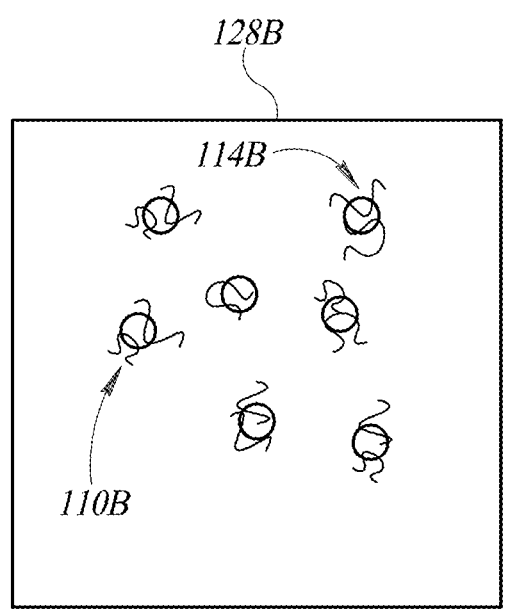
FIG. 17 is view of the purified biological sample according to FIG. 16

The magnet 126*b* may then be moved into the second well 108*b* in any motion or series of movements as desired and programmed into the controller 118*b*. The magnetic beads 114*b* may then be removed from the fluid in the second well 108*b* and placed into a separate container 128*b* (FIG. 17). The magnetic beads 114*b* can then be de-tuned such that the target molecules 110*b* are no longer drawn toward the magnetic beads 114*b*, which can then be removed from the container 128*b*.

The result is a container 128*b* including a buffer solution and the target molecules 110*b* that are essentially free from contaminates 112*b*. The process is simply and easy to perform without the need for expensive or highly sophisticated equipment.

Figure 18:
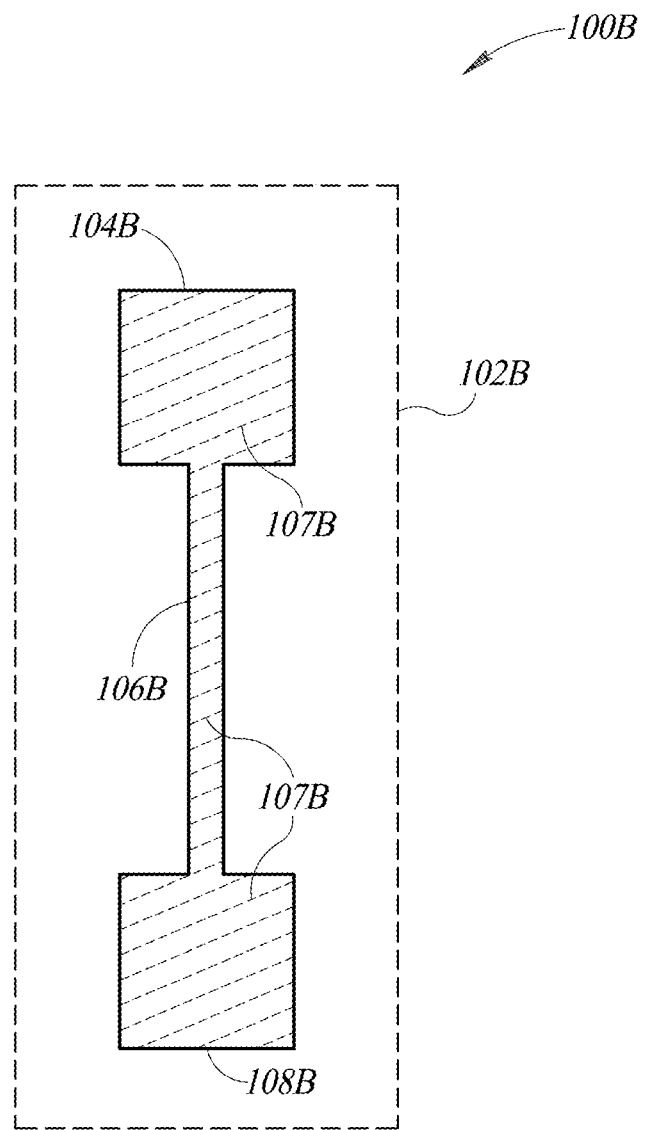
FIG. 18 is an illustration of one example of the present technology according to FIG. 1.

FIG. 18 illustrates the first well 104*b*, the microchannel 106*b* and the second well 108*b* all including the gel 107*b*. It should be noted that the gel 107*b* could be placed only in the microchannel. Alternatively, the gel 107*b* could be placed in both the microchannel 106*b* and the first well 104*b*. The idea is that the negatively charged contaminates 112*b* will interact with the gel 107*b* such that the contaminates will become held by the gel 107*b* allowing the magnetic beads 114*b* along with the target molecules 110*b* to be moved away from and separated from the contaminates 112*b*.

Figure 19:
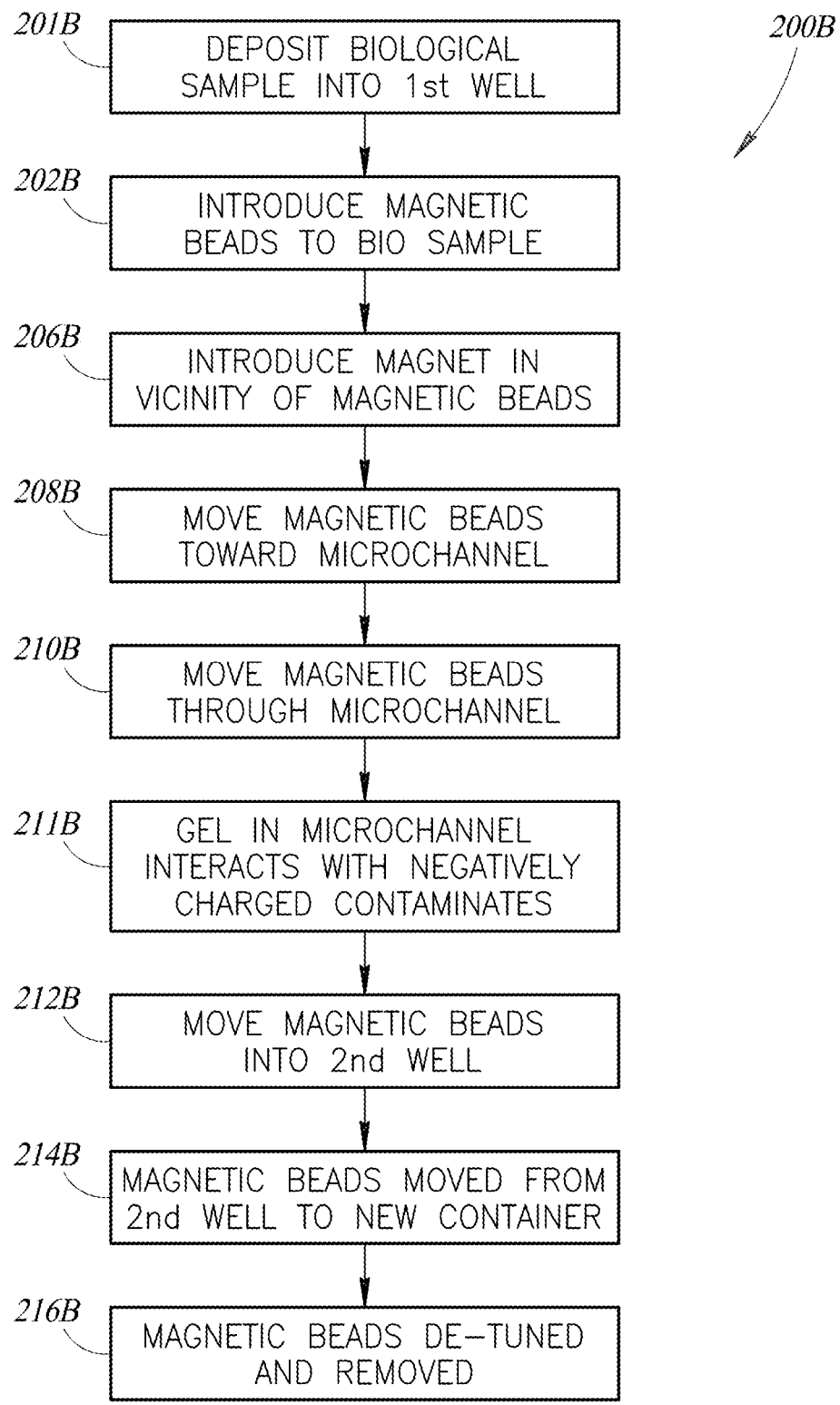
FIG. 19 is a flow diagram showing the sequence of operation of the technology according to FIGS. 1-3 and 13-17.

Turning now to FIG. 19, a flow diagram of the process 200*b* is provided. Initially, a biological sample to be purified is deposited into a well 201*b*, which may comprise a lab on a chip. Next, the magnetic beads are introduced into the biological sample 202*b* contained in the first well. As stated previously, in one example, the magnetic beads can be M-PVA Magnetic Beads that are tuned to attract target molecules. Still further, the target molecules can be nucleic acids. The magnetic beads are then maintained in the biological sample for a time period (an "incubation" period) to allow for attraction of the target molecules. In one example, the time period could be less than one minute.

The incubation period could further be supplemented with period mixing or stirring of the biological sample, which will further assist in the binding of target molecules. In one example, a magnetic stirrer can be used inside the wells/reservoirs for gentle mixing.

One of the benefits of these process steps is that the capture/binding of the target molecules occurs in the well/reservoir, so that the method uniquely processes a large amount of sample for rapid separation.

The next step is to place a magnet in proximity to the magnetic beads 206*b*. The magnet will function to attract the magnetic beads such that, as the magnet is moved in the vicinity of the first well, the magnetic beads will be drawn along with the movement of the magnet. The movement of the magnet may be fully automated and can move in a preprogrammed manner.

The magnet may then be moved so as to draw the magnetic beads toward a microchannel connected to the first well 208b. The magnet moves such that the magnetic beads are drawn into the microchannel 210b. It will be understood that the microchannel is filled with a gel, such as PEG, which will function to interact with negatively charged contaminates 211b. This interaction means that, as the magnet pulls the magnetic beads along the microchannel and therefore, through the gel, the negatively charged contaminates are shed within the gel in the microchannel. This functions to purify the sample as it moves through the microchannel.

It is further contemplated that the movement of the magnetic beads through the microchannel can be done at a relatively fast rate, such as, for example, on the order of millimeters/second. The movement of the magnetic beads through the gel will function to shed the unwanted contaminates not only due to the PEG interacting with the negatively charged contaminates, but also due to fluid resistance helping to shed contaminates that were pulled along with the target molecules from the first well.

The magnet then continues to draw the magnetic beads into a second well 212b that is positioned at an opposite end of the microchannel. The result is a purified biological sample in which only the target molecules have been moved into the second well on the lab on a chip.

Another benefit to the above-described process is that it allows for high efficiency separation without requiring the use any membrane or pumps. This is advantageous for resource limited settings.

From this point, the purified biological sample (e.g., the targeted nucleic acids) can then be removed from the second well and placed into a container 214b, after which the magnetic beads can be de-tuned such that the target molecules become unbound from the magnetic beads 216b. Finally, the magnetic beads can be removed from the container and discarded.

At this point, the purified target molecules are located in a separate container and are ready for downstream processes. It should be noted that the steps of removing the purified biological sample from the second well is optional. For example, the first well could be drained and the purified sample in the second well could be ready for amplification/detection on chip. Alternatively, the purified biological sample could be ready for amplification/detection off chip in the separate container.

Figure 20:
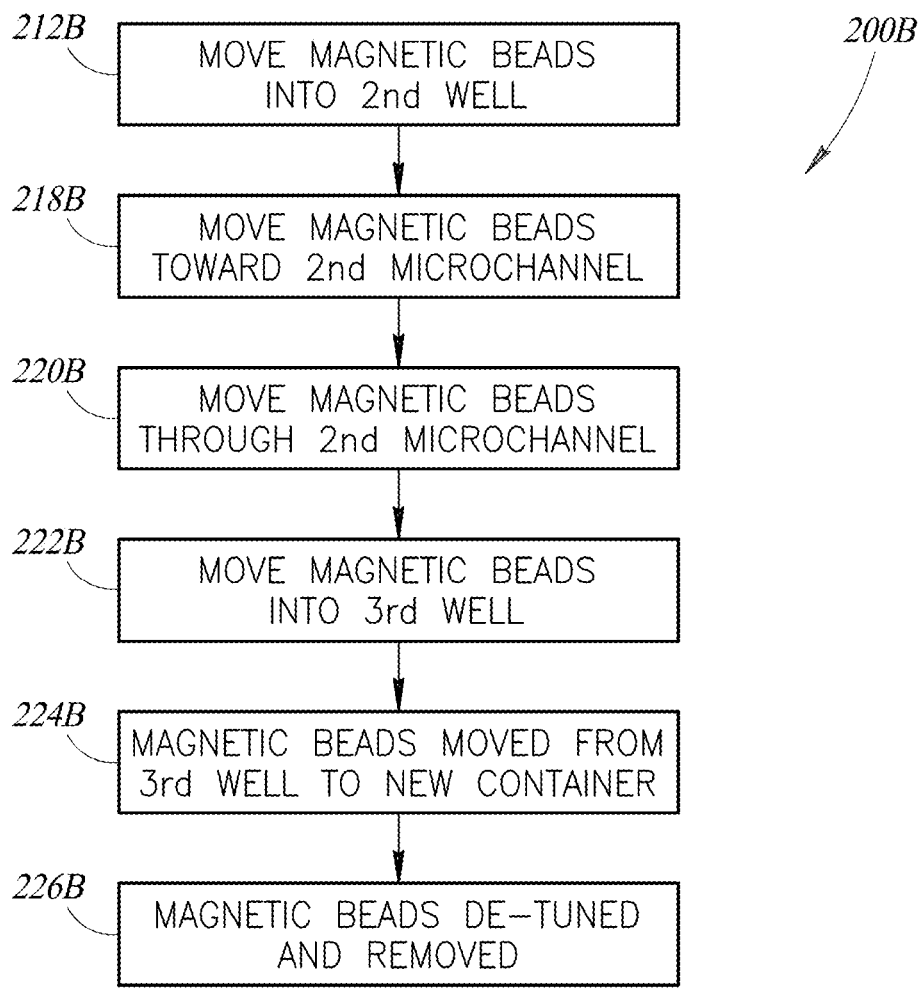
FIG. 20 is a flow diagram illustrating additional further steps according to FIG. 19.

FIG. 20 optional additional process steps if enhanced purification is desired. For example, at step 212b, rather than removing the magnetic beads with the associated target molecules, it is contemplated that the system could comprise a second microchannel and a third well. In this example, the magnet is moved toward the second microchannel 218b and moved through the second microchannel 220b. This movement can be done relatively rapidly as was discussed in connection with the movement through the first microchannel. Likewise, the movement of the magnet can be fully automated where the magnet is moved according to a preprogrammed software program.

The magnetic beads can then be moved into a third well 222b positioned at an opposite end of the second microchannel where the magnetic beads can then be removed and placed into a new container 224b. As described previously, the magnetic beads can then be de-tuned and removed 226b.

In other examples, the fluid provided in the second well could comprise a gel as illustrated in connection with FIG. 18. In one example, the gel can be provided such that the volume creates a flow of gel from the second well to the first well, which further functions to carry any contaminates or unbound molecules into the first well. In examples that utilize a second microchannel and a third well (FIG. 21), the gel can be provided such that the volume provided in the third well creates a flow from the third well to the second well and from the second well to the first well. This flow of gel, combined with the direct interaction of the contaminates with the gel and the relatively rapid movement of the magnetic beads through the microchannel(s) functions to remove even more unbound molecules that may have been drawn out of the first well.

In other examples, the method could further provide for local heating of the biological samples. This could be provided, for example, by applying 0-12 Volts to Indium Tin Oxide (ITO), which comprises a resistive metal coating. The heating could maintain temperatures locally for the sample without overheating other regions of the chip.

It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

Figure 21:
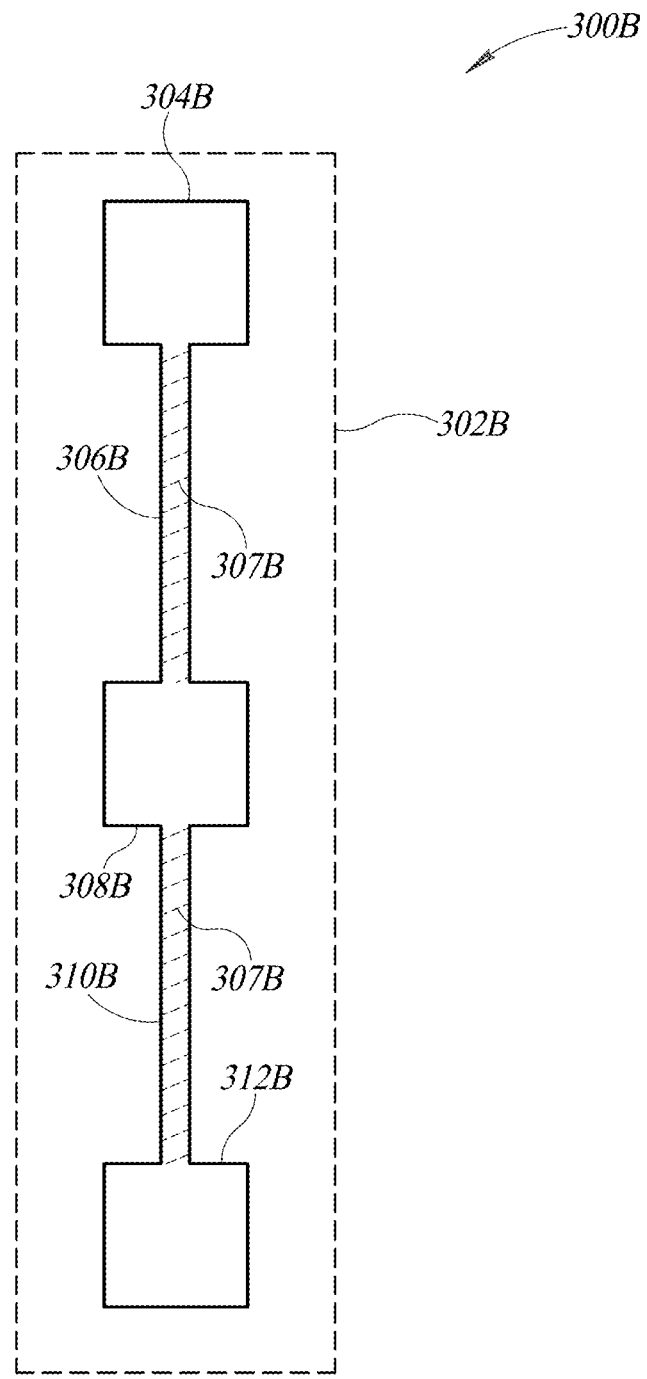
FIG. 21 is a view of a chip employing a method according to FIG. 20.

Referring now to FIG. 21 an example is illustrated for the lab on a chip for purification of nucleic acids employing a further optional enhanced purification process according to FIG. 20. This example utilizes a microfluidic chip 302b, which includes a first well or reservoir 304b, a first microchannel 306b and a second well or reservoir 308b. The first microchannel 306b extends from the first well 304b to the second well 308b.

Additionally, this example utilizes a second microchannel 310b and a third well or reservoir 312b. The second microchannel 310b extends from the second well 308b to the third well 312b. As stated previously, while the first, second and third wells 304b, 308b, 312b are here illustrated as square-shaped, it will be understood by those of skill in the art that they can comprise virtually any desired shape, such as, round or oval, etc.

A gel 307b is provided at a minimum in the first microchannel 306b. However, the gel 307b is also illustrated as optionally being in the second microchannel 310b. It should further be understood that the gel could be provided in any of the first, second or third wells 304b, 308b, 312b as desired. Likewise, the volume of gel 307b and placement can be selected to create a flow rate toward the first well 304b as desired.

Figure 22:
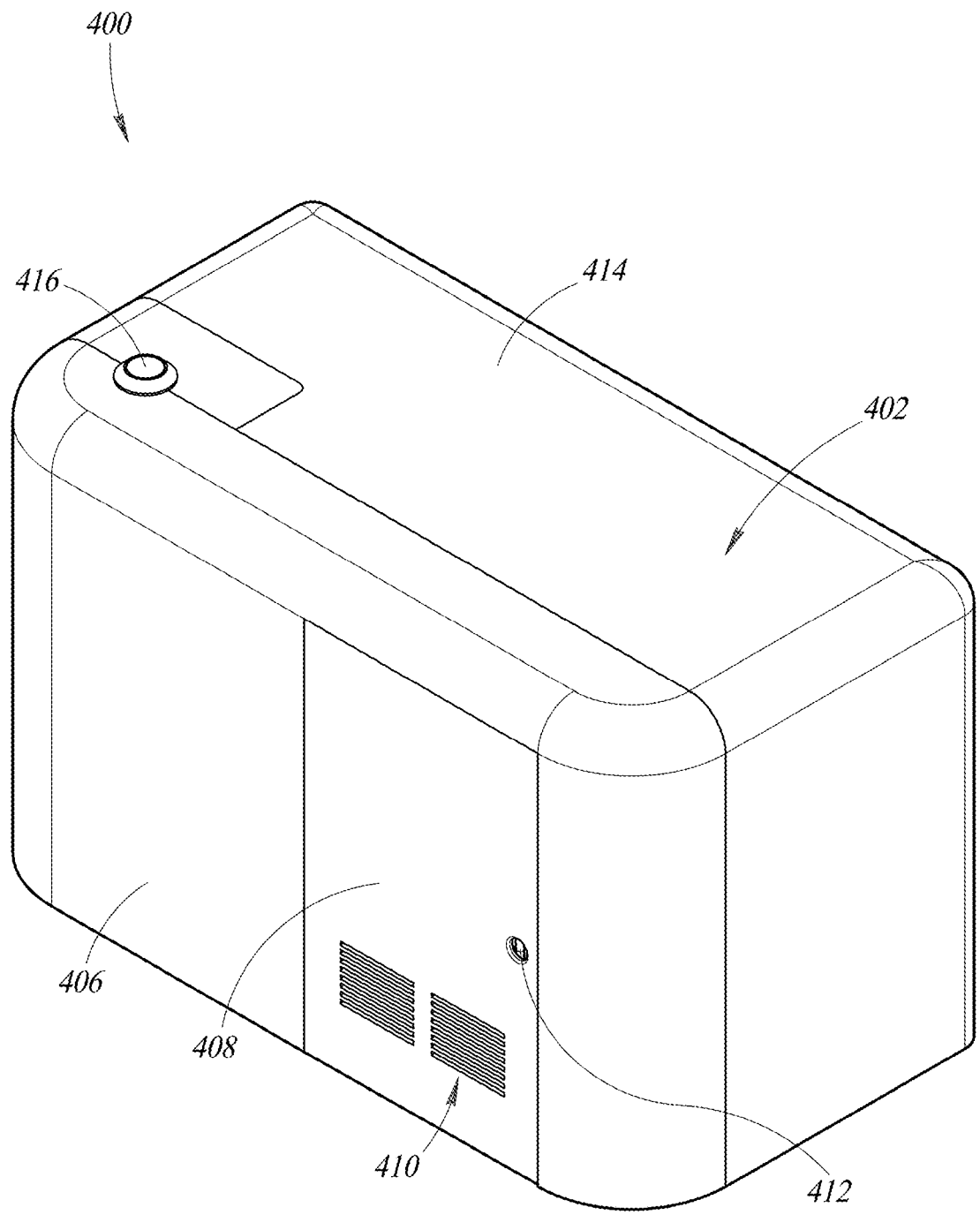
FIG. 22 illustrates a rear, top, and left side perspective view of a microfluidic system for processing biological samples.
Figure 23:
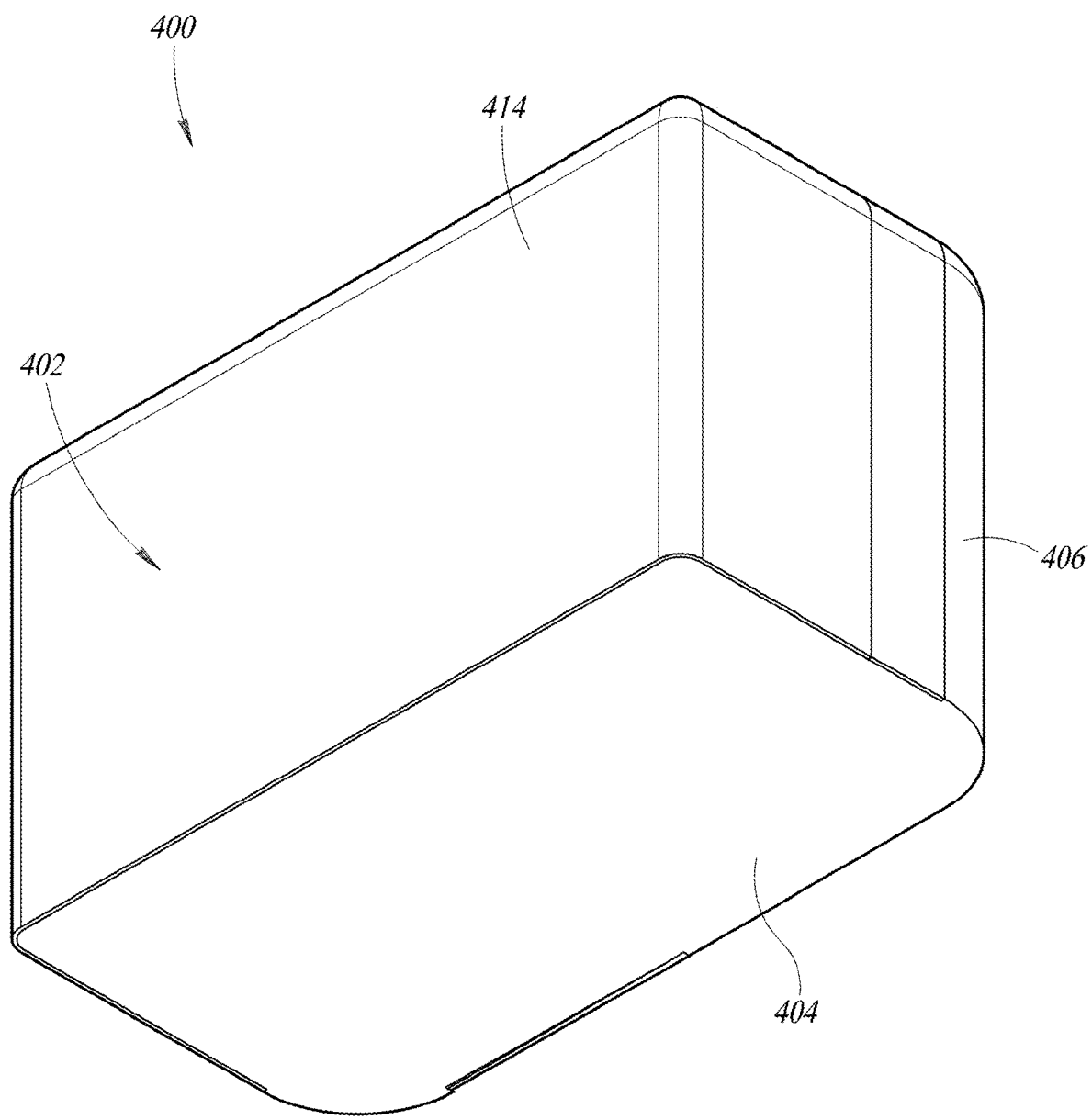
FIG. 23 illustrates a front, bottom, and right side perspective view of the microfluidic system of FIG. 22.
Figure 24:
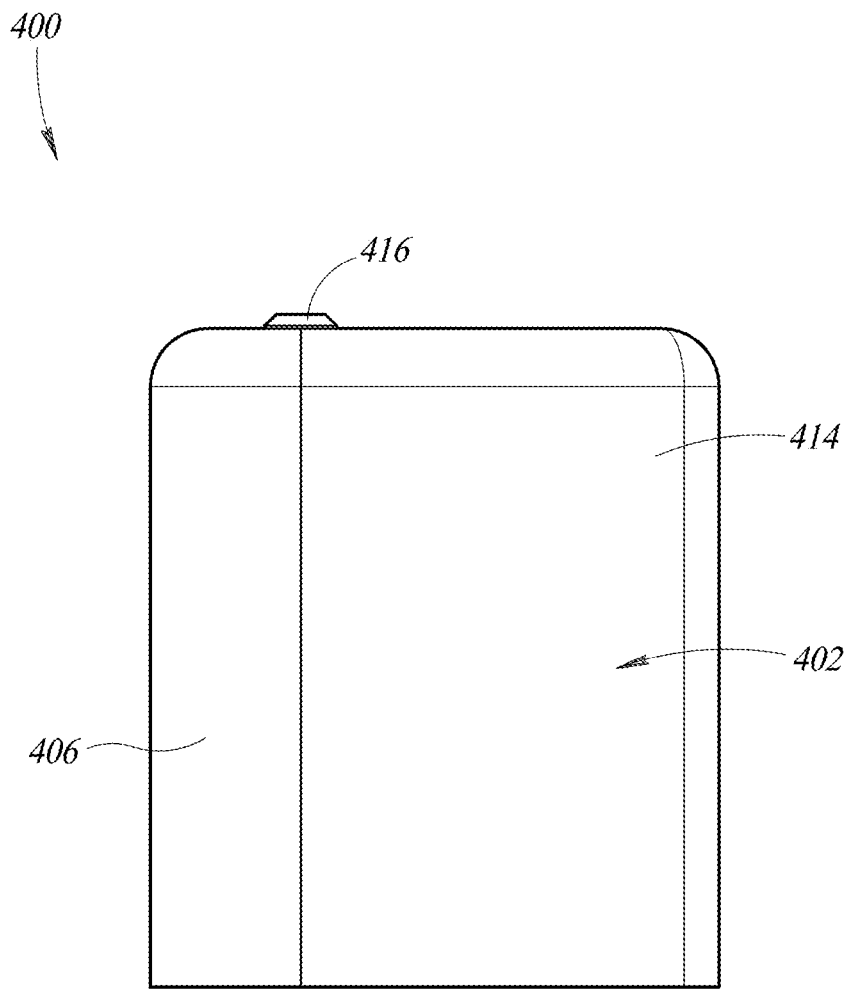
FIG. 24 illustrates a left side view of the microfluidic system of FIG. 22.
Figure 25:
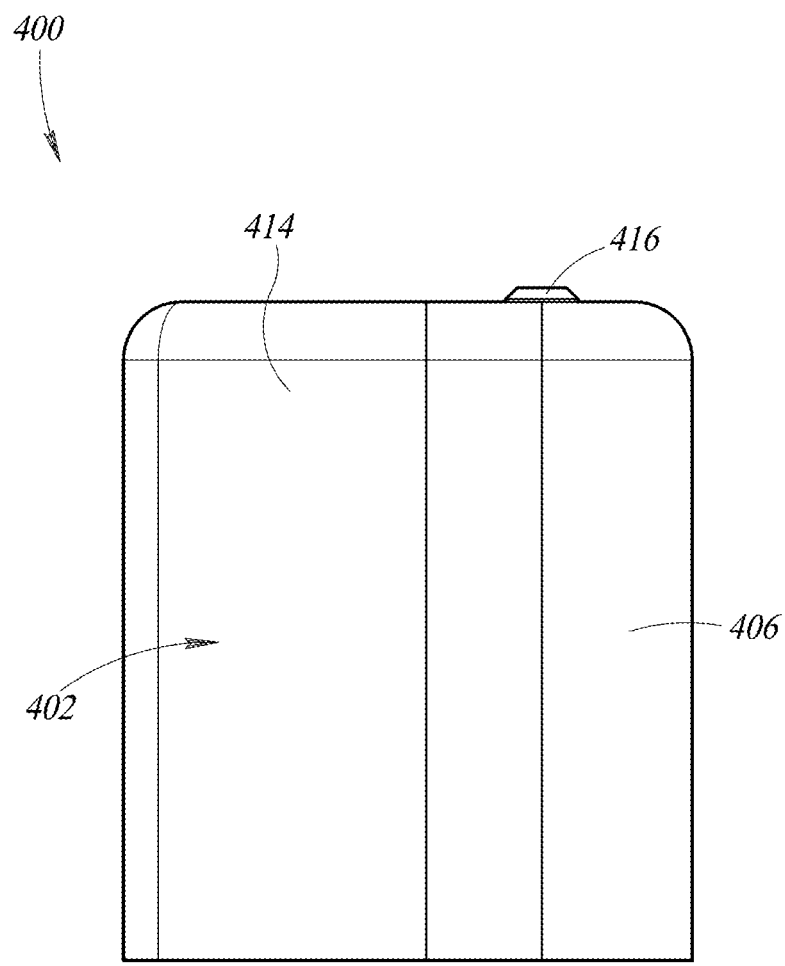
FIG. 25 illustrates a right side view of the microfluidic system of FIG. 22.
Figure 26:
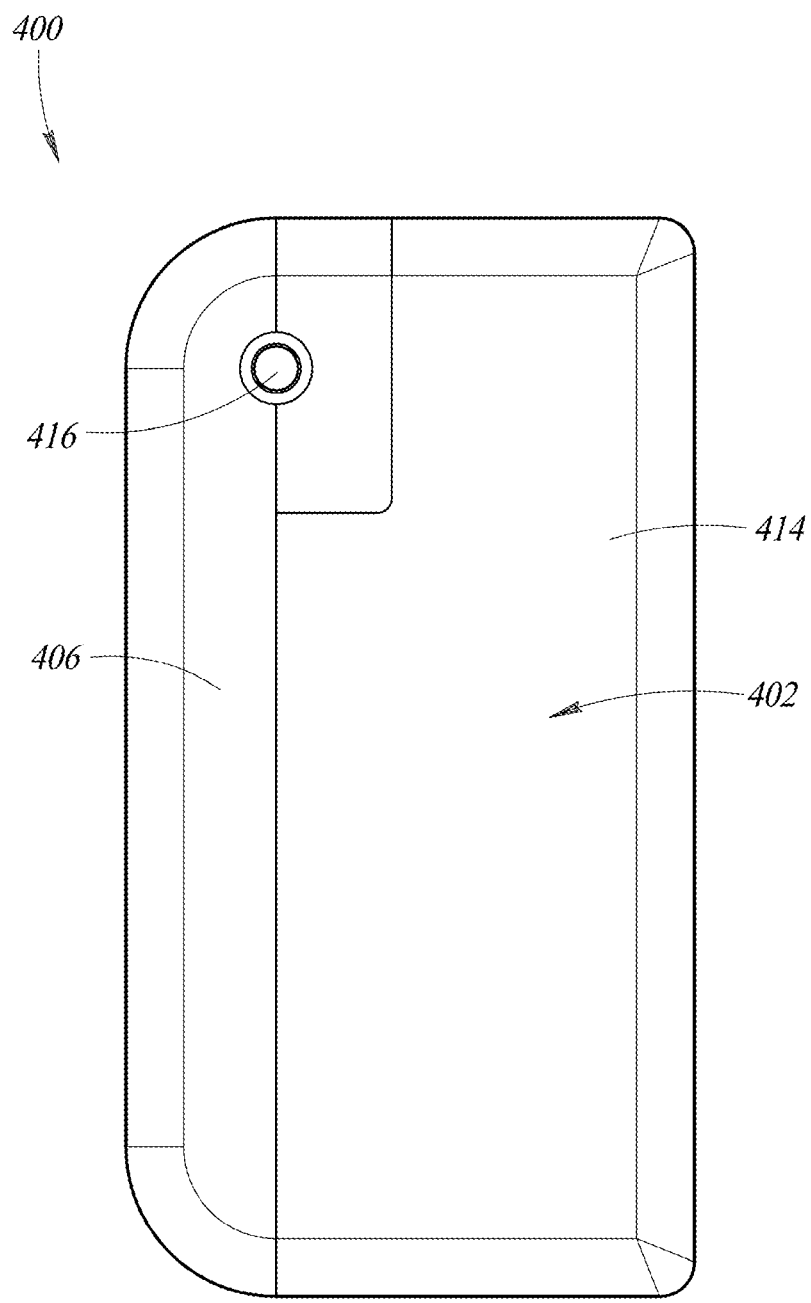
FIG. 26 illustrates a top plan view of the microfluidic system of FIG. 22.
Figure 27:
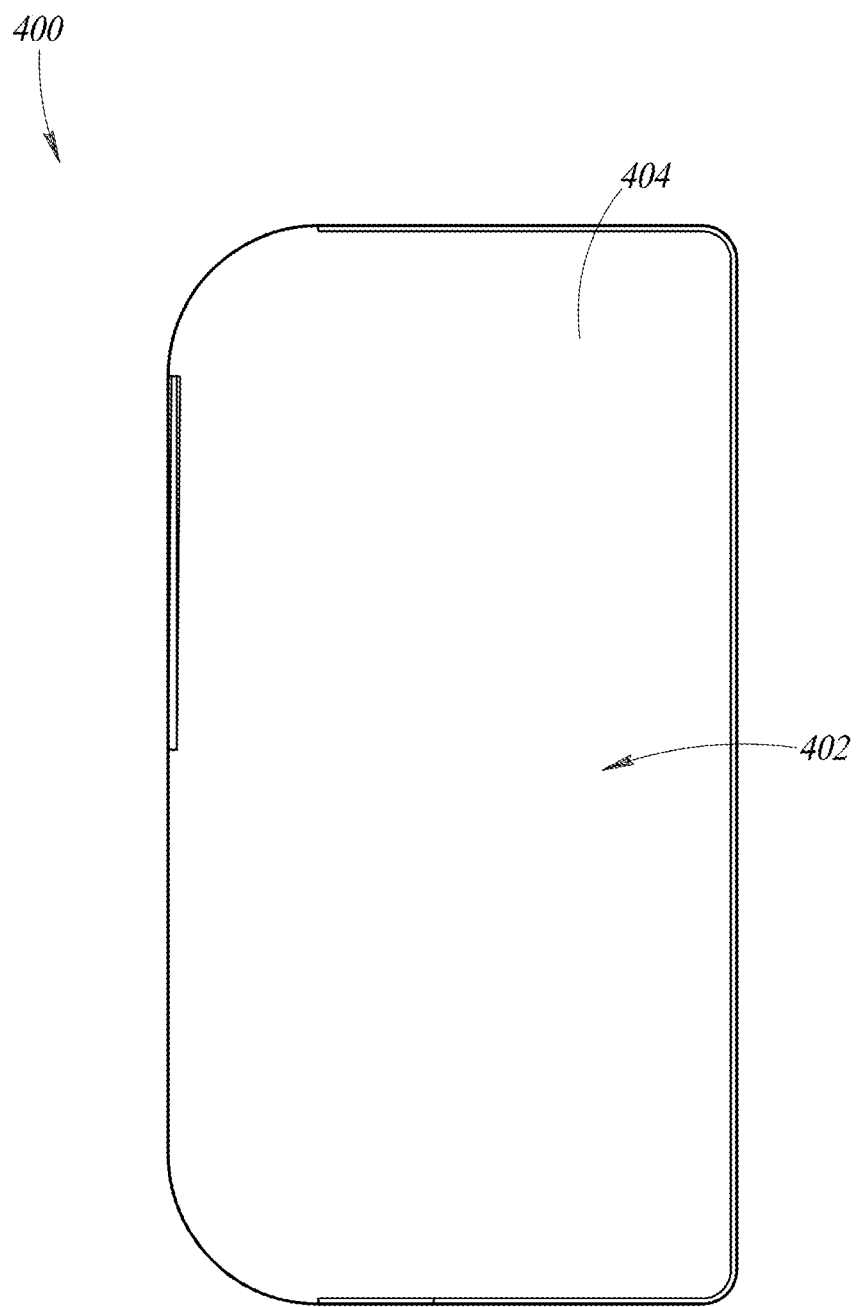
FIG. 27 illustrates a bottom plan view of the microfluidic system of FIG. 22.
Figure 28:
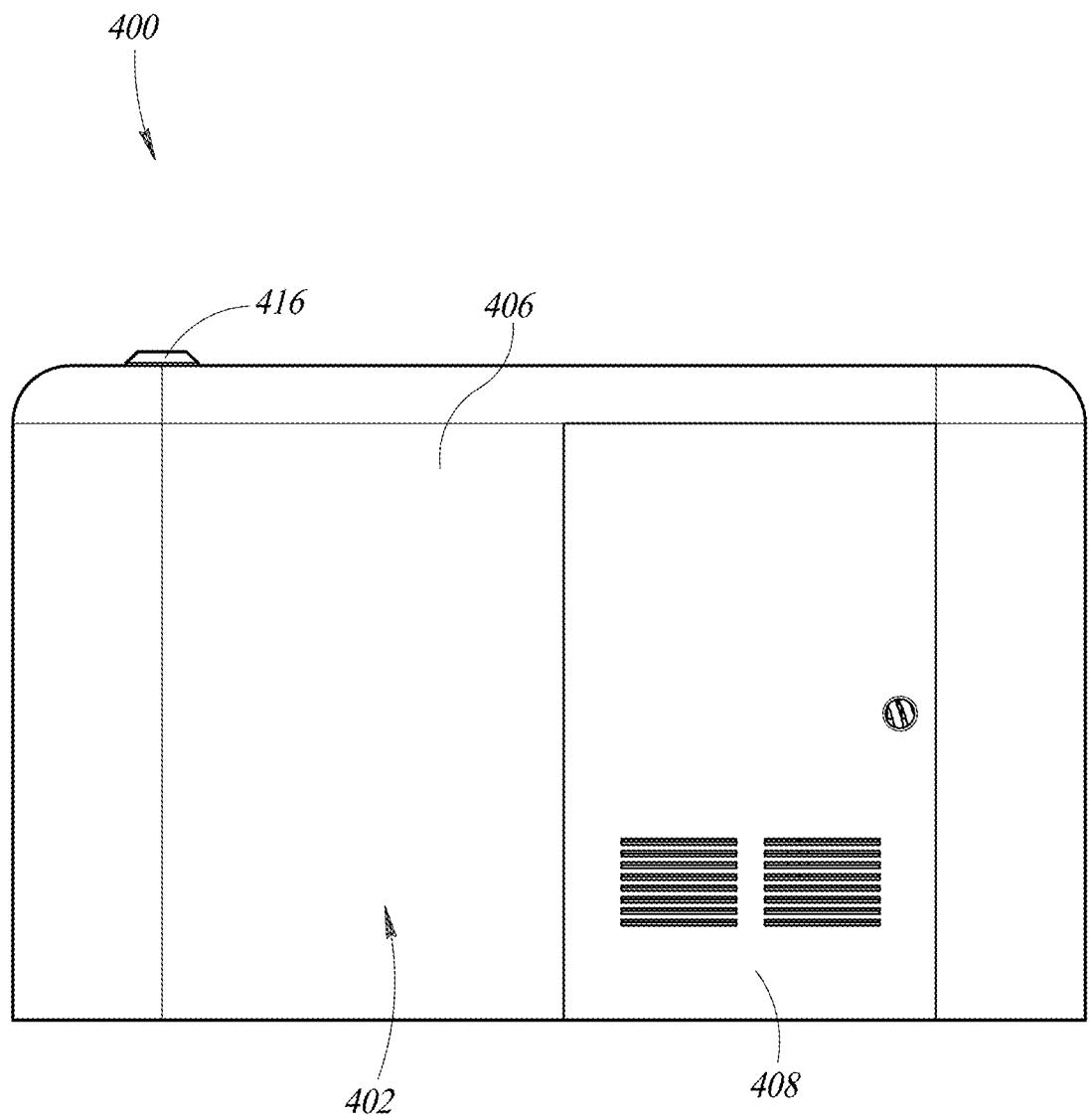
FIG. 28 illustrates a rear view of the microfluidic system of FIG. 22.
Figure 29:
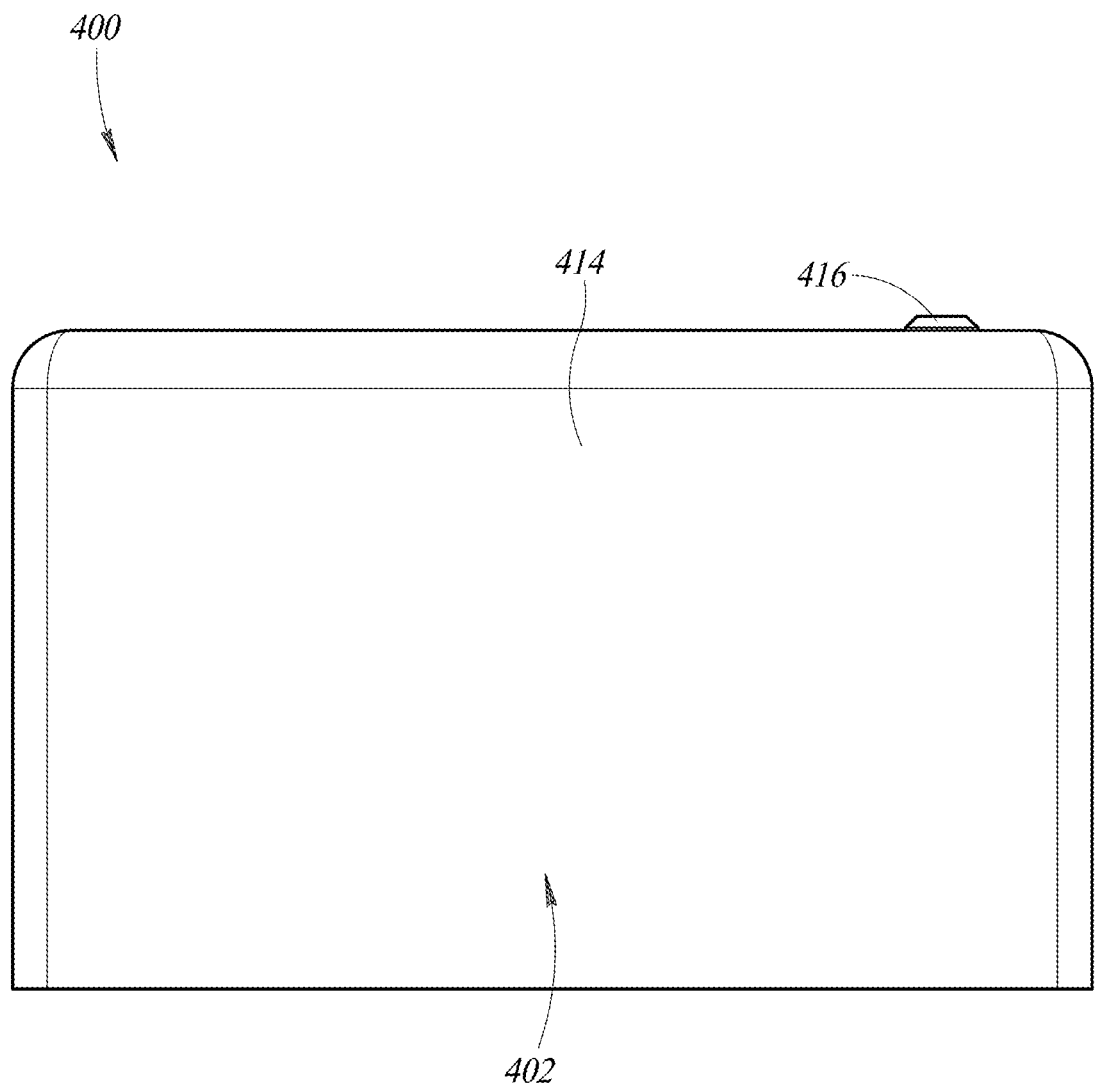
FIG. 29 illustrates a front view of the microfluidic system of FIG. 22.
Figure 30:
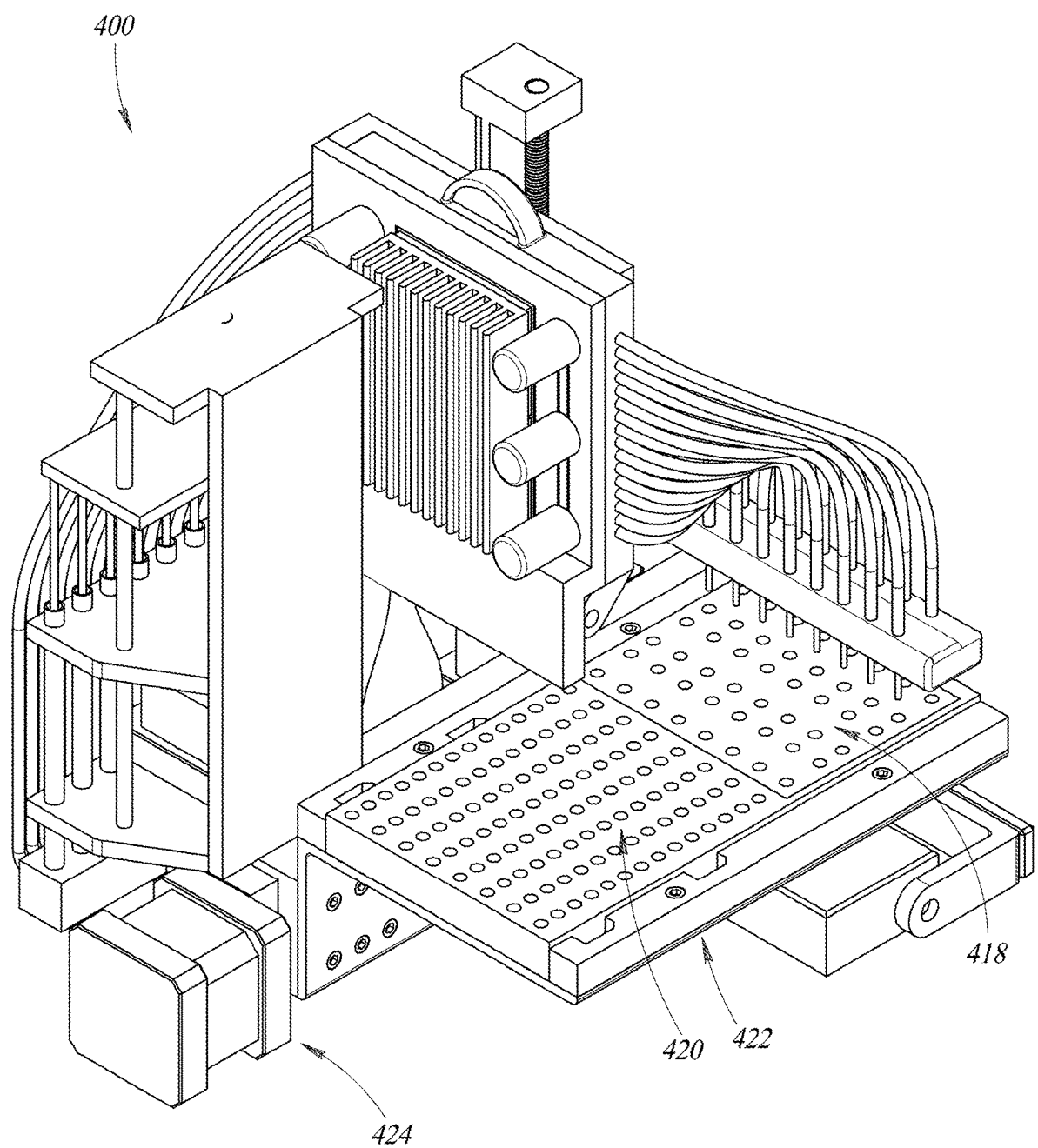
FIG. 30 illustrates a front, top, and left side perspective view of the microfluidic system of FIG. 22 with a housing thereof removed.
Figure 31:
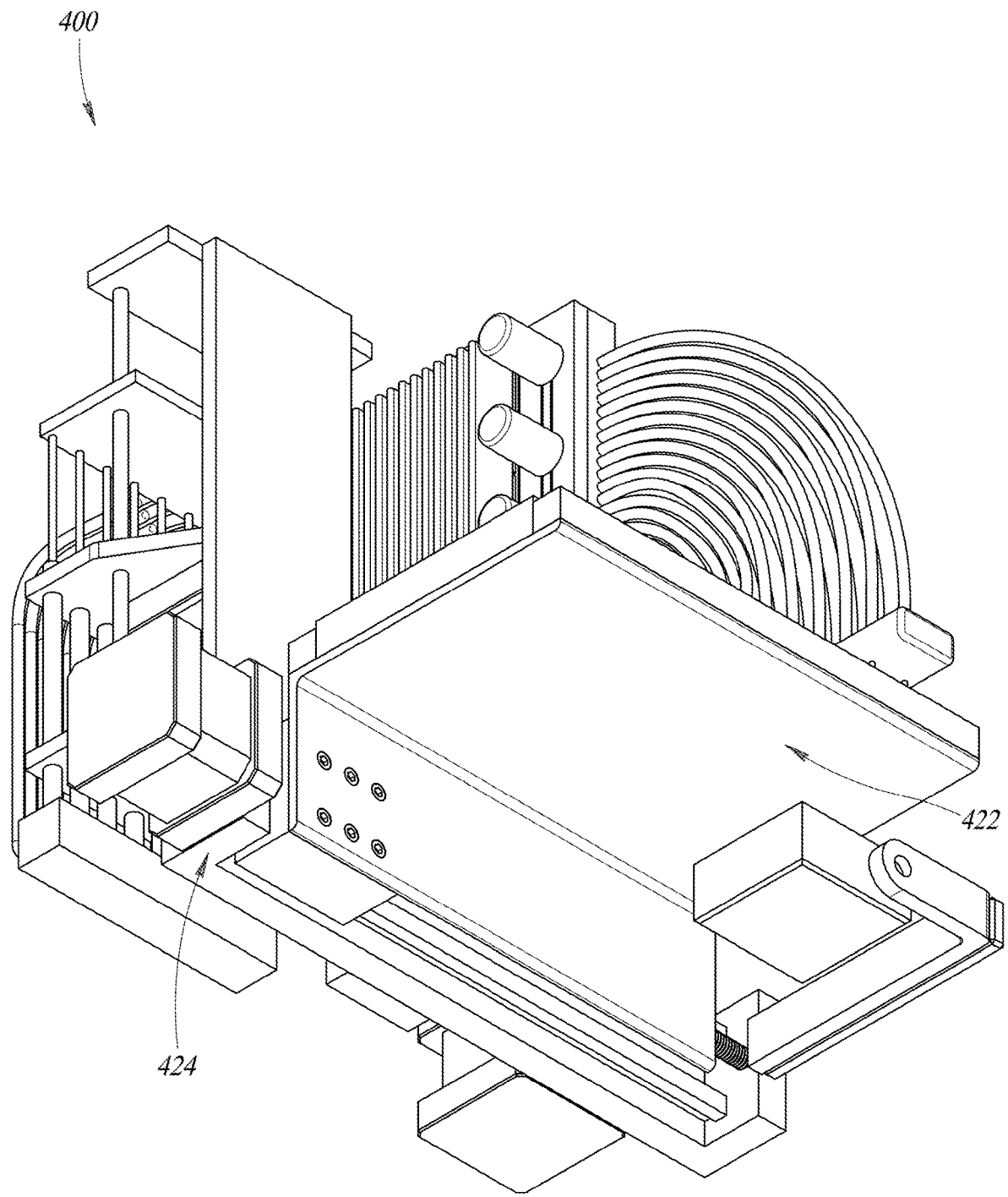
FIG. 31 illustrates a front, bottom, and left side perspective view of the microfluidic system of FIG. 22 with a housing thereof removed.
Figure 32:
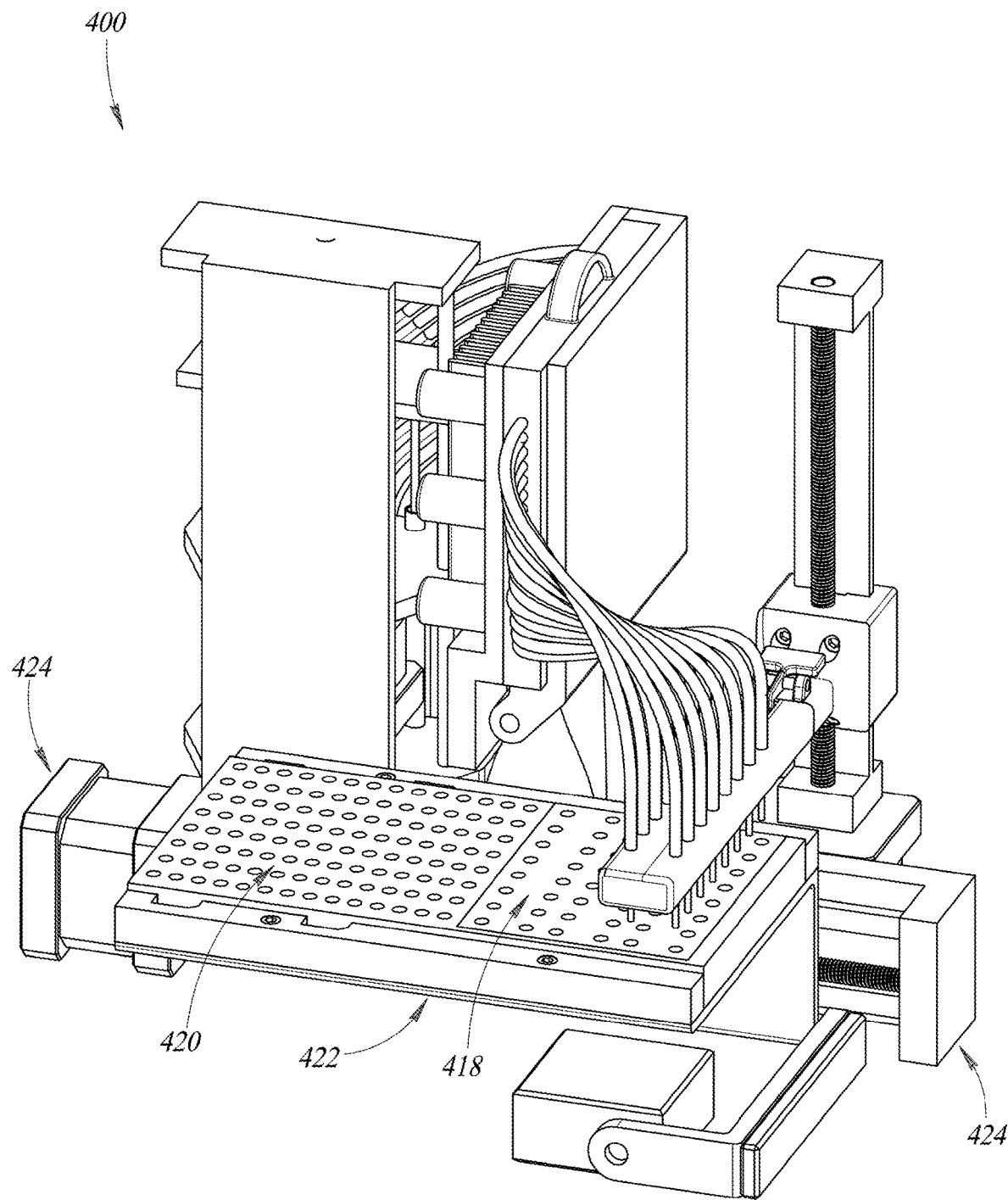
FIG. 32 illustrates a front, top, and right side perspective view of the microfluidic system of FIG. 22 with a housing thereof removed.
Figure 33:
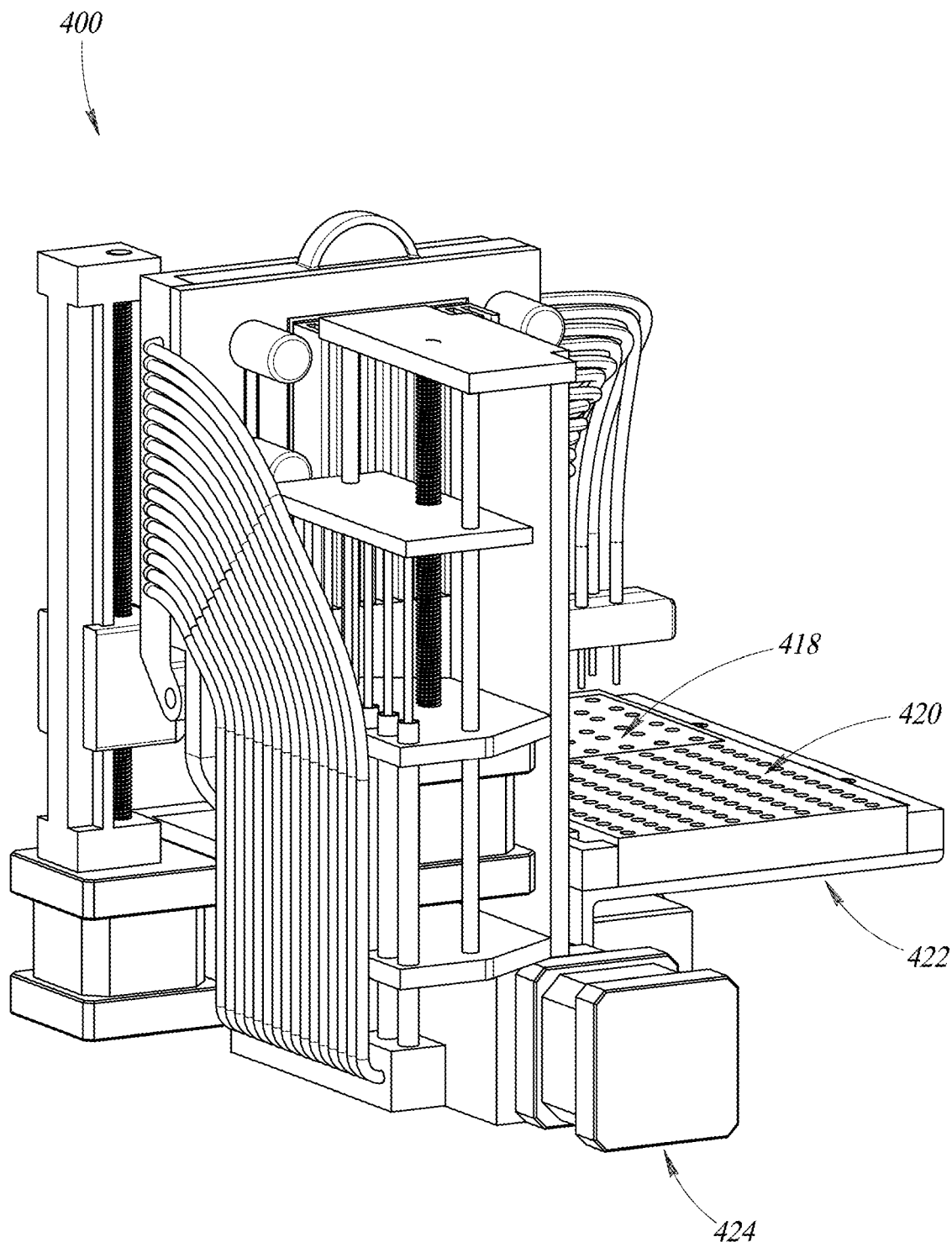
FIG. 33 illustrates a rear, top, and left side perspective view of the microfluidic system of FIG. 22 with a housing thereof removed.
Figure 34:
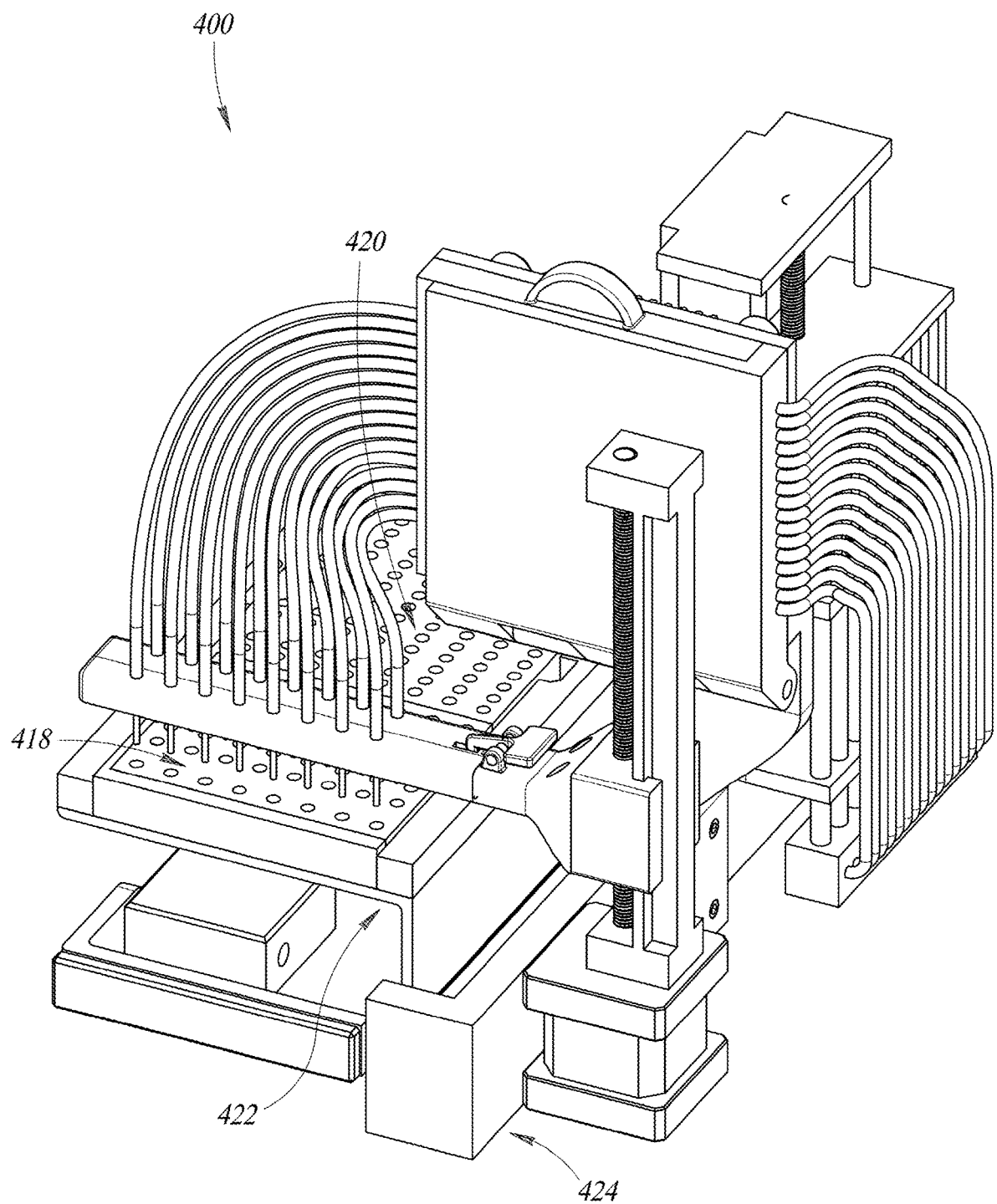
FIG. 34 illustrates a rear, top, and right side perspective view of the microfluidic system of FIG. 22 with a housing thereof removed.

FIG. 22 illustrates a rear, top, and left side perspective view of a microfluidic system 400, including a housing 402 thereof, for processing biological material. FIG. 23 illustrates a front, bottom, and right side perspective view of the housing 402. FIG. 24 illustrates a left side view of the housing 402. FIG. 25 illustrates a right side view of the housing 402. FIG. 26 illustrates a top plan view of the housing 402. FIG. 27 illustrates a bottom plan view of the housing 402. FIG. 28 illustrates a rear view of the housing 402. FIG. 29 illustrates a front view of the housing 402.

As used herein, terms such as "front," "forward," "back," "rearward," "behind," and other similar terminology, when used in the context of the microfluidic system 400, are used with respect to a viewer located on the side of the system 400 from which the viewer is expected to typically interact with and operate the system 400. Thus, in some cases, "front,"

"forward," and other similar terms refer to a feature being located in the direction of such a viewer, while words such as "back," "rearward," "behind," and other similar terms refer to a feature being located in the opposite direction. As used herein, terms of relative elevation, such as "top," "bottom," "upper," lower," "above," "below," "up," and "down," when used in the context of the microfluidic system 400, are used in their ordinary sense, that is, with respect to a direction of a gravitational force, such that gravity pulls objects down. As used herein, terms such as "right" and "left," when used in the context of the microfluidic system 400, refer to locations as viewed toward the front of the microfluidic system 400.

FIGS. 22-29 illustrate that the housing 402 of the microfluidic system 400 includes a bottom portion or bottom plate 404 that spans across the entire bottom surface of the housing 402 and provides a base or a foundation to which various other components of the system 400 and the housing 402 may be coupled. The housing 402 also includes a rear portion 406 that is rigidly coupled to, and that may be formed integrally with, the bottom plate 404. The rear portion 406 spans across the entire rear surface of the housing 402 except for an opening formed therein, and across rear portions of the top, left side, and right side surfaces of the housing 402. The housing 402 also includes a panel 408 that is removably installed and coupled to the rear portion 406 to cover the opening formed therein. The panel 408 includes slots 410 formed therein to allow air to flow into and out of the housing 402, and a port 412 formed therein to allow wires or cables, such as for carrying communications and/or or power, to extend into and out of the housing 402. In some cases the panel 408 may also be removed from the rest of the housing 402 to allow an operator or technician to access components inside the housing 402, such as for service or repair, through the opening formed in the rear portion 406.

The housing 402 also includes a front portion 414 that is rotatably coupled, such as hinged, to the rear portion 406, such that the front portion 414 can be rotated away from the rear portion 406 to open the housing 402 and allow an operator or a technician to interact with internal components of the microfluidic system 400. The front portion 414 spans across the entire front surface of the housing 402 and across front portions of the top, left side, and right side surfaces of the housing 402. A bottom end or edge of the front portion 414 can abut against outer edges of the bottom plate 404, and rear edges of the front portion 414 can abut against front edges of the rear portion 406, when the front portion 414 is in its closed position. In some implementations, the front portion 414 is rotatably coupled, such as by one or more hinges, to a top of the rear portion 406 such that the front portion 414 can rotate about a horizontal axis extending along the top surface of the housing 402 upwards and away from the rest of the system 400 to provide access to the rest of the components inside the housing 402. In other implementations, the front portion 414 is rotatably coupled, such as by one or more hinges, to a right side or a left side of the rear portion 406 such that the front portion 414 can rotate about a vertical axis extending along the left or the right surface of the housing 402 laterally outward and away from the rest of the system 400 to provide access to the rest of the components inside the housing 402.

The housing 402 also includes a single external physical button 416 that can allow an operator or technician to manually interact with the microfluidic system 400. In some implementations, the operator can open the housing 402 by moving its front portion 414, can supply biological samples and/or other materials to a set of wells or microwells inside the housing 402, close the housing 402 by moving its front portion 414, and then press or push the button 416 to initiate operation of the microfluidic system 400 and processing of the biological samples or other materials therein. In some implementations, the operator or technician may also press the button 416 to stop or halt operation of the microfluidic system 400 prior to completion of the processing, for example, in case an emergency or other unforeseen circumstance or situation arises.

FIGS. 30-34 illustrate various perspective views of the microfluidic system 400 with its housing 402 removed to illustrate internal components thereof. As illustrated in FIGS. 30-34, the microfluidic system 400 includes a microfluidic chip or a microfluidic plate 418, within which biological samples or other materials can be processed. The microfluidic system 400 also includes a microwell plate 420 having a plurality of microwells and a recess or slot or cavity to receive the microfluidic chip 418, so that the microwell plate 420 can carry the microfluidic chip 418. The microfluidic system 400 also includes a carriage or a tray 422 to which the microwell plate 420 can be secured or coupled. The microfluidic system 400 also includes a horizontal actuation system 424, to which the tray 422 can be coupled. In operation, the horizontal actuation system 424 can move the tray 422, and the microwell plate 420 and the microfluidic chip 418 with it, back and forth, and left and right, in a horizontal direction.

Figure 35:
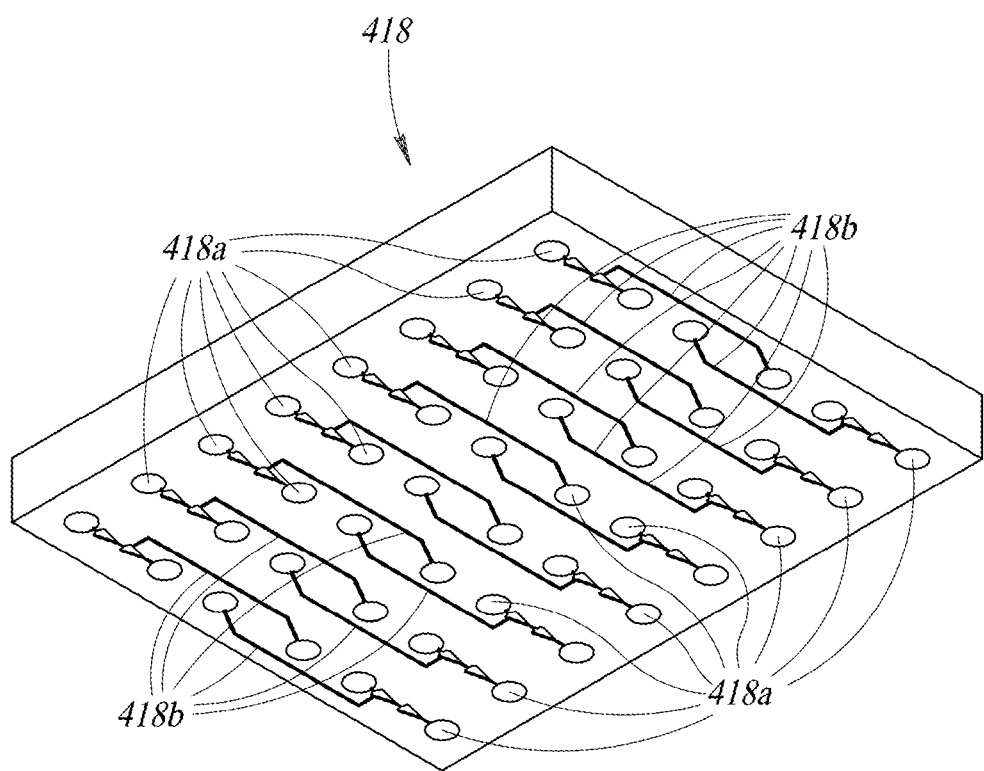
FIG. 35 illustrates a bottom perspective view of a microfluidic plate or chip of the microfluidic system of FIG. 22.

As illustrated in FIGS. 30-34, the microfluidic chip 418 includes a plurality of wells 418a that extend from a top surface thereof, vertically through a thickness of the chip 418, to a bottom surface thereof. FIG. 35 illustrates a perspective view of the underside, or of the bottom surface, of the microfluidic chip 418. As illustrated in FIG. 35, the microfluidic chip 418 includes a plurality of microchannels 418b and other features formed in its bottom surface. The microchannels 418b and other features are interconnected with one another and with the wells 418a to form a plurality of chambers and pathways that extend between the wells 418a. When the system 400 is in use, the microchannels 418b and the other features formed in the bottom surface of the chip 418 can direct fluids, biological samples, or other materials along the pathways, such as from a first one of the wells 418a to a second one of the wells 418a, such as in accordance with any of the embodiments of microfluidic systems described herein.

Figure 36:
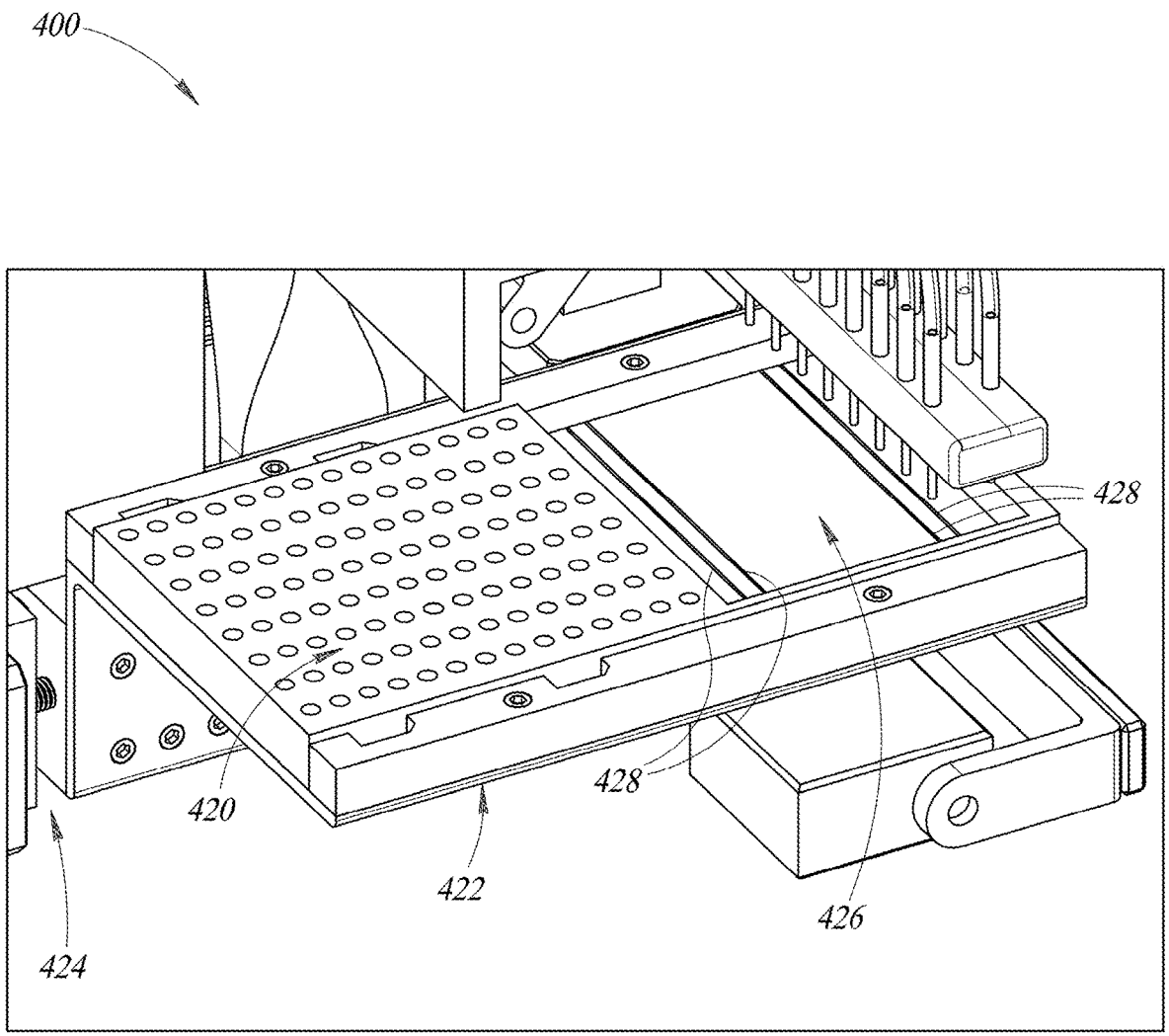
FIG. 36 illustrates a perspective view of a portion of the microfluidic system of FIG. 22 with the microfluidic chip of FIG. 35 removed.
Figure 37:
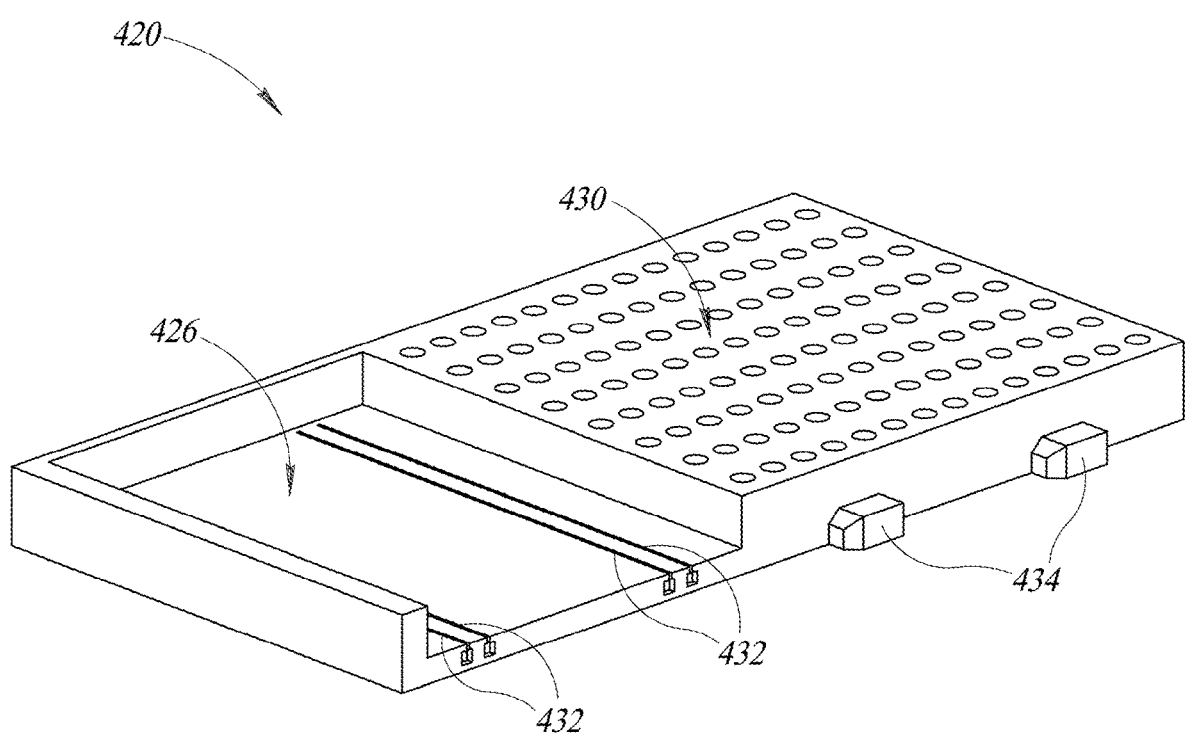
FIG. 37 illustrates a top perspective view of a microwell plate of the microfluidic system of FIG. 22.

FIG. 36 illustrates a portion of the microfluidic system 400 with the microfluidic chip 418 removed to illustrate additional features of the microwell plate 420. For example, FIG. 36 illustrates that the microwell plate 420 includes a cavity 426 at a right side thereof, and includes a set of electrically conductive tracks or leads 428 that extend horizontally across a bottom end of the cavity 426 from a front end thereof to a rear end thereof. FIG. 37 illustrates a rear perspective view of the microwell plate 420 isolated from the rest of the microfluidic system 400. As illustrated in FIG. 37, the microwell plate 420 includes the cavity 426 at a right side thereof and an array of a plurality of microwells 430 at a left side thereof.

The cavity 426 has a geometric shape comprising a right rectangular prism, and has dimensions, including a vertical depth, a horizontal length, and a horizontal width, that match, are the same as, or are identical to the corresponding dimensions of the microfluidic chip 418. As illustrated in FIG. 37, a front end of the cavity 426 is set back relative to a front end of the plate 420, a right end of the cavity 426 is set inward relative to a right end of the plate 420, a rear end of the cavity 426 extends all the way to, and is coincident with, a rear end of the plate 420, and a left end of the cavity 426 is located between one third and one half of the distance across the width of the plate 420 from the right end of the plate toward the left end of the plate. Thus, the cavity forms a slot or an enlarged groove that extends into the plate 420 from a rear end thereof toward a front end thereof. In use, the microfluidic chip 418 can be positioned within the cavity 426 such that a bottom surface of the cavity 426 faces the microfluidic channels 418b in the bottom surface of the chip 418 and defines or forms a bottom or lower boundary of chambers and pathways formed by the microfluidic channels 418b.

FIG. 37 also illustrates that the plate 420 includes a plurality of channels 432 formed in the bottom end or the bottom surface of the cavity 426. In the illustrated implementation, the plate 420 includes four such channels 432. Each of the channels 432 includes a relatively narrow top end portion that extends from the floor or the bottom surface of the cavity 426, downward into the plate 420 to a larger, wider bottom end portion. In the illustrated implementation, the top end portion of each of the channels 432 is rectangular in cross section and the bottom end portion of each of the channels 432 is square in cross-section, although in alternative implementations, the features could have different shapes. Each of the channels 432 extends horizontally, front-to-back through the plate 420 from a location proximate, and set back from, a front end of the plate 420, all the way to the rear end of the plate 420.

The array of the plurality of microwells 430 may include any suitable number of individual microwells 430. In the illustrated implementation, the array of microwells 430 includes one hundred and twelve microwells 430, arranged in fourteen equally spaced rows extending front-to-back and eight equally spaced columns extending from side-to-side across the plate 420. As illustrated in FIG. 37, a front end of the array of microwells 430 is set back relative to a front end of the plate 420, a left end of the array of microwells 430 is set inward relative to a left end of the plate 420, a rear end of the array of microwells 430 is set forward relative to a rear end of the plate 420, and a left end of the array of microwells 430 is located between two thirds and one half of the distance across the width of the plate 420 from the left end of the plate 420 toward the right end of the plate 420.

FIG. 37 also illustrates that the plate 420 includes a plurality of arms or knobs or protrusions 434 that extend horizontally forward and rearward from front and rear ends, respectively, of the plate 420. In the illustrated implementation, the plate 420 includes two protrusions 434 that extend rearward from a rear end of the plate 420 and two protrusions 434 that extend forward from a front end of the plate 420.

Figure 38:
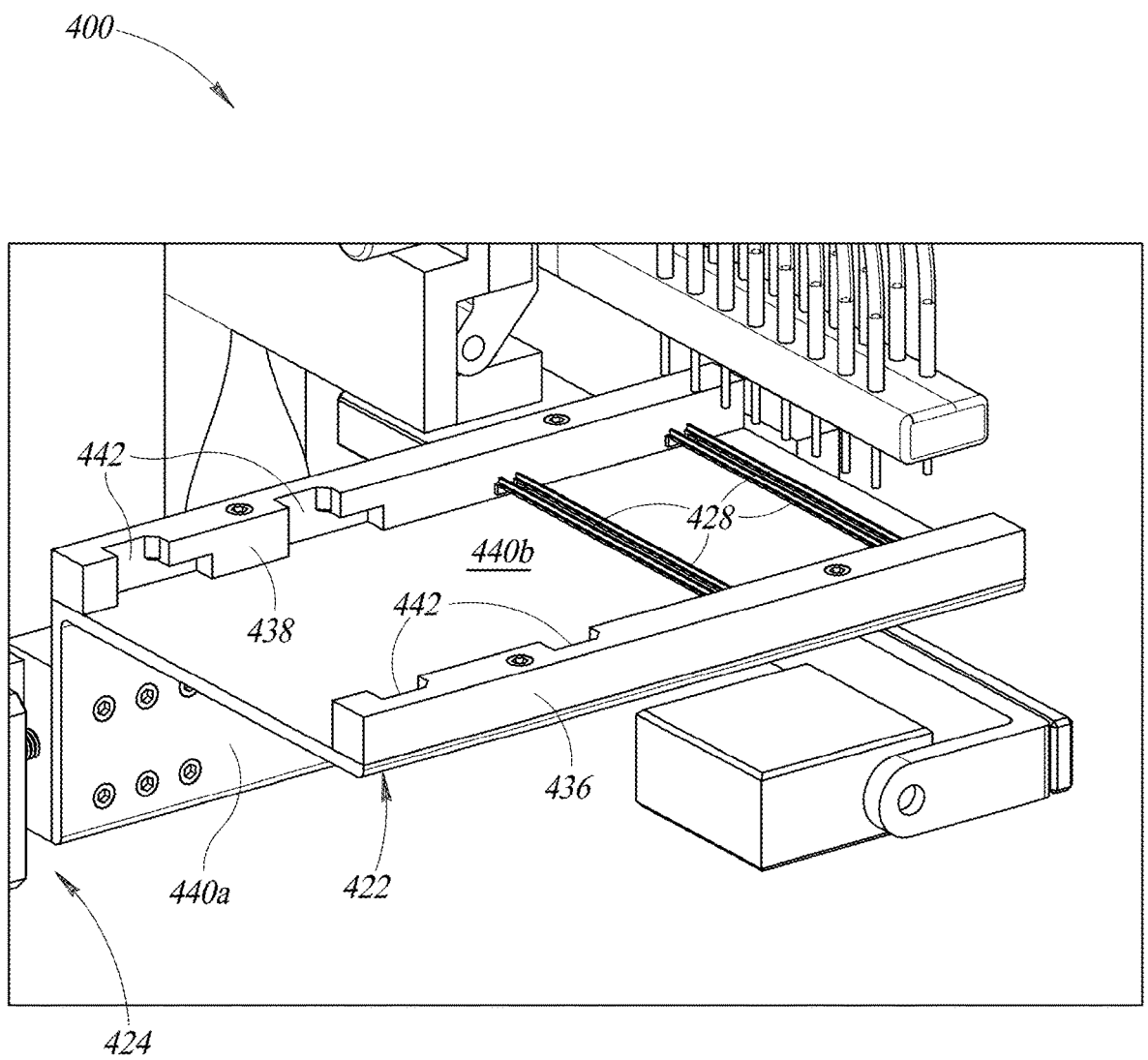
FIG. 38 illustrates a perspective view of a portion of the microfluidic system of FIG. 22 with the microfluidic chip of FIG. 35 and the microwell plate of FIG. 37 removed.

FIG. 38 illustrates a portion of the microfluidic system 400 with the microfluidic chip 418 and the microwell plate 420 removed to illustrate additional features of the tray 422 and the electrically conductive leads 428. For example, FIG. 38 illustrates that the tray 422 includes an angle bracket 440 that extends side-to-side and left-to-right and that has a first, vertical leg portion 440a coupled to the horizontal actuation system 424 and a second, horizontal leg portion 440b arranged at a right angle to the first, vertical leg portion 440a. The tray 422 also includes a front rail 436 that is coupled to an upper surface of a front end of the horizontal leg portion 440b of the bracket 440, and a rear rail 438 that is coupled to an upper surface of a rear end of the horizontal leg portion 440b of the bracket 440. The front and rear rails 436, 438, are parallel and extend side-to-side and left-to-right along the upper surface of the bracket 440.

As illustrated in FIG. 38, the front and rear rails 436, 438 each include a plurality of recesses or grooves 442 configured to mate with the protrusions of the plate 420 to lock or secure the plate 420 to the top surface of the bracket 440 between the front and rear rails 436 and 438. For example, the rear rail 438 includes two grooves 442 that extend rearward partially into the rail 438 from a front face thereof. In the illustrated implementation, each of the grooves 442 in the rear rail 438 also extend down into and through the rail 438 from a top end thereof to a bottom end thereof, and then from left to right along the bottom end of the rail 438. As another example, the front rail 436 includes two grooves 442 that extend forward partially into the rail 436 from a rear face thereof. In the illustrated implementation, each of the grooves 442 in the front rail 436 also extend down into and through the rail 436 from a top end thereof to a bottom end thereof, and then from left to right along the bottom end of the rail 436.

To secure the plate 420 to the tray 422, the plate 420 is positioned over the tray 422 so that its protrusions 434 are aligned with the grooves 442. The plate 420 can then be lowered into position on the tray 422 between the front and rear rails 436, 438, as the protrusions 434 travel down through the grooves 442, until a bottom surface of the plate 420 rests on an upper surface of the horizontal leg 440b of the bracket 440 of the tray 422. The plate 420 is then moved to the right so that the protrusions 434 travel to the right through the grooves 442, thereby securing the plate 420 to the tray 422.

FIG. 38 also illustrates the location of the electrically conductive tracks or leads 428 when the plate 420 and the chip 418 are secured to the tray 422. Each of the conductive leads 428 includes a relatively narrow top end portion that extends from the top end of the lead 428, downward to a larger, wider bottom end portion thereof. The top end portion of each of the conductive leads 428 is rectangular in cross section and has a size and a shape corresponding to the size and the shape of the top end portions of the channels 432, and the bottom end portion of each of the conductive leads 428 is square in cross-section and has a size and a shape corresponding to the size and the shape of the bottom end portions of the channels 432. Thus, each conductive lead 428 can be positioned, such as snugly, within a respective one of the channels 432. Each of the conductive leads 428 extends horizontally, front-to-back between the front and rear rails 436 and 438 from a location proximate, and set back from, the rear end of the front rail 436, all the way to a front end of the rear rail 438. In use, the conductive leads 428 are not typically located in the positions illustrated in FIG. 38 without the plate 420 present, but the conductive leads 428 are illustrated in such positions in FIG. 38 with the plate 420 removed for purposes of clarity and illustration.

Figure 39:
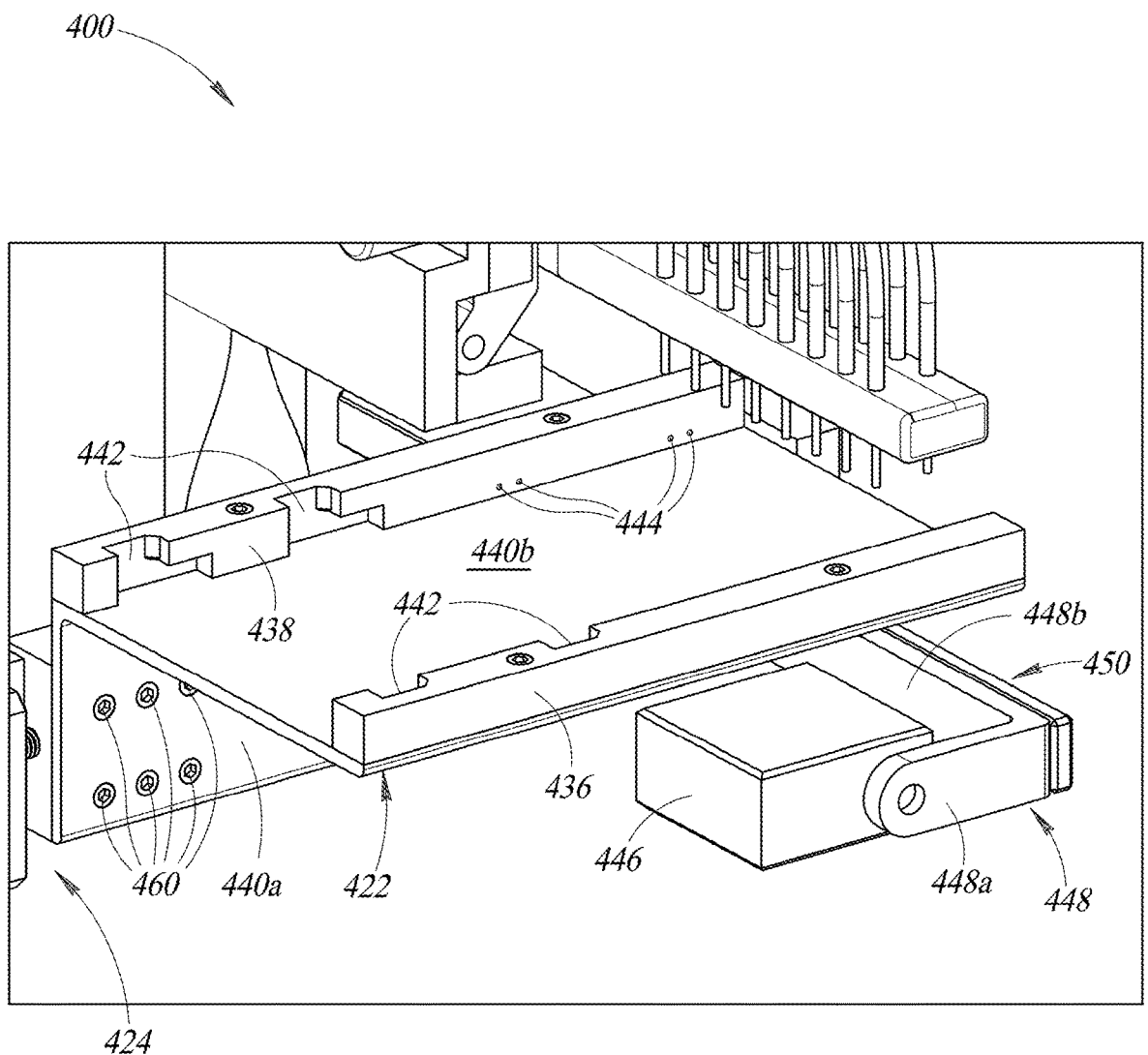
FIG. 39 illustrates a perspective view of a portion of the microfluidic system of FIG. 22 with the microfluidic chip, the microwell plate, and conductive leads thereof removed.

FIG. 39 illustrates a portion of the microfluidic system 400 with the microfluidic chip 418, the microwell plate 420, and the conductive leads 428 removed to illustrate additional features of the tray 422. For example, FIG. 39 illustrates that the tray 422 includes a set of electrically conductive terminals 444, each of which may include a conductive ball mounted in the rear rail 438 and biased forward from the rear rail 438, such as by a spring within the rear rail 438. The terminals 444 can be electrically coupled to a control system configured to operate the microfluidic system 400, such that the control system can control electrical voltages and/or currents supplied to each of the conductive leads 428.

As illustrated in FIGS. 36 and 37, the conductive leads 428 extend through the plate 420 and are exposed to the cavity 426 in the plate 420. Thus, the conductive leads 428 may also be exposed to one or more of the wells 418*a* and/or one or more of the microchannels 418*b* of the microfluidic chip 418. The control system can therefore be configured to control electrical voltages and/or currents supplied to the conductive leads 428, such as to control the processing of fluids, biological samples, and/or other materials within the microfluidic chip 418, such as in accordance with any of the embodiments of microfluidic systems described herein.

FIG. 39 also illustrates that the microfluidic system 400 includes a rotational actuation system including a first actuator 446, which may include an electrical motor, a servo motor, or any other suitable actuator that can generate torque, such as from electrical power, as well as an angle bracket 448 and a magnet 450. The first actuator 446 may be rigidly secured to, for example, an upper surface of the bottom plate 404 of the housing 402 at a location below the tray 422, below the plate 420 when the plate 420 is secured to the tray 422, and below the chip 418 when the chip 418 is positioned within the cavity 426 in the plate 420 and the plate 420 is secured to the tray 422.

An output or a driven rod of the first actuator 446 is rigidly coupled the angle bracket 448, which includes a first arm 448*a* and a second arm 448*b* perpendicular to the first arm 448*a*, such as to the first arm 448*a* thereof. The first actuator 446 can generate torque that rotates the first arm 448*a* to rotate about a horizontal axis extending front-to-back from a first position, shown in FIG. 39, in which the first arm 448*a* extends to the right of the output of the actuator 446, to a second position, in which the first arm 448*a* extends upwards from the output of the actuator 446, to a third position, in which the first arm 448*a* extends to the left of the output of the actuator 446, and back again, or through some smaller portion of such a range of travel.

The second arm 448*b* of the angle bracket 448 can be secured to the first arm 448*a* at a right angle such that it extends rearward. Thus, when the first arm 448 extends upwards, the second arm 448*b* extends rearward directly above the actuator 446, and horizontally from front-to-back underneath the tray 422, underneath the plate 420 when the plate 420 is secured to the tray 422, and underneath the chip 418 when the chip 418 is positioned within the cavity 426 in the plate 420 and the plate 420 is secured to the tray 422. The magnet 450 is secured to the second arm 448*b* of the angle bracket 448 such that, when the angle bracket 448 extends upward from the actuator 446, the magnet 450 is on top of the second arm 448*b* and adjacent to the tray 422.

The rotational actuation system and its first actuator 446 can be electrically or otherwise communicatively coupled to the control system, which can be configured to operate the first actuator 446, such that the control system can control rotation of the magnet 450 with respect to the actuator 446, the tray 422, the plate 420, and the chip 418 when the plate 420 and chip 418 are secured to the tray 422. Thus, the control system can be configured to control movement of the magnet 450 and a magnetic field generated by the magnet 450, such as to control the processing of fluids, biological samples, and/or other materials within the microfluidic chip 418, such as in accordance with any of the embodiments of microfluidic systems described herein.

Figure 40:
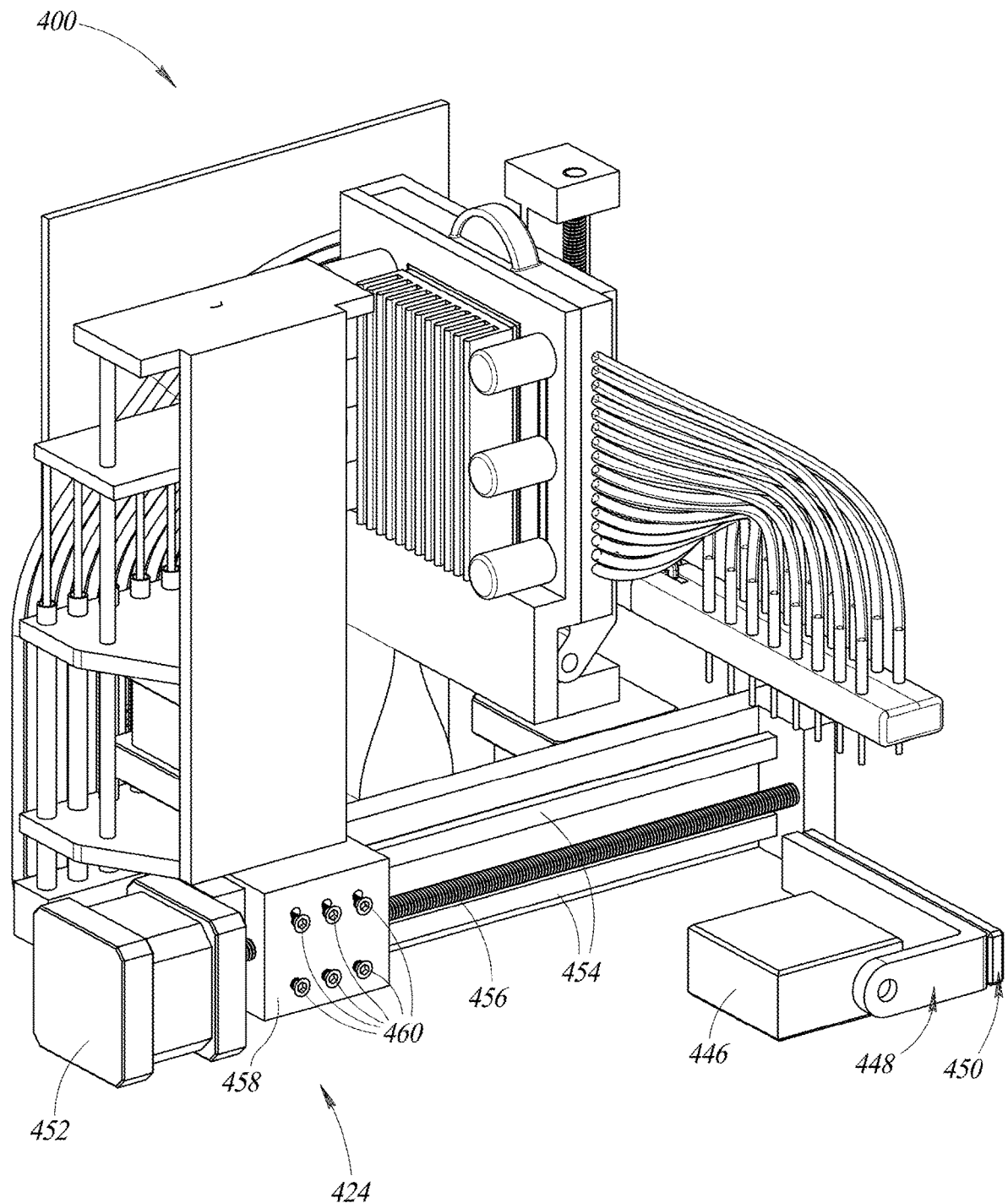
FIG. 40 illustrates a perspective view of the microfluidic system of FIG. 22 with the microfluidic chip, the microwell plate, the conductive leads, and a tray thereof removed.

FIG. 40 illustrates a perspective view of the microfluidic system 400 with the microfluidic chip 418, the microwell plate 420, the conductive leads 428, and the tray 422 removed to illustrate other components, including the horizontal actuation system 424, in greater detail. As illustrated in FIG. 40, the horizontal actuation system 424 includes an electrical motor, a servo motor, or any other suitable second actuator 452 that can generate torque, such as from electrical power. The horizontal actuation system 424 also includes an elongate guide rail 454 that is rigidly secured and coupled to the second actuator 452, and that extends side-to-side and to the right from the actuator 452. The second actuator 452 and the guide rail 454 may be rigidly secured to, for example, an upper surface of the bottom plate 404 of the housing 402 at a location below the tray 422.

The horizontal actuation system 424 also includes a threaded rod 456 that is coupled to an output or a driven rod of the second actuator 452. The second actuator 452 can generate torque that rotates the threaded rod 456 about its own central longitudinal axis, which is a horizontal axis extending side-to-side from the second actuator 452 toward the right and underneath the tray 422. The horizontal actuation system 424 also includes a travelling block 458, which is secured to and mounted on the guide rail 454 such that the travelling block 458 can travel linearly left-to-right along the length of the guide rail 454. For example, the travelling block 458 may include one or more grooves, such as with undercut portions thereof, and the guide rail 454 may include one or more ridges having shapes corresponding to those of the grooves, such that the ridges can be positioned within the grooves to secure the travelling block 458 to the guide rail 454. As another example, the guide rail 454 may include one or more grooves, such as with undercut portions thereof, and the travelling block 458 may include one or more ridges having shapes corresponding to those of the grooves, such that the ridges can be positioned within the grooves to secure the travelling block 458 to the guide rail 454.

As illustrated in FIG. 40, the threaded rod 456 extends through a conduit extending through the travelling block 458. In some implementations, the conduit extending through the travelling block 458 is threaded, with threads of the conduit corresponding to the threads of the threaded rod 456, and the threads of the conduit may be engaged and interlocked with the threads of the threaded rod 456. Thus, due to the engagement of these threads and the engagement of the travelling block 458 with the guide rail 454, when the actuator 452 generates torque and induces rotation of the threaded rod 456, the rotation of the threaded rod 456 induces linear movement of the travelling block 458 along the length of the guide rail 454 from side-to-side. By turning the threaded rod 456 in a first direction, such as clockwise or counterclockwise, the threaded rod 456 can cause the travelling block 458 to travel in a first direction, such as to the right or to the left. By turning the threaded rod 456 in a second direction opposite to the first, such as clockwise or counterclockwise, the threaded rod 456 can cause the travelling block 458 to travel in a second direction opposite to the first direction, such as to the right or to the left.

As illustrated in FIGS. 39 and 40, the tray 422 can be rigidly coupled and secured to the travelling block 458, such as by an adhesive or a plurality of mechanical fasteners such as screws or bolts 460. Thus, movement of the travelling block 458 can induce a corresponding or a matching movement of the tray 422, and thus of the microwell plate 420 and of the microfluidic chip 418. Thus, the actuator 452 can be used as described herein to move the microwell plate 420 and the microfluidic chip 418 side-to-side and left-to-right within the system 400. The horizontal actuation system 424 and its second actuator 452 can be electrically or otherwise communicatively coupled to the control system, which can be configured to operate the second actuator 452, such that the control system can control horizontal and side-to-side movement of the microwell plate 420 and the microfluidic chip 418 when the plate 420 and chip 418 are secured to the tray 422.

Figure 41:
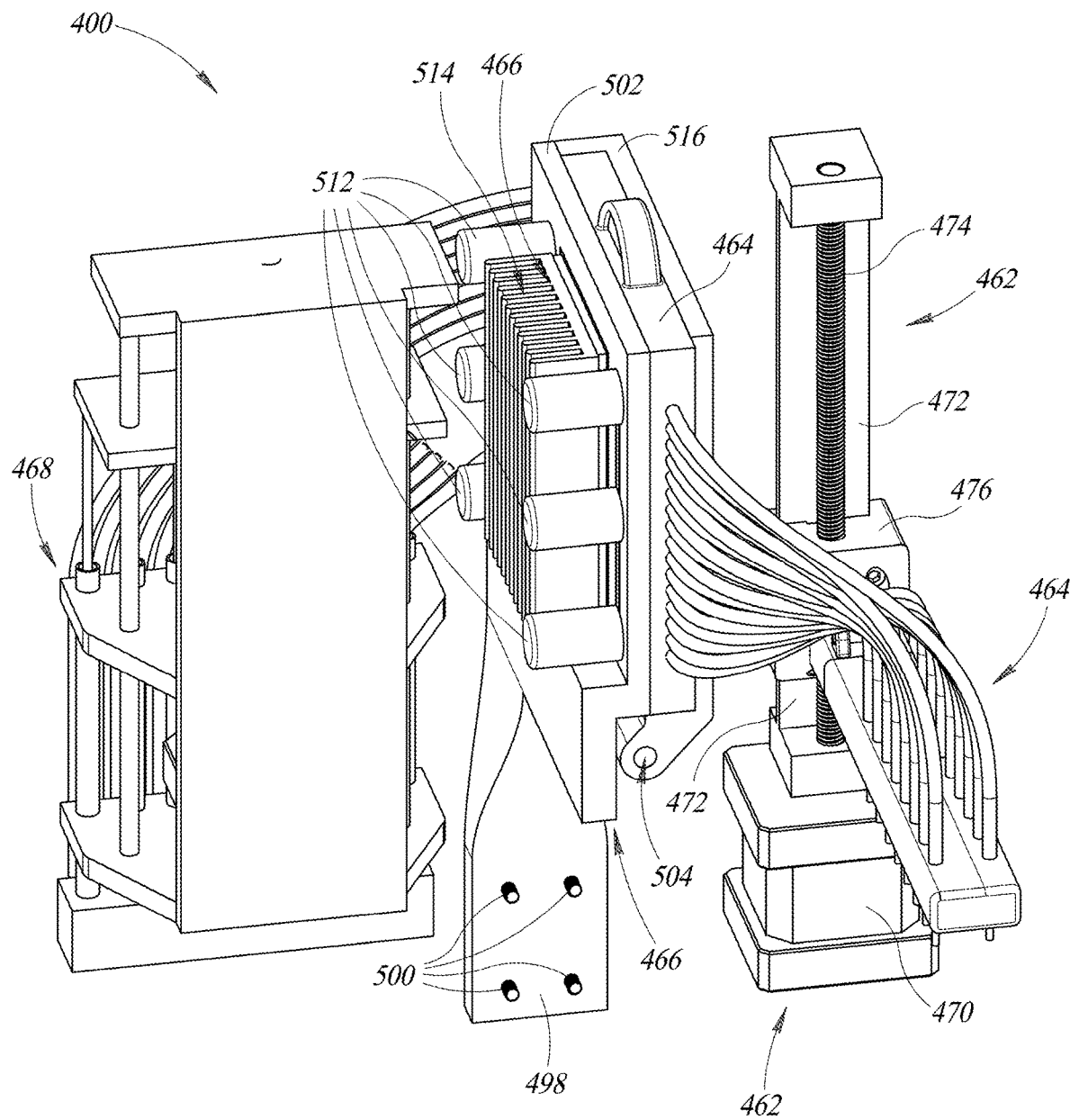
FIG. 41 illustrates a perspective view of the microfluidic system as illustrated in FIG. 40 with additional components removed.

FIG. 41 illustrates a perspective view of the microfluidic system 400 as illustrated in FIG. 40 with additional components, including the rotational actuation system and the horizontal actuation system 424 removed to more clearly illustrate other components. As illustrated in FIG. 41, the microfluidic system 400 includes a vertical actuation system 462, a micropipette system 464, a cradle 466 enclosing a portion of the micropipette system 464, and a pump system 468 configured to control at least part of the operation of the micropipette system 464. As illustrated in FIG. 41, the vertical actuation system 462 includes an electrical motor, a servo motor, or any other suitable third actuator 470 that can generate torque, such as from electrical power. The vertical actuation system 462 also includes an elongate guide rail 472 that is rigidly secured and coupled to the second actuator 470, and that extends up-and-down and upwards from the actuator 470. The second actuator 470 may be rigidly secured to, for example, an upper surface of the bottom plate 404 of the housing 402 at a location behind the horizontal actuation system 424.

The vertical actuation system 462 also includes a threaded rod 474 that is coupled to an output or a driven rod of the third actuator 470. The third actuator 470 can generate torque that rotates the threaded rod 474 about its own central longitudinal axis, which is a vertical axis extending up-and-down from the third actuator 470 upward. The vertical actuation system 462 also includes a travelling block 476, which is secured to and mounted on the guide rail 472 such that the travelling block 476 can travel linearly up-and-down along the length of the guide rail 472. For example, the travelling block 476 may include one or more grooves, such as with undercut portions thereof, and the guide rail 472 may include one or more ridges having shapes corresponding to those of the grooves, such that the ridges can be positioned within the grooves to secure the travelling block 476 to the guide rail 472. As another example, the guide rail 472 may include one or more grooves, such as with undercut portions thereof, and the travelling block 476 may include one or more ridges having shapes corresponding to those of the grooves, such that the ridges can be positioned within the grooves to secure the travelling block 476 to the guide rail 472.

As illustrated in FIG. 41, the threaded rod 474 extends through a conduit extending through the travelling block 476. In some implementations, the conduit extending through the travelling block 476 is threaded, with threads of the conduit corresponding to the threads of the threaded rod 474, and the threads of the conduit may be engaged and interlocked with the threads of the threaded rod 474. Thus, due to the engagement of these threads and the engagement of the travelling block 476 with the guide rail 472, when the actuator 470 generates torque and induces rotation of the threaded rod 474, the rotation of the threaded rod 474 induces linear movement of the travelling block 476 along the length of the guide rail 472 up-and-down. By turning the threaded rod 474 in a first direction, such as clockwise or counterclockwise, the threaded rod 474 can cause the travelling block 476 to travel in a first direction, such as up or down. By turning the threaded rod 474 in a second direction opposite to the first, such as clockwise or counterclockwise, the threaded rod 474 can cause the travelling block 476 to travel in a second direction opposite to the first direction, such as up or down.

Figure 42:
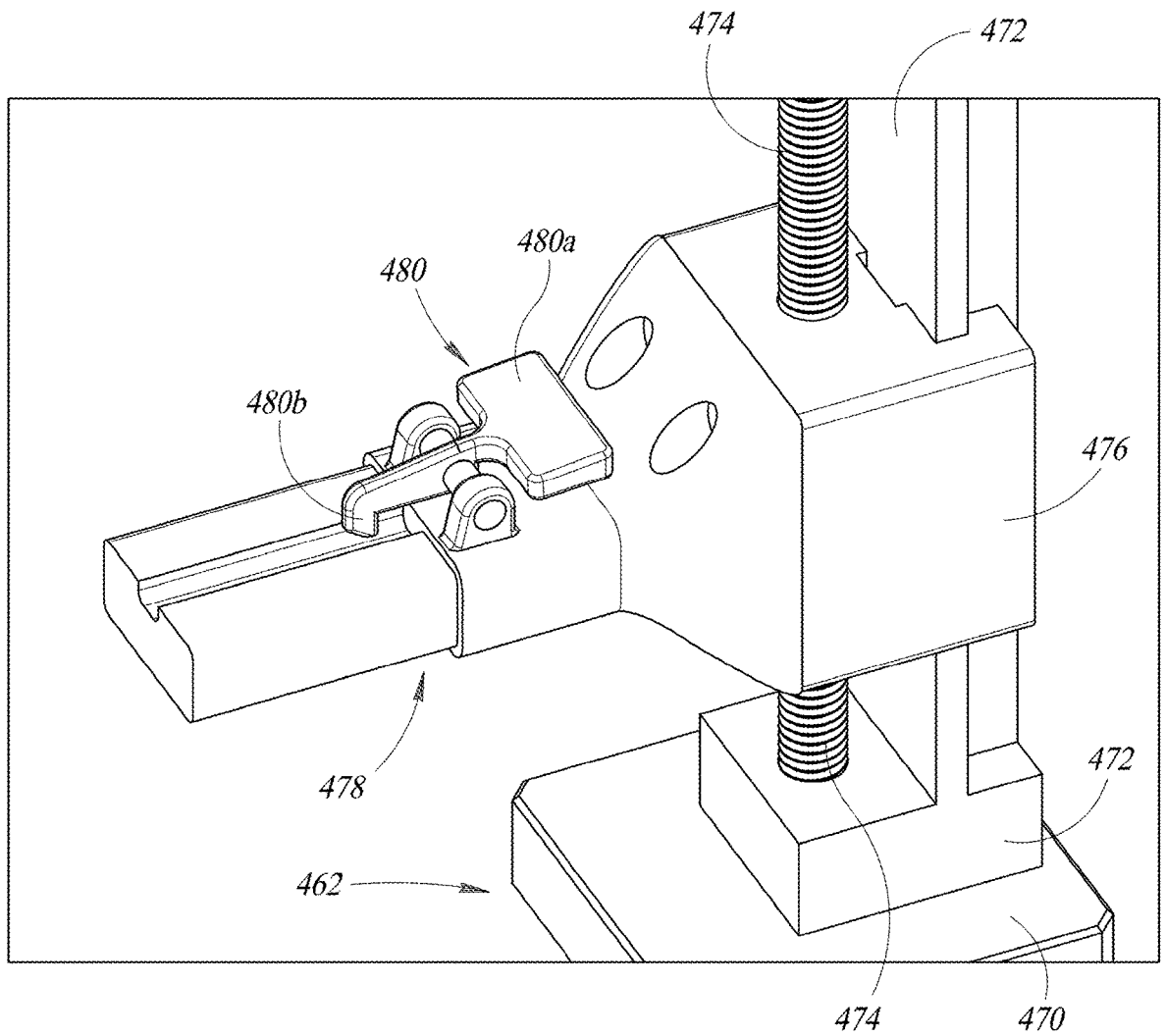
FIG. 42 illustrates a perspective view of a portion of a vertical actuation system of the microfluidic system of FIG. 22.

FIG. 42 illustrates components of the vertical actuation system 462 with other components of the system 400 removed for greater clarity. As illustrated in FIG. 42, the travelling block 476 includes a main body coupled to the guide rail 472 and to the threaded rod 474, and a bar or an arm 478 that extends forward from the main body. As illustrated in FIG. 42, the travelling block 476 also includes a latch 480 rotatably coupled to a top end surface of the arm 478. The latch 480 includes an enlarged paddle 480*a* at a first, rear end thereof and a tooth 480*b* at a second, front end thereof. The latch 480 can be biased, such as by a spring, to rotate such that the paddle 480*a* rotates away from the top end surface of the arm 478 and such that the tooth 480*b* rotates toward the top end surface of the arm 478. In operation, an operator or a technician can press downward on the paddle 480*a* to overcome the bias, rotating the paddle 480*a* toward the top end surface of the arm 478 and rotating the tooth 480*b* away from the top end surface of the arm 478.

Figure 43:
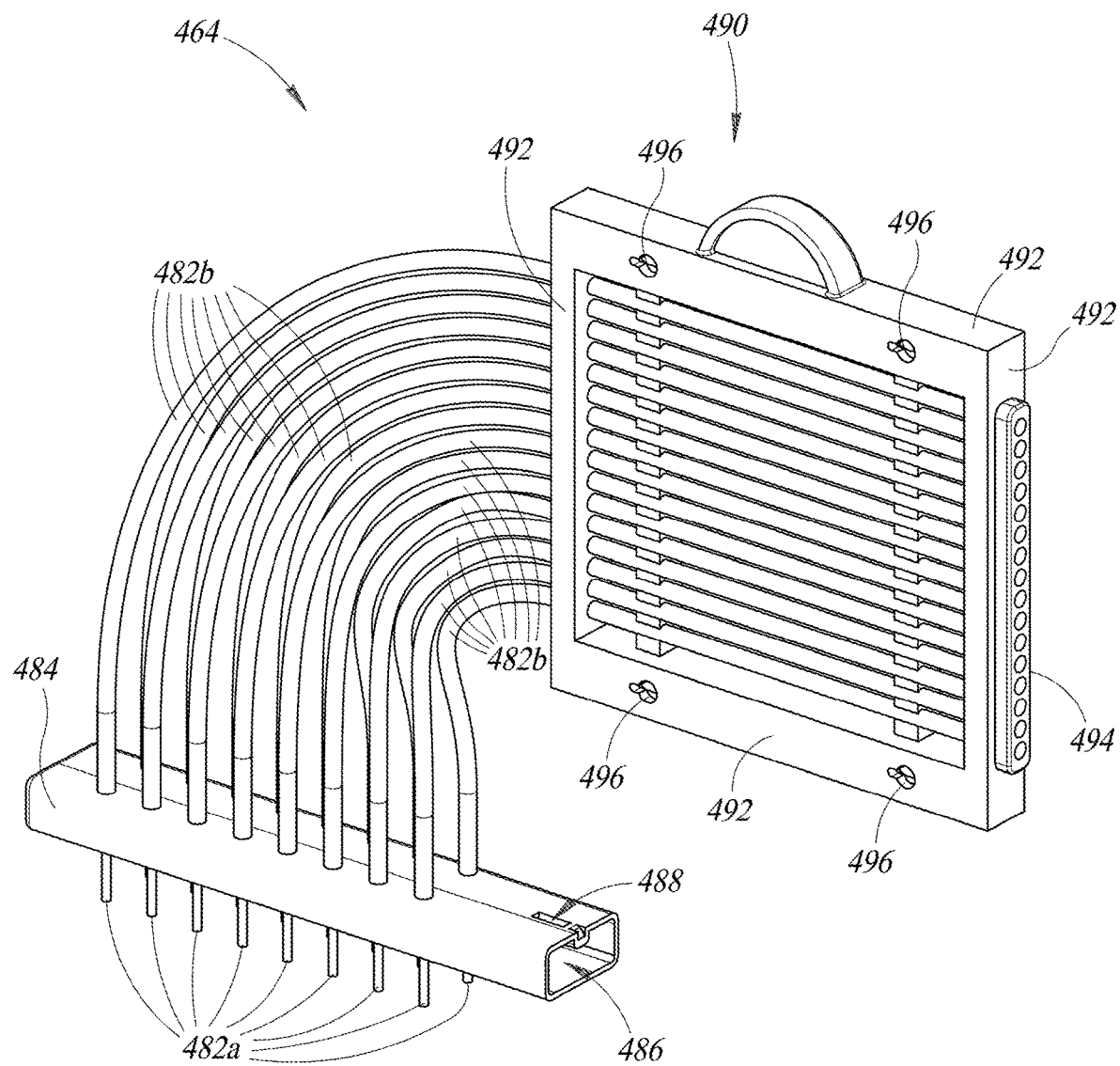
FIG. 43 illustrates a perspective view of a micropipette system of the microfluidic system of FIG. 22.

FIG. 43 illustrates the micropipette system 464 with other components of the system 400 removed for greater clarity. As illustrated in FIG. 43, the micropipette system 464 includes a plurality of individual micropipettes 482, each of which includes a respective micropipette tip 482*a* coupled to a respective micropipette conduit 482*b*. As illustrated in FIG. 43, the micropipette system 464 also includes a horizontally-extending support bar or arm 484, through which each of the micropipettes 482, such as the micropipette tips 482*a* thereof, extend. The support arm 484 can maintain the micropipette tips 482*a* in a vertical orientation and can hold the micropipette tips 482*a* in an array or a grid having eight equally spaced rows extending side-to-side and two spaced-apart columns extending from front-to-back across the support arm 484.

As illustrated in FIG. 43, the support arm 484 is hollow and has an opening 486 at its rear end. The opening 486 has a size and dimensions such that the arm 478 can be inserted into the opening 486 and through the opening 486 into the hollow support arm 484. The support arm 484 also includes a recess, a depression, or a small groove 488 that extends downward into the top end surface of the support arm 484 at a rear end thereof above the opening 486. Thus, to install the micropipette system 464 onto the vertical actuation system 462, an operator or a technician can press down on the paddle 480*a* of the latch 480, insert the arm 478 into the opening 486 into the hollow support arm 484, and then release the paddle 480*a* to allow the tooth 480*b* of the latch 480 to move into and be seated within the groove 488, thereby securing and locking the support arm 484 of the micropipette system 464 to the arm 478 of the vertical actuation system 462.

Thus, movement of the travelling block 476 can induce a corresponding or a matching movement of the support arm 484, and thus of the micropipette tips 482*a*. Thus, the actuator 470 can be used as described herein to move the micropipette tips 482*a* up-and-down within the system 400. As illustrated in FIGS. 30-34, the micropipette system 464 can be installed within the system 400 such that the micropipette tips 482*a* are positioned directly above the tray 422 and/or directly above the wells 418*a* in the microfluidic chip 418 or the array of wells 430 in the microwell plate 430. The vertical actuation system 462 and its actuator 470 can be electrically or otherwise communicatively coupled to the control system, which can be configured to operate the actuator 470, such that the control system can control vertical movement of the micropipette tips 482*a* when the micropipette system 464 is installed within the system 400 and the support arm 484 is coupled to the arm 478.

FIG. 43 also illustrates that the micropipette system 464 includes a cartridge 490 including an outer frame 492, which may have an overall square or rectangular shape. As illustrated in FIG. 43, the outer frame 492 includes a male portion of a fluid connector 494, as well as a plurality of openings 496 through which protrusions or knobs of another component can be inserted to secure the cartridge 490 thereto. Ends of each of the micropipette conduits 482b opposite the respective micropipette tips 482a extend into and through the cartridge 490, terminating at a respective port of the male portion of the fluid connector 494.

Figure 44:
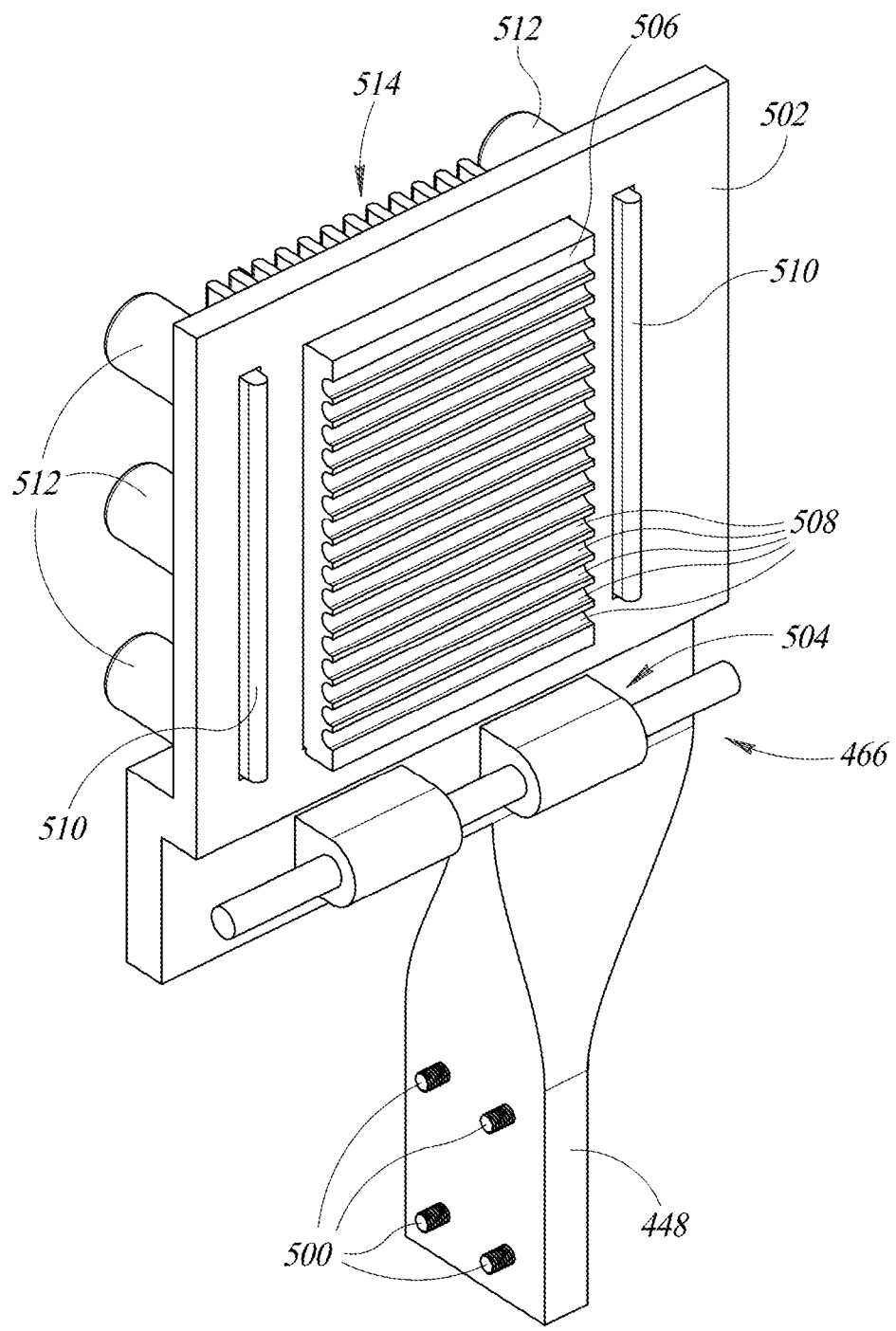
FIG. 44 illustrates a perspective view of a cradle of the microfluidic system of FIG. 22 with a hinged door thereof removed.

As illustrated in FIGS. 41 and 44, the cradle 466, which may also be referred to as a "heating assembly," includes an arm or a post or a stand 498 on which various other components of the cradle 466 may be supported. The stand 498 of the cradle 466 may be rigidly secured to, as an example, a rear end surface of the guide rail 454 of the horizontal actuation system 424, such as at a location behind the horizontal actuation system 424, including behind the tray 422, the plate 420, and/or behind the chip 418. As also illustrated in FIGS. 41 and 44, the stand 498 can be rigidly coupled and secured to the guide rail 454, such as by an adhesive or a plurality of mechanical fasteners such as screws or bolts 500.

As illustrated in FIGS. 41 and 44, the cradle 466 includes a stationary plate or sidewall 502 that extends upward and front-to-back and components 504 of a hinge located at a bottom end of the sidewall 502 and extending and facing toward the right of the sidewall 502. The cradle 466 also includes a heat transfer block 506 including sixteen individual grooves or channels 508 that extend horizontally and front-to-back therethrough, where each of the channels 508 has a semi-circular cross-sectional shape. The cradle 466 also includes a pair of bars 510 that extend to the right out of a rightward-facing surface of the sidewall 502, and that extend vertically and up-and-down along their own respective central longitudinal axes through the rightward-facing surface of the sidewall 502.

As also illustrated in FIGS. 41 and 44, the cradle 466 includes a plurality of solenoid actuators 512 that are coupled to the bars 510 and configured to actuate the bars 510 to move side-to-side and left-to-right with respect to the sidewall 502, and into or out of the rightward-facing surface of the sidewall 502. As also illustrated in FIGS. 41 and 44, the cradle 466 includes a heat sink 514 with tines or teeth facing leftward away from the heat transfer block 506. The cradle 466 may also include one or more heating systems, which may be integrated with the heat transfer block 506, integrated with the heat sink 514, or positioned between the heat transfer block 506 and the heat sink 514. In some implementations, the heating system may include a heat pump, such as a solid state heat pump or a thermoelectric heat pump, or a Peltier device, a Peltier heater, or a Peltier heat pump. The heat transfer block 506 may be made of copper or other highly-heat conductive material(s).

Figure 45:
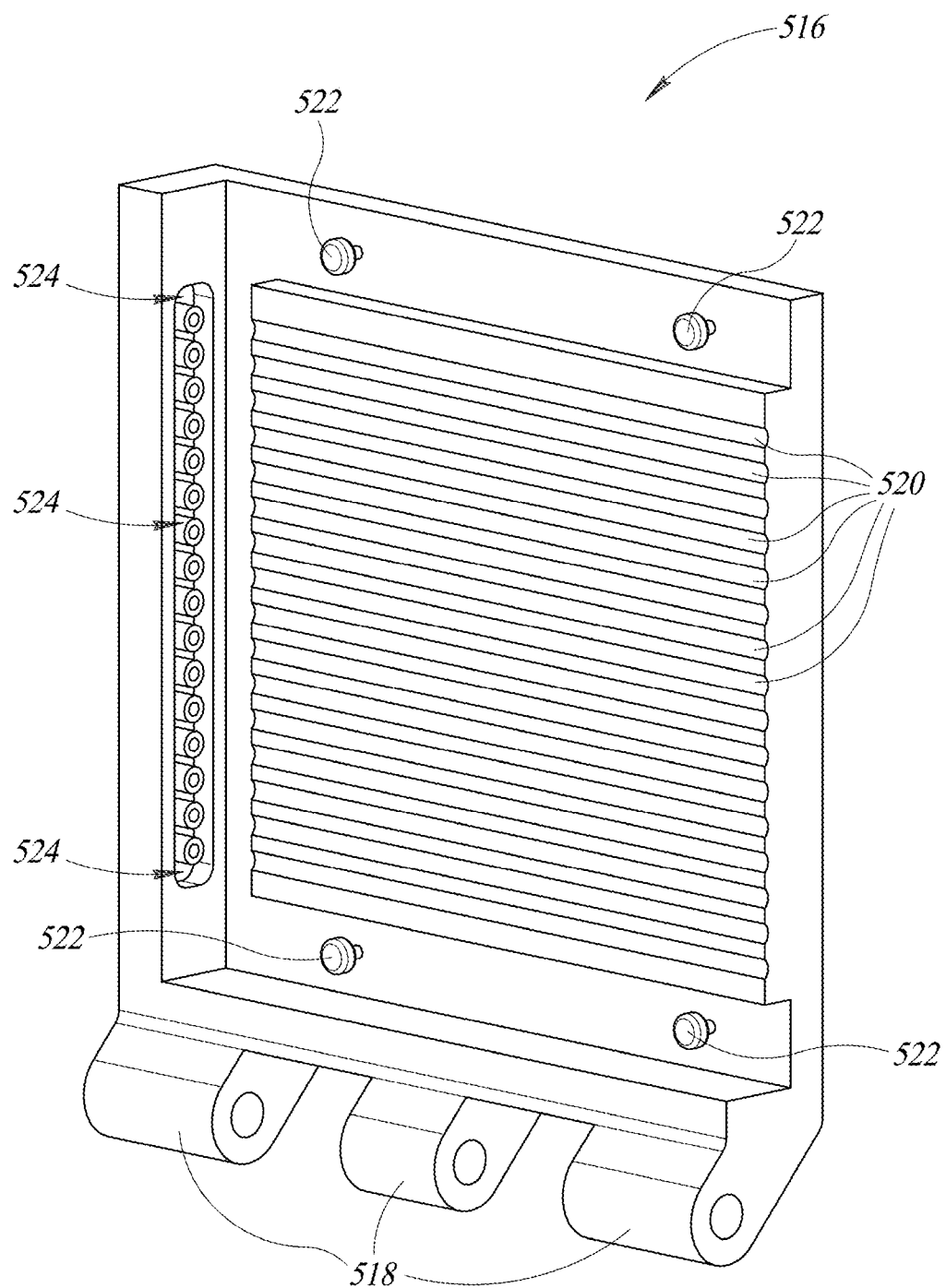
FIG. 45 illustrates a perspective view of a hinged door of the cradle of the microfluidic system of FIG. 22.

FIGS. 41 and 45 illustrate perspective views of a hinged door or a hinged sidewall 516 of the cradle 466. As illustrated in FIGS. 41 and 45, the hinged sidewall 516 extends upward and front-to-back and includes components 518 of a hinge located at a bottom end of the sidewall 516 and extending and facing toward the left of the sidewall 516. The components 518 can be coupled with the components 504 to form a complete hinge such that the hinged sidewall 516 can rotate to the left and inward toward, or to the right and outward away from, the stationary sidewall 502 about a horizontal axis that extends front-to-back through the components 504 and 518 of the hinge. The hinged sidewall 516 also includes sixteen individual grooves or channels 520 that extend horizontally and front-to-back therethrough, where each of the channels 520 has a semi-circular cross-sectional shape.

As also illustrated in FIG. 45, the hinged sidewall 516 includes a plurality of protrusions or knobs or pegs 522 having shapes corresponding to those of the openings 496 such that the knobs 522 can be inserted into the openings 496 to secure the cartridge 490 to the hinged sidewall 516. As also illustrated in FIG. 45, the hinged sidewall 516 includes a female portion of a fluid connector 524, which provides a plurality of ports, each of which can be fluidically coupled to a respective one of the ports of the male portion of the fluid connector 494. As illustrated in FIG. 41, the micropipette system 464 can be installed within the system 400 such that the cartridge 490 is positioned within the cradle 466 and between the stationary sidewall 502 and the hinged sidewall 516.

Figure 46:
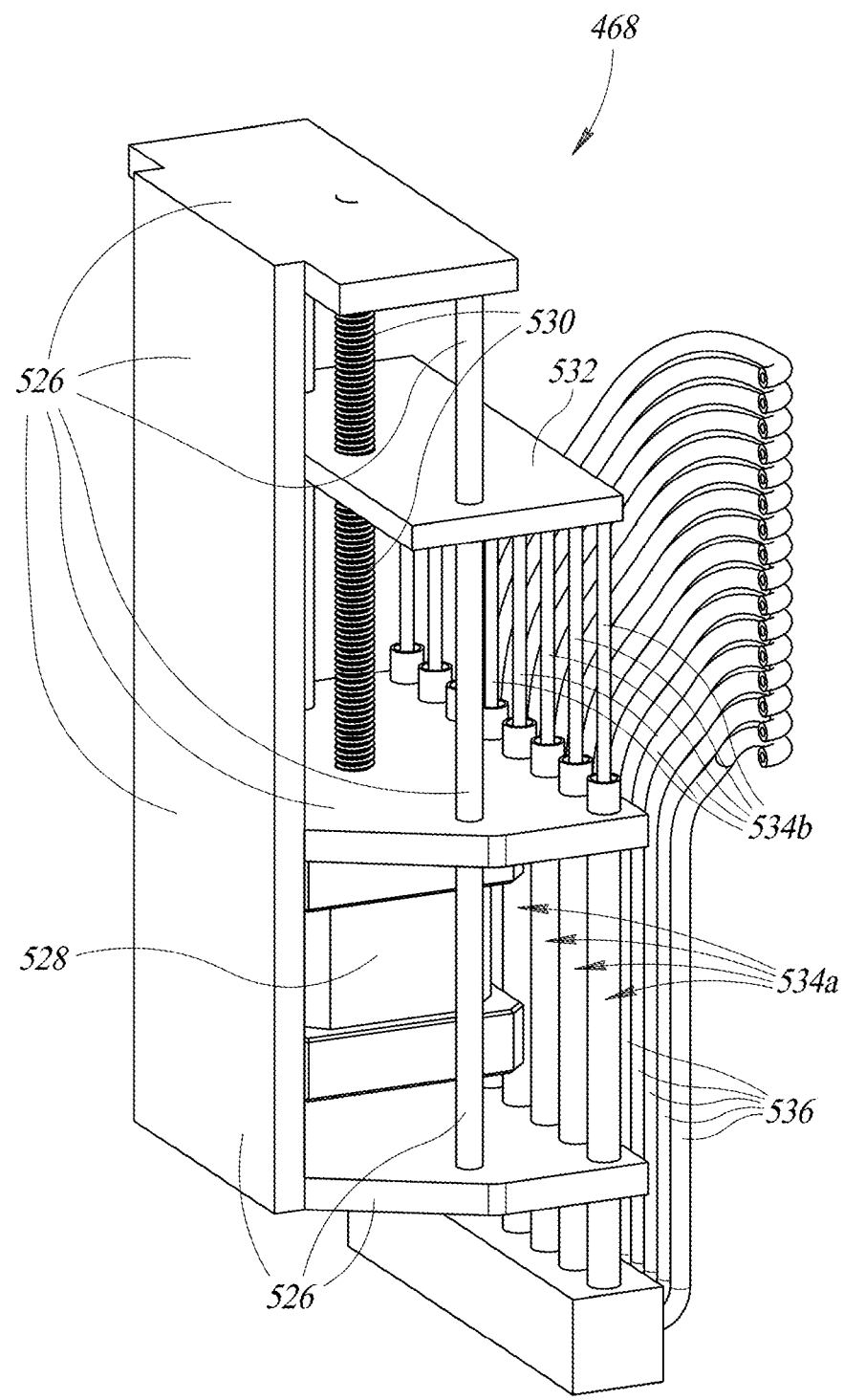
FIG. 46 illustrates a syringe pump system of the microfluidic system of FIG. 22.

FIG. 46 illustrates the pump system 468 with other components of the system 400 removed for greater clarity. The pump system 468 may be a hydraulic or a pneumatic pump system, and may also be referred to as an "air handling system." As illustrated in FIG. 46, the pump system 468 includes a stationary frame 526 to which other components of the pump system 468 can be coupled. The frame 526 may be rigidly secured to, for example, an upper surface of the bottom plate 404 of the housing 402 at a location behind the horizontal actuation system 424. As illustrated in FIG. 46, the pump system 468 also includes an electrical motor, a servo motor, or any other suitable fourth actuator 528 that can generate torque, such as from electrical power. The pump system 468 also includes a threaded rod 530 that is coupled to an output or a driven rod of the fourth actuator 528. The fourth actuator 528 can generate torque that rotates the threaded rod 530 about its own central longitudinal axis, which is a vertical axis extending up-and-down and upward from the fourth actuator 528.

The pump system 468 also includes a travelling block or plate 532, which is secured to and mounted on the frame 526 such that the travelling block 532 can travel linearly up-and-down along portions of the frame 526. For example, the travelling plate 532 may include one or more holes or openings therein, and the frame 526 may include one or more posts or columns having cross-sectional shapes corresponding to those of the openings, such that the columns can be positioned within the openings to secure the travelling plate 532 to the frame 526. The threaded rod 530 extends through a conduit or an opening extending through the travelling plate 532. In some implementations, the conduit extending through the travelling plate 532 is threaded, with threads of the conduit corresponding to the threads of the threaded rod 530, and the threads of the conduit may be engaged and interlocked with the threads of the threaded rod 530.

Thus, due to the engagement of these threads and the engagement of the travelling plate 532 with the frame 526, when the actuator 528 generates torque and induces rotation of the threaded rod 530, the rotation of the threaded rod 530 induces linear movement of the travelling plate 532 up-and-down along a height of the columns of the frame 526. By turning the threaded rod 530 in a first direction, such as clockwise or counterclockwise, the threaded rod 530 can cause the travelling plate 532 to travel in a first direction, such as up or down. By turning the threaded rod 530 in a second direction opposite to the first, such as clockwise or counterclockwise, the threaded rod 530 can cause the travelling plate 532 to travel in a second direction opposite to the first direction, such as up or down.

As illustrated in FIG. 46, the pump system 468 also includes a plurality of (e.g., eight) syringe pumps 534, each including a respective pump barrel 534*a* and a respective pump plunger 534*b* extending into the respective pump barrel 534*a*. Thus, the pump system 468 can also be referred to as an "eight channel syringe pump." Each of the pump plungers 534*b* is coupled to the travelling plate 532 such that movement of the travelling plate 532 upwards pulls the pump plungers upwards and retracts the pump plungers 534*b* out of the respective pump barrels 534*a*, and such that movement of the travelling plate 532 downwards pushes the pump plungers downwards and extends the pump plungers 534*b* into the respective pump barrels 534*a*. FIG. 46 also illustrates that the pump system 468 includes a respective pair of conduits 536 for each of the syringe pumps 534, where inlets of each pair of the conduits 536 are fluidically coupled, such as by a two-way selector valve, to an outlet of a respective one of the syringe pumps 534, and where an outlet of each of the conduits 536 is fluidically coupled to a respective one of the ports of the female portion of a fluid connector 524.

To operate the microfluidic system 400, an operator or a technician can approach the system 400 and open the housing 402 by rotating the front portion 414 of the housing 402 away from the rest of the housing 402. The technician can then install the microfluidic chip 418 and the microwell plate 420 by positioning the microfluidic chip 418 into the cavity 426 in the microwell plate 420 and then securing the microwell plate 420 to the tray 422 by sliding the protrusions 434 downward and then horizontally along and through the grooves 442. The technician can then load biological samples and other materials, such as PCR reagents but depending on the processing to be done, into the array of microwells 430 of the microwell plate 420 and/or into the wells 418*a* of the microfluidic chip 418. In some implementations, these materials can include materials to facilitate qPCR, gel electrophoresis, or any of the other processing techniques described herein. In some specific implementations, these materials can include an RNA polymerase or a DNA polymerase, and may include any of various DNA polymerases of thermophilic organisms used in PCR, which may be referred to as "TAQ polymerases."

The technician can then install the micropipette system 464. Installing the micropipette system 464 can include rotating the hinged sidewall 516 of the cradle 466 outward away from the stationary sidewall 502, then securing the cartridge 490 to the hinged sidewall 516 by inserting the knobs 522 of the sidewall 502 into the openings 496 in the cartridge 490 and by securing the male portion of the fluid connector 494, including the fluid ports thereof, within the female portion of the fluid connector 524, including the fluid ports thereof, and then rotating the hinged sidewall 516 of the cradle 466 inward toward the stationary sidewall 502 to secure the cartridge between the stationary sidewall 502 and the hinged sidewall 516 such that the micropipette conduits 482*b* are cradled between the grooves 508 of the heat transfer block 506 and the grooves 520 of the hinged sidewall 516. Installing the micropipette system 464 can also include pressing down on the paddle 480*a* of the latch 480, inserting the arm 478 into the opening 486 into the hollow support arm 484, and then releasing the paddle 480*a* to allow the tooth 480*b* of the latch 480 to move into and be seated within the groove 488, thereby securing and locking the support arm 484 of the micropipette system 464 to the arm 478 of the vertical actuation system 462.

Once these actions have been completed, the technician can close the system 400 by rotating the front portion 414 of the housing 402 toward the rest of the housing 402. The technician can then press or push the button 416, such as exactly and only once, to initiate operation of the microfluidic system 400 and processing of the biological samples or other materials therein. In some implementations, the operator or technician may also press the button 416 to stop or halt operation of the microfluidic system 400 prior to completion of the processing, for example, in case an emergency or other unforeseen circumstance or situation arises.

Once the technician has pressed the button 416 to initiate operation of the microfluidic system 400, the microfluidic system 400 can automatically control movement and operation of the components therein to process the materials in specified ways. For example, in some implementations, the system 400 can use the horizontal actuation system 424 to move the tray 422 horizontally until the micropipette tips 482*a* are located directly above microwells 430 in the microwell plate 420 that contain desired materials. The system 400 can then use the vertical actuation system 462 to move the micropipette tips 482*a* downward until they are located within the desired materials in the microwells 430 of the microwell plate 420. The system 400 can then use the fourth actuator 528 to drive the syringe pumps 534 to draw the desired materials up into the micropipette conduits 482*b*. In general, operation of the fourth actuator 528 in this manner drives each of the eight syringe pumps 534 in unison.

The system 400 can then use the vertical actuation system 462 to move the micropipette tips 482*a* upward until they are located above the microwell plate 420. The system 400 can then use the horizontal actuation system 424 to move the tray 422 horizontally until the micropipette tips 482*a* are located directly above wells 418*a* in the microfluidic chip 418 where processing of the materials is to begin. The system 400 can then use the vertical actuation system 462 to move the micropipette tips 482*a* downward until they are located within the desired wells 418*a* of the microfluidic chip 418. The system 400 can then use the fourth actuator 528 to drive the syringe pumps 534 to expel the materials out of the micropipette conduits 482*b* into the wells 418*a*. This process can be repeated to move as many materials as desired from the microwells 430 of the microwell plate 420 into the wells 418*a* in the microfluidic chip 418.

Once the materials have been supplied to the wells 418*a* in this manner, the materials can undergo various processing steps within the microfluidic chip 418, such as to separate or remove contaminants from such materials, such as in accordance with the description of such processing elsewhere herein. During such processing, the electrically conductive leads 428 can be energized to create electric field(s), and/or the magnet 450 can be moved to provide a magnetic field, that interact with the materials being processed, thereby affecting their behavior within the microfluidic chip 418 and assisting in the processing of those materials in the microfluidic chip 418. Once such processing is completed, a quality control check may be performed to confirm that sufficient material is available for further processing, such as for use in PCR processing. Such a quality control check could be done inside or outside of the system 400.

The system 400 can then use the horizontal actuation system 424 to move the tray 422 horizontally until the micropipette tips 482*a* are located directly above wells 418*a* in the microfluidic chip 418 that contain desired materials. The system 400 can then use the vertical actuation system 462 to move the micropipette tips 482*a* downward until they are located within the desired materials in the wells 418a of the microfluidic chip 418. The system 400 can then use the fourth actuator 528 to drive the syringe pumps 534 to draw the desired materials up into the micropipette conduits 482b.

The system 400 can then use the vertical actuation system 462 to move the micropipette tips 482a upward until they are located above the microfluidic chip 418. The system 400 can then use the horizontal actuation system 424 to move the tray 422 horizontally until the micropipette tips 482a are located directly above microwells 430 in the microwell plate 420 where additional desired materials, such as PCR reagents, are located. The system 400 can then use the vertical actuation system 462 to move the micropipette tips 482a downward until they are located within the desired microwells 430 of the microwell plate 420. The system 400 can then use the fourth actuator 528 to drive the syringe pumps 534 to draw the desired materials such as PCR reagents up into the micropipette conduits 482b, such as until the desired materials are mixed with one another inside the conduits 482b and located in the portions of the conduits 482b inside the cartridge 490.

Once the desired materials are located within the portions of the micropipette conduits 482b inside the cartridge 490, the solenoid actuators can be used to move the bars 510 to the right out of the rightward-facing surface of the sidewall 502, and toward the hinged sidewall 516, until the bars 510 pinch each of the micropipette conduits 482b in two locations to prevent any materials escaping from the portions of the micropipette conduits 482b located inside the cartridge 490. The heater within the cradle 466 can then be used to heat the materials held within the portions of the conduits 482b inside the cartridge 490 to facilitate chemical reactions or other processing steps therein. In some cases, this includes using the heater to generate a constant heat flow to the conduits 482b, while in other cases, this includes cycling the heater to provide a cyclical heat flow to the conduits 482b. In some implementations, the conduits 482b are made of a heat conductive plastic to conduct the heat to the materials more effectively.

As an example, the heat can facilitate a PCR reaction taking place within the portions of the conduits 482b inside the cartridge 490. Once this processing is completed, the heater within the cradle 466 can then be turned off to stop heating the materials held within the portions of the conduits 482b inside the cartridge 490, and the solenoid actuators can be used to move the bars 510 to the left into the rightward-facing surface of the sidewall 502, and away from the hinged sidewall 516, until the bars 510 no longer pinch the micropipette conduits 482b. Once such processing is completed, a quality control check may be performed to confirm that the processing, such as the PCR processing, was successful or met certain performance standards. Such a quality control check could be done inside or outside of the system 400.

The system 400 can then use the horizontal actuation system 424 to move the tray 422 horizontally until the micropipette tips 482a are located directly above wells 430 in the microfluidic plate 420. The system 400 can then use the vertical actuation system 462 to move the micropipette tips 482a downward until they are located within the desired wells 430 in the microwell plate 430. The system 400 can then use the fourth actuator 528 to drive the syringe pumps 534 to expel the materials out of the micropipette conduits 482b into the wells 430.

Once such processing is complete, the technician can open the housing by rotating the front portion 414 of the housing 402 away from the rest of the housing 402. The technician can then remove the micropipette system 464. Removing the micropipette system 464 can include rotating the hinged sidewall 516 of the cradle 466 outward away from the stationary sidewall 502, then removing the cartridge 490 from the hinged sidewall 516 by moving the knobs 522 of the sidewall 502 out of the openings 496 in the cartridge 490 and by removing the male portion of the fluid connector 494, including the fluid ports thereof, from the female portion of the fluid connector 524, including the fluid ports thereof. Removing the micropipette system 464 can also include pressing down on the paddle 480a of the latch 480, removing the arm 478 from the opening 486 and the hollow support arm 484, and then releasing the paddle 480a.

The technician can then also remove the microfluidic chip 418 and the microwell plate 420 from the tray 422 by sliding the protrusions 434 horizontally and then upward along and through the grooves 442. The technician can then remove the processed materials from the wells 430 in the microwell plate 420. Once these materials have been removed and stored elsewhere, the micropipette system 464, the microwell plate 420, and the microfluidic chip 418 can be discarded as waste. Subsequent processing can use a new micropipette system 464, a new microwell plate 420, and a new microfluidic chip 418. In some implementations, the microfluidic chip 418, the microwell plate 420, and/or any other components of the system 400 described herein may include an RFID chip or tag to assist in identifying specific components and tracking their locations within a larger collection of such components.

The processing described herein proceeds by moving materials from the microwell plate 430 to the microfluidic chip 418, then from the microfluidic chip 418 to the cradle 466, then from the cradle 466 back to the microwell plate 430. Such processing can serve to remove contaminants from a biological sample and desired components thereof, such as DNA, RNA, mRNA, or various proteins, including various amino acid-based proteins, and then perform PCR on the biological sample. In alternative implementations, however, processing can proceed by moving materials from any component(s) to any other component(s) any number of times, depending on the actions called for by the desired processing. In one example of an alternative implementation, the processing described herein may proceed by moving materials from the microwell plate 430 to the cradle 466, then from the cradle 466 to the microfluidic chip 418, then from the microfluidic chip 418 back to the microwell plate 420. Such processing can serve to perform PCR on a biological sample and desired components thereof, such as DNA, RNA, mRNA, or various proteins, including various amino acid-based proteins, and then remove contaminants from the biological sample.

U.S. patent application Ser. No. 15/879,141, filed Jan. 24, 2018, U.S. patent application No. 62/623,712, filed Jan. 30, 2018, and U.S. patent application No. 62/757,074, filed Nov. 7, 2018 are hereby incorporated herein by reference, in their entireties. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for removing one or more contaminants from a biological sample, the method comprising:
providing a first well and a second well connected to each other via a microchannel;
placing the biological sample into the first well;
introducing magnetic beads into the first well to attract target molecules within the biological sample;
applying an electric field across the microchannel, the electric field adapted to interact with at least some of the one or more contaminants and further adapted not to interact with the magnetic beads;
introducing a magnet generating a magnetic field into the vicinity of the first well, the magnetic field interacting with the magnetic beads; and
moving the magnetic beads into and through the microchannel and to the second well by moving the magnet,
wherein, while moving the magnetic beads into and through the microchannel and to the second well by moving the magnet, the electric field acts on at least some of the one or more contaminants to maintain at least some of the one or more contaminants in the microchannel as the magnetic beads and attracted target molecules move through the microchannel and to the second well,
wherein applying the electric field across the microchannel includes disposing a first probe in the first well and a second probe in the second well, the first probe and the second probe having opposite polarities, and
wherein moving the magnet includes rotating the magnet along an arcuate path.

2. The method of claim 1, further comprising:
withdrawing the magnetic beads from the second well;
inserting the magnetic beads into a container including a fluid;
releasing the target molecules from the magnetic beads; and
removing the magnetic beads from the container.

3. The method of claim 1, further comprising:
providing a third well and a second microchannel, the third well connected to the second well via the second microchannel;
moving the magnetic beads and target molecules through the second microchannel and to the third well using the magnet.

4. The method of claim 1, further comprising:
providing a fluid in the first well, the second well, and the microchannel; and
creating a volume differential of the fluid between the second well and the first well such that a flow of the fluid is created in the microchannel from the second well toward the first well.

5. The method of claim 1, further comprising:
stirring the biological sample in the first well; or
heating the biological sample in the first well.

6. A system for removing one or more contaminants from a biological sample, the system comprising:
magnetic beads that are tuned to attract target molecules from the biological sample;
a first well adapted to contain the biological sample and the magnetic beads;
a second well adapted to contain the biological sample and the magnetic beads;
a microchannel extending between the first well and the second well;
a magnet adapted to be moved into the vicinity of the first well, the magnet adapted to generate a magnetic field to interact with the magnetic beads, the magnet further capable of moving the magnetic beads from the first well to the second well via the microchannel;
an actuator coupled to the magnet, the actuator configured to rotate the magnet about a horizontal axis across an arcuate path of travel to move the magnetic beads from the first well to the second well via the microchannel;
a source of electrical power and two probes coupled thereto, the two probes adapted to apply an electric field across the microchannel when the source provides electrical power, such that
when the magnetic beads are moved by the magnet from the first well to the second well via the microchannel, the electric field interacts with at least some of the one or more contaminants to maintain at least some of the one or more contaminants in the microchannel as the magnetic beads and attracted target molecules move from the first well to the second well.

7. The system of claim 6, further comprising:
a third well; and
a second microchannel, said third well connected to the second well via the second microchannel;
wherein the magnet is adapted to move along the second microchannel from the second well to the third well to move the magnetic beads and target molecules from the second well to the third well.

8. The system of claim 6, further comprising:
a fluid in the first well, the second well, and the microchannel; and
a volume differential of the fluid between the second well and the first well, the volume differential adapted to provide a flow of the fluid in the microchannel from the second well toward the first well.

9. The system of claim 6, further comprising a magnetic stirrer adapted to stir the contents of said first well.

10. The system of claim 6, further comprising a heater adapted to heat said first well.

11. The system of claim 6 wherein a first one of the two probes is disposed in the first well and a second one of the two probes is disposed in the second well, the first probe and the second probe having opposite polarities.

12. The system of claim 6, further comprising a third well in communication with the microchannel and a fourth well in communication with the microchannel, wherein a first one of the two probes is disposed in the third well and a second one of the two probes is disposed in the fourth well, the first probe and the second probe having opposite polarities, wherein the third well and the fourth well are on opposite sides of the microchannel and are offset from a center of the microchannel between the first well and the second well.

13. The system of claim 6, wherein the arcuate path of travel includes a starting position, an intermediate position, and an ending position, and the actuator is further configured to:
rotate the magnet from the starting position in which the magnet is spaced by a first distance from the first well to the intermediate position in which the magnet is spaced by a second distance from the microchannel that is less than the first distance; and
rotate the magnet from the intermediate position to the ending position in which the magnet is spaced from the second well by the first distance.

14. A system for removing one or more contaminants from a biological sample, the system comprising:
- magnetic beads that are tuned to attract target molecules from the biological sample;
- a first well adapted to contain the biological sample and the magnetic beads;
- a second well adapted to contain the biological sample and the magnetic beads;
- a microchannel extending between the first well and the second well;
- a third well in fluid communication with the microchannel;
- a fourth well in fluid communication with the microchannel;
- a magnet adapted to be moved into the vicinity of the first well, the magnet adapted to generate a magnetic field to interact with the magnetic beads, the magnet further capable of moving the magnetic beads from the first well to the second well via the microchannel; and
- a first probe positioned in the third well and a second probe positioned in the fourth well, wherein the first and second probes have opposite polarities and are configured to apply an electric field across the microchannel via only the first probe and the second probe,
- wherein when the magnetic beads are moved by the magnet from the first well to the second well via the microchannel, the electric field interacts with at least some of the one or more contaminants while not interacting with the magnetic beads to maintain at least some of the one or more contaminants in the microchannel as the magnetic beads and attracted target molecules move from the first well to the second well via movement of the magnet.

15. The system of claim 14, wherein the microchannel is a first microchannel, the system further comprising:
- a second microchannel between the third well and the first microchannel; and
- a third microchannel between the fourth well and the first microchannel,
- wherein the second microchannel and the third microchannel are offset from a center of the first microchannel that is an equal distance from the first well and the second well to increase a distance between the first probe and the second probe and apply the electric field over substantially all of the first microchannel.

16. The system of claim 14, wherein the third well is spaced from the second well and positioned closer to the second well than the fourth well, and the fourth well is spaced from the first well and positioned closer to the first well than the third well.

17. The system of claim 14, wherein the third well and the fourth well are in fluid communication with the microchannel by a respective one of two further microchannels that are each perpendicular to the microchannel and arranged on opposite sides of the microchannel from each other.

18. The system of claim 14, wherein the third well and the fourth well and corresponding first probe and second probe are positioned on opposite sides of the microchannel and offset from each other relative to a center of the microchannel that is an equal distance between the first well and the second well, and
- wherein the first probe and the second probe are external electrodes placed in the third well and the fourth well, respectively.

* * * * *